United States Patent
Sugiyama et al.

(10) Patent No.: US 11,624,488 B1
(45) Date of Patent: Apr. 11, 2023

(54) MULTI-SECTION LED LIGHT BAR WITH DRIVER

(71) Applicant: Putco, Inc., Des Moines, IA (US)

(72) Inventors: Hiroyuki Sugiyama, Maebashi (JP); Parker Freeman, Des Moines, IA (US); Conner Schramm, Des Moines, IA (US); James P. Elwell, Grimes, IA (US)

(73) Assignee: Putco, Inc., Des Moines, IA (US)

( * ) Notice: Subject to any disclaimer, the term of this patent is extended or adjusted under 35 U.S.C. 154(b) by 0 days.

(21) Appl. No.: 17/733,234

(22) Filed: Apr. 29, 2022

(51) Int. Cl.
| | |
|---|---|
| F21S 43/14 | (2018.01) |
| F21V 23/00 | (2015.01) |
| F21S 43/19 | (2018.01) |
| F21V 23/06 | (2006.01) |
| F21S 43/15 | (2018.01) |
| F21Y 103/10 | (2016.01) |
| F21Y 115/10 | (2016.01) |

(52) U.S. Cl.
CPC ............... *F21S 43/14* (2018.01); *F21S 43/15* (2018.01); *F21S 43/195* (2018.01); *F21V 23/007* (2013.01); *F21V 23/06* (2013.01); *F21Y 2103/10* (2016.08); *F21Y 2115/10* (2016.08)

(58) Field of Classification Search
CPC ...... F21S 43/14–195; F21V 23/003–06; F21Y 2103/10; F21Y 2115/10
See application file for complete search history.

(56) References Cited

U.S. PATENT DOCUMENTS

| | | | | |
|---|---|---|---|---|
| 5,452,188 | A * | 9/1995 | Green | B60Q 1/2611 |
| | | | | 362/240 |
| 6,879,263 | B2 * | 4/2005 | Pederson | B60Q 1/2696 |
| | | | | 345/82 |
| 7,036,965 | B2 * | 5/2006 | Dalton, Jr. | B60Q 3/78 |
| | | | | 362/240 |
| 7,387,414 | B2 * | 6/2008 | Helms | B60Q 1/2611 |
| | | | | 362/288 |
| D642,952 | S | 8/2011 | Elwell | |
| 10,156,336 | B2 | 12/2018 | Elwell et al. | |
| 10,281,095 | B2 | 5/2019 | Elwell et al. | |
| 10,351,050 | B1 | 7/2019 | Elwell | |
| 10,429,027 | B2 * | 10/2019 | Kim | F21S 43/14 |
| 10,598,332 | B1 | 3/2020 | Elwell et al. | |
| 10,634,305 | B1 | 4/2020 | Elwell et al. | |

(Continued)

*Primary Examiner* — Jason M Han
(74) *Attorney, Agent, or Firm* — McKee, Voorhees & Sease, PLC

(57) ABSTRACT

A lighting assembly for use with a vehicle includes a light bar having a one or more circuit boards positioned within one or more housings wherein each circuit board includes light emitting diodes (LEDs) mounted to a surface thereof. The light bar may be divided into portions wherein each portion has its own housing. The light bar is operationally connected to an electronic control unit (ECU), wherein the ECU controls operation of the light bar and its components. The ECU is operationally connected to an electrical system of the vehicle such that the ECU can receive signals, commands, and/or information from the vehicle. The ECU is adapted to control the light bar, including illumination of LEDs thereon, based on the signals, commands, and/or information from the vehicle. The ECU is further adapted to emit and/or control audio output based on the signals, commands, and/or information from the vehicle.

20 Claims, 55 Drawing Sheets

(56) References Cited

U.S. PATENT DOCUMENTS

| | | |
|---|---|---|
| 10,683,983 B1 * | 6/2020 | Stowell .................. F21S 43/27 |
| 10,775,006 B2 | 9/2020 | Elwell et al. |
| D899,384 S | 10/2020 | Elwell et al. |
| 10,837,615 B2 | 11/2020 | Elwell et al. |
| 10,859,229 B1 | 12/2020 | Elwell et al. |
| D920,933 S | 6/2021 | Elwell et al. |
| D922,671 S | 6/2021 | Elwell |
| D922,672 S | 6/2021 | Elwell |
| D922,673 S | 6/2021 | Elwell |
| 11,022,268 B2 | 6/2021 | Elwell et al. |
| 2014/0301101 A1 * | 10/2014 | Russ ....................... B60Q 1/44 362/520 |

* cited by examiner

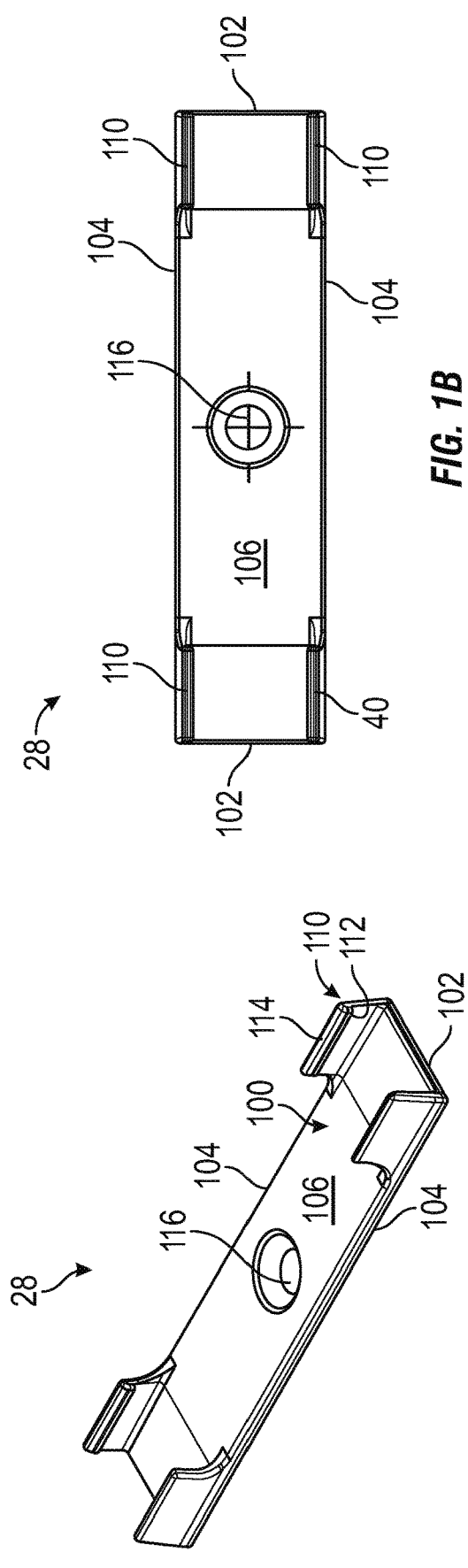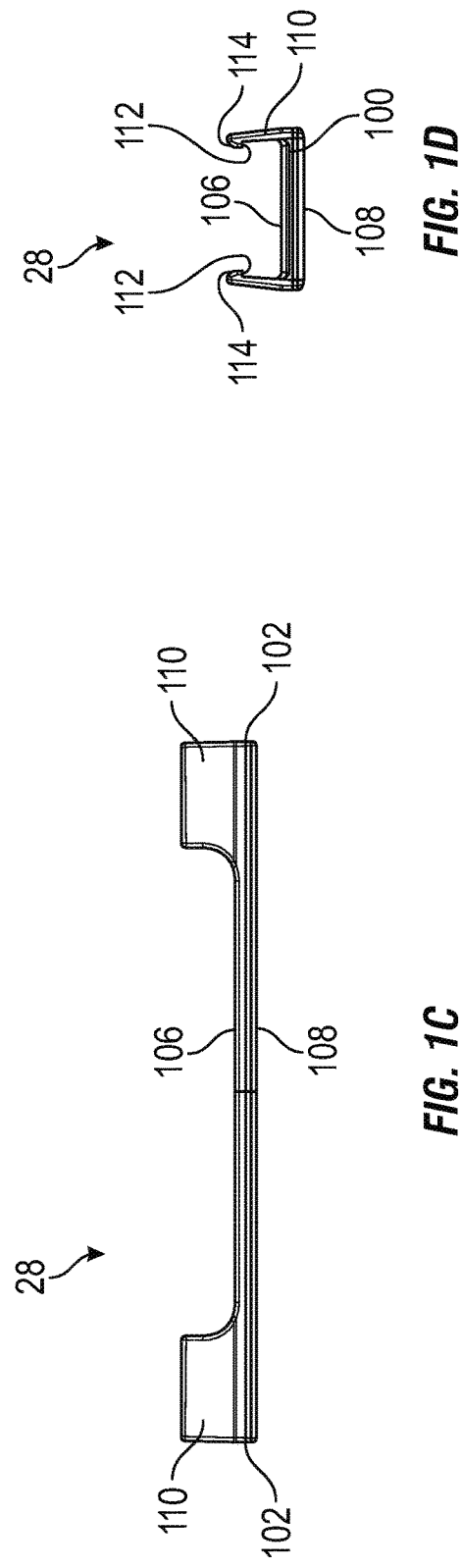

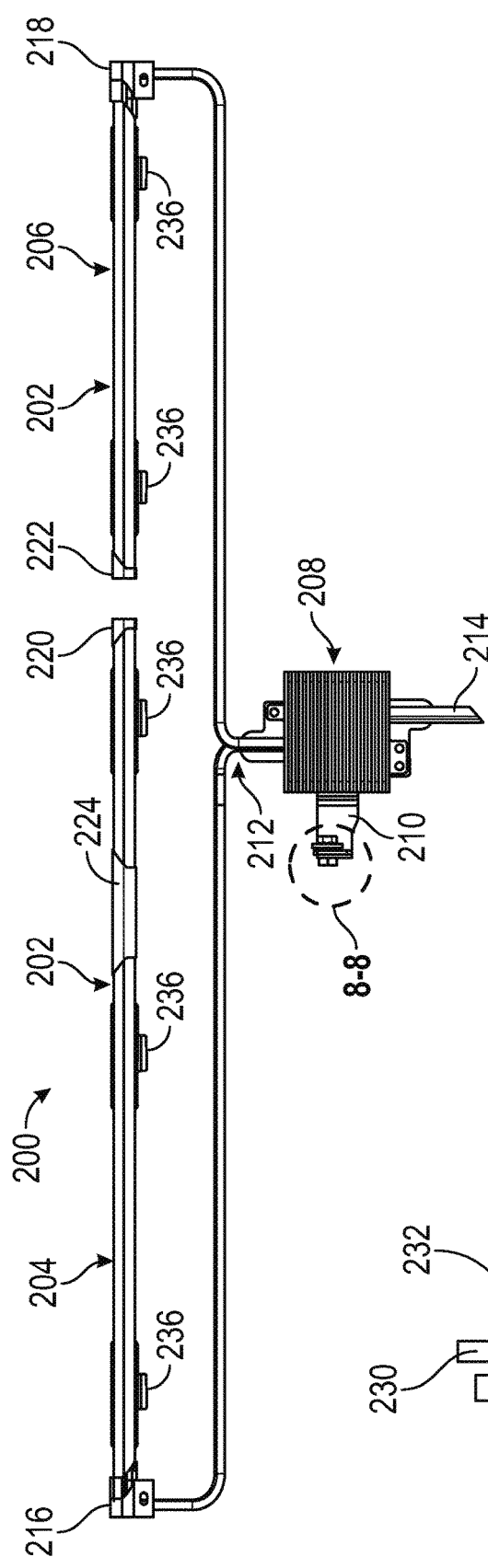
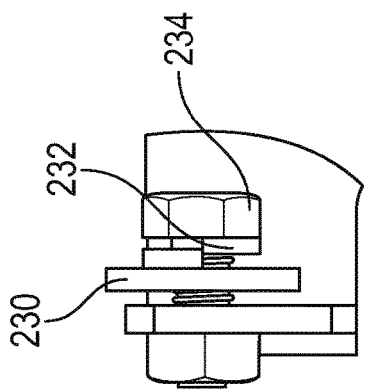
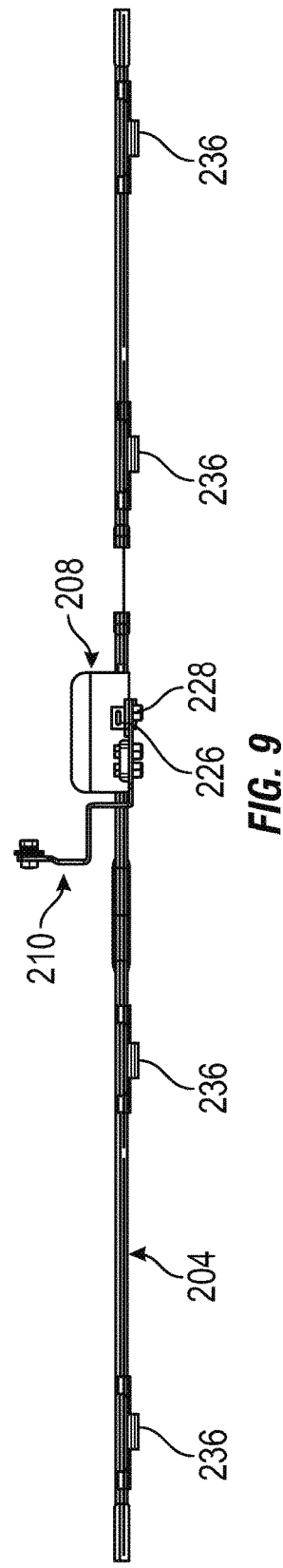
FIG. 7
FIG. 8
FIG. 9

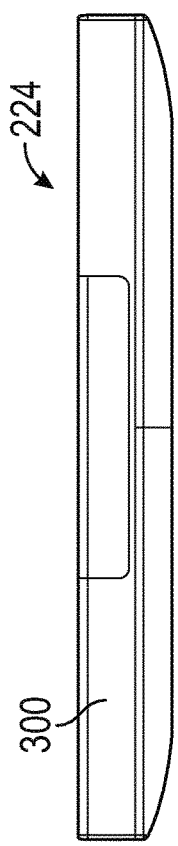
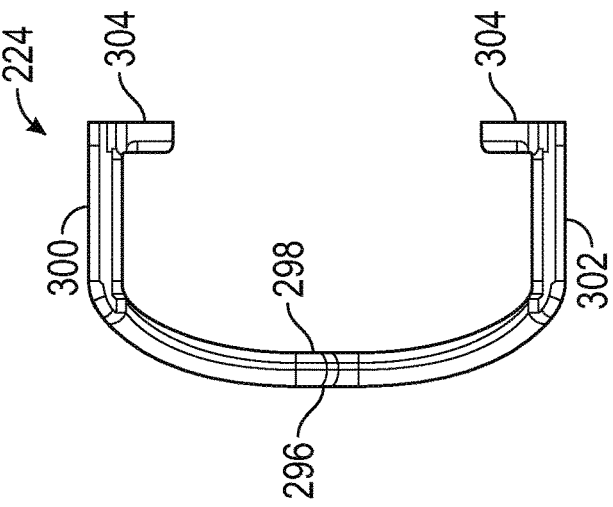
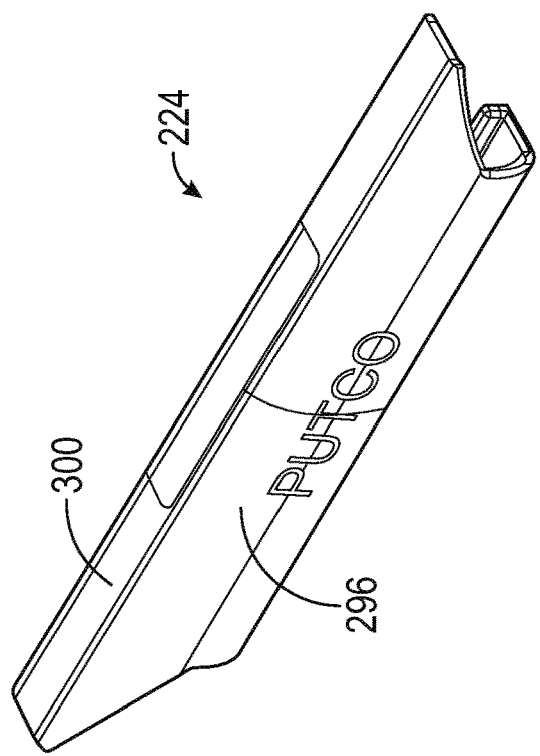
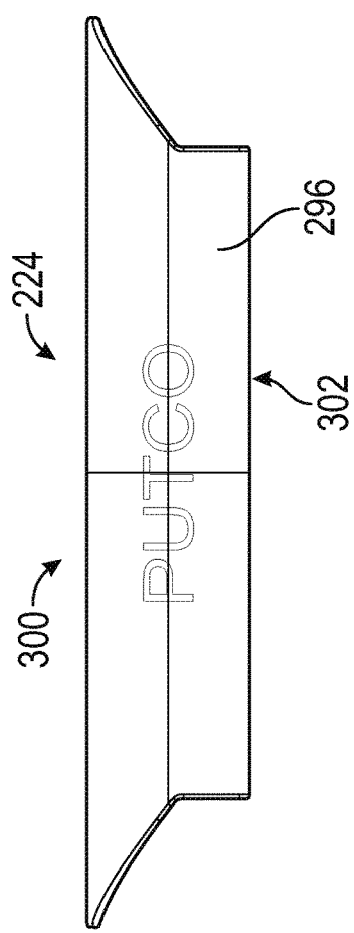
FIG. 21A
FIG. 21B
FIG. 21C
FIG. 21D

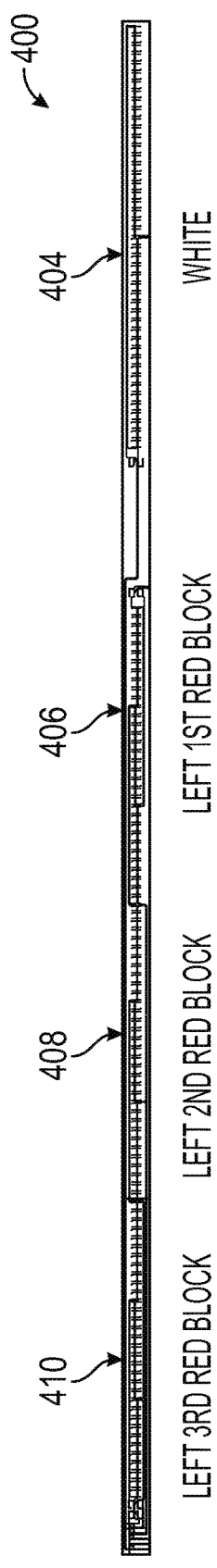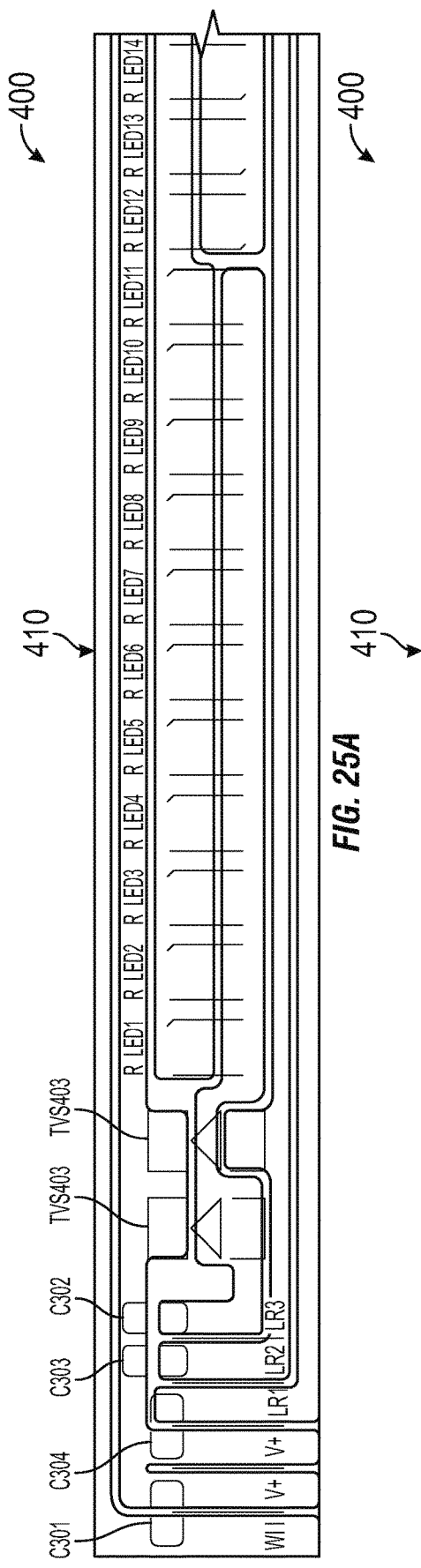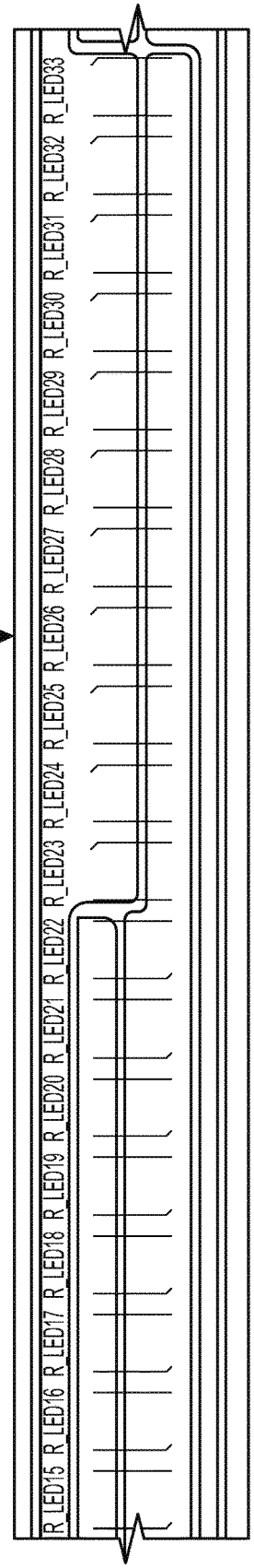
FIG. 24
FIG. 25A
FIG. 25B

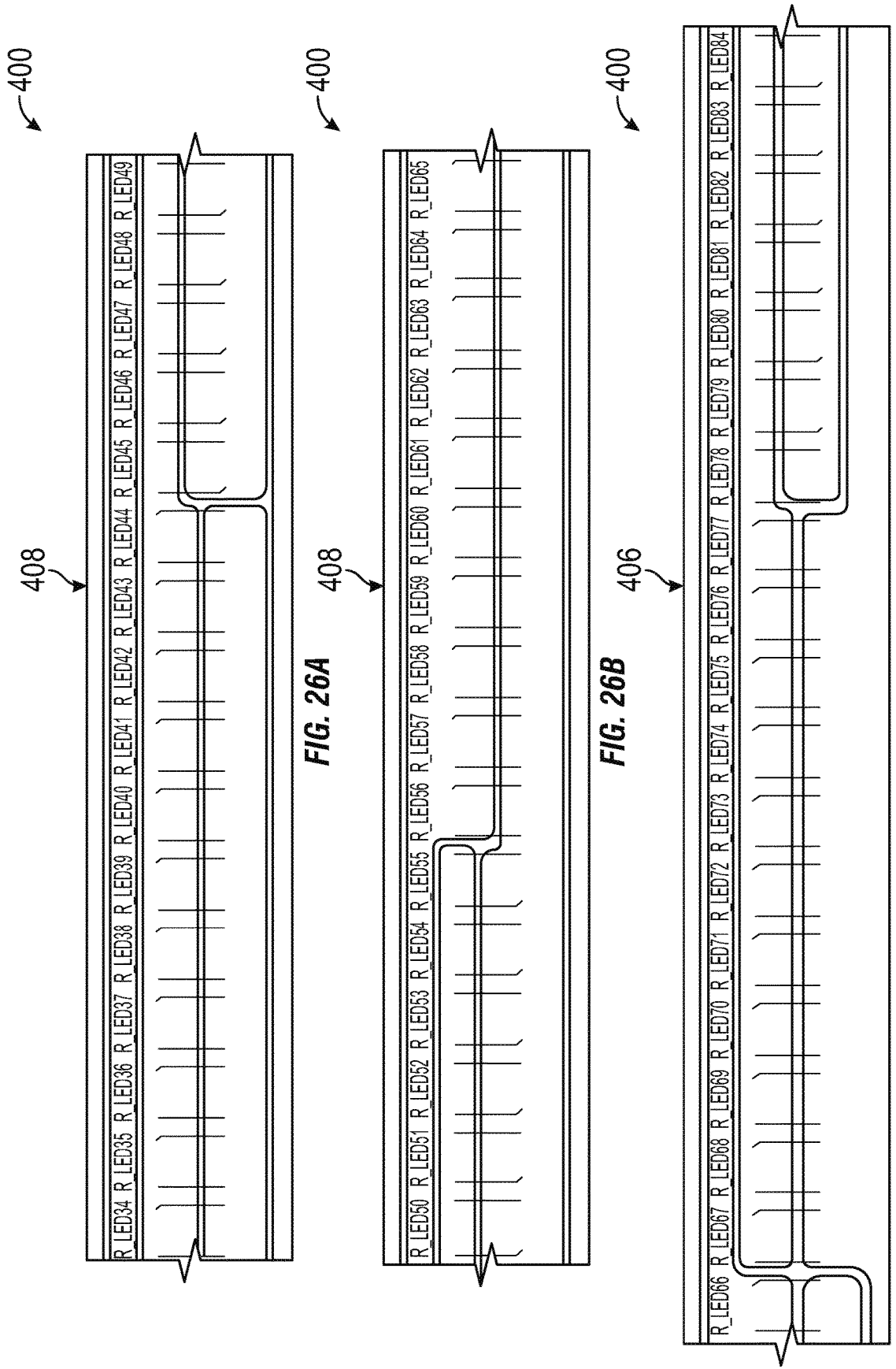

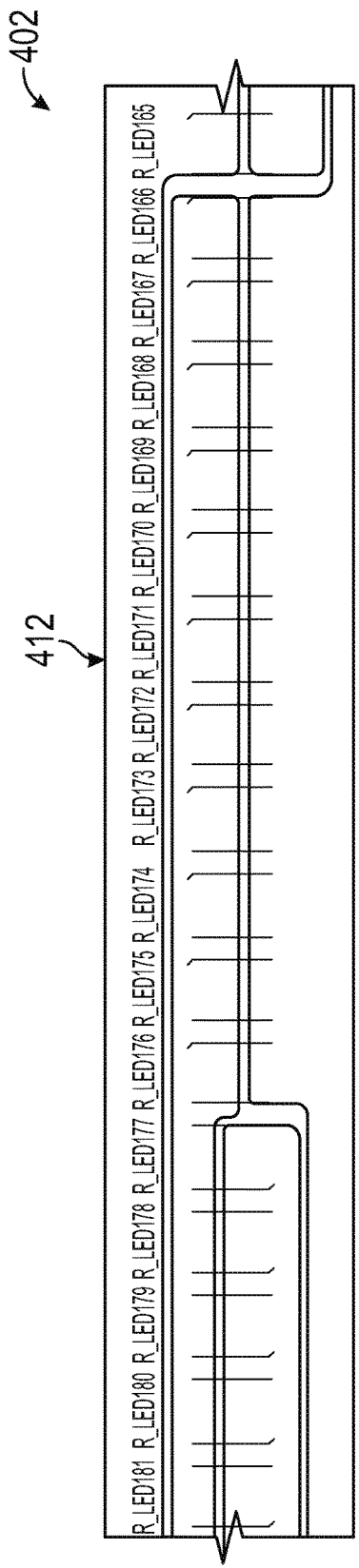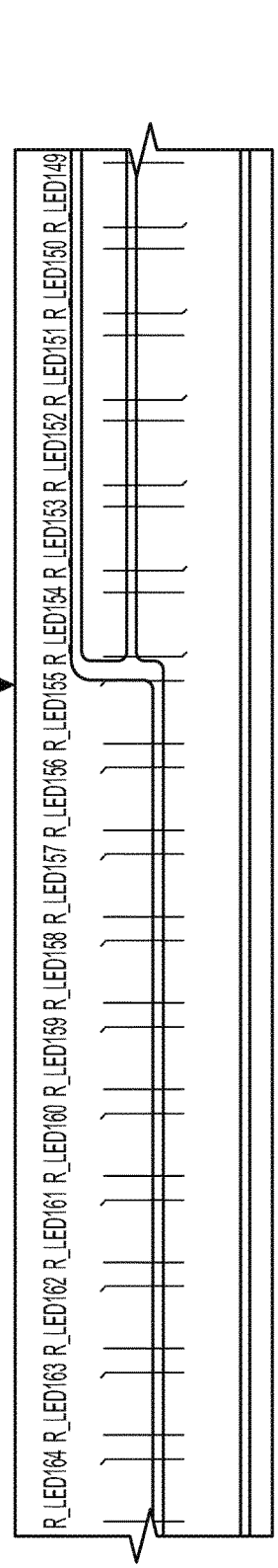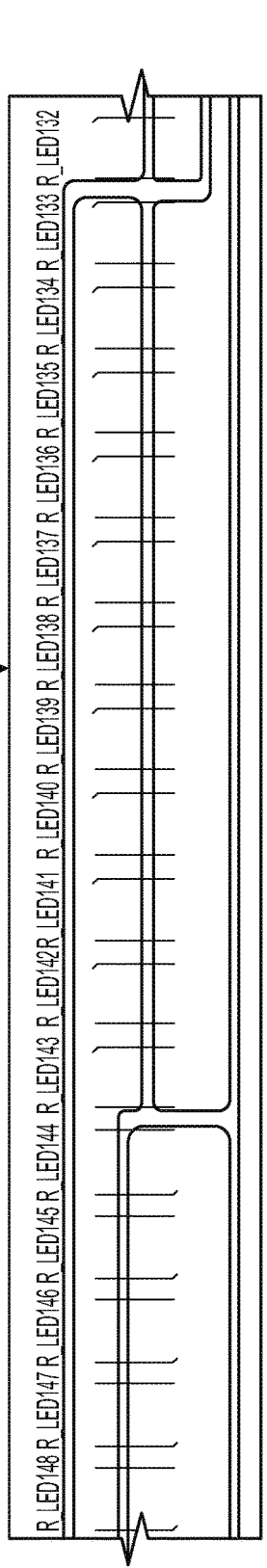

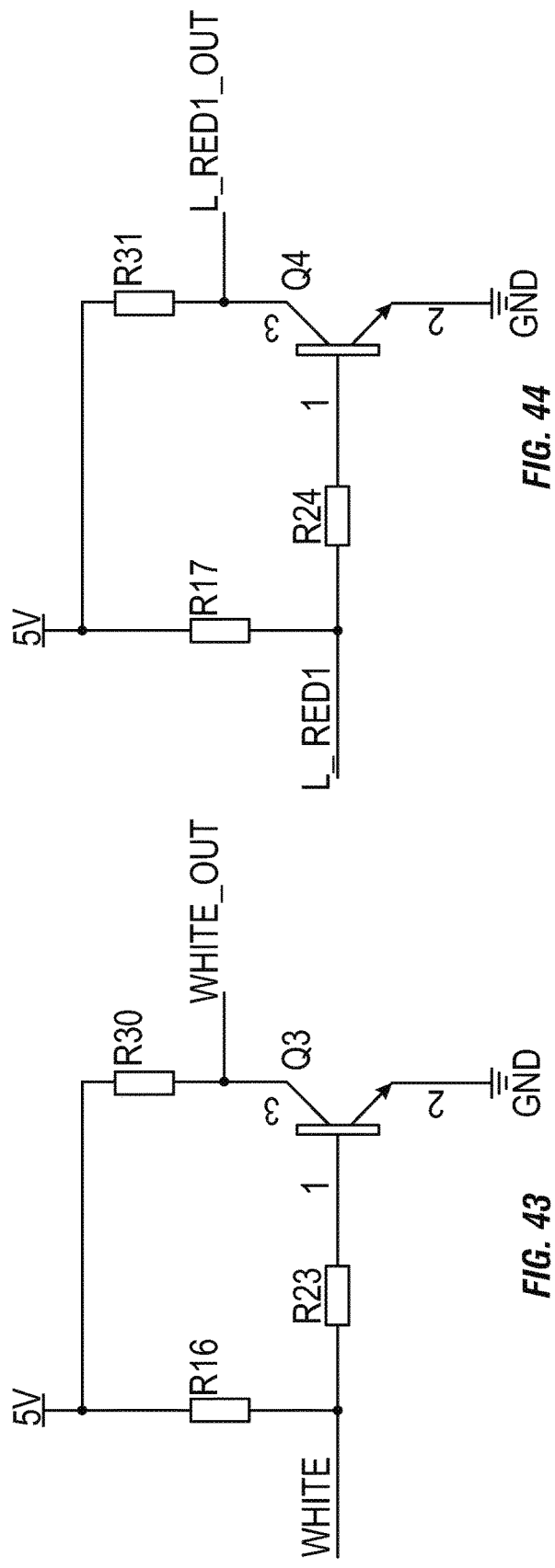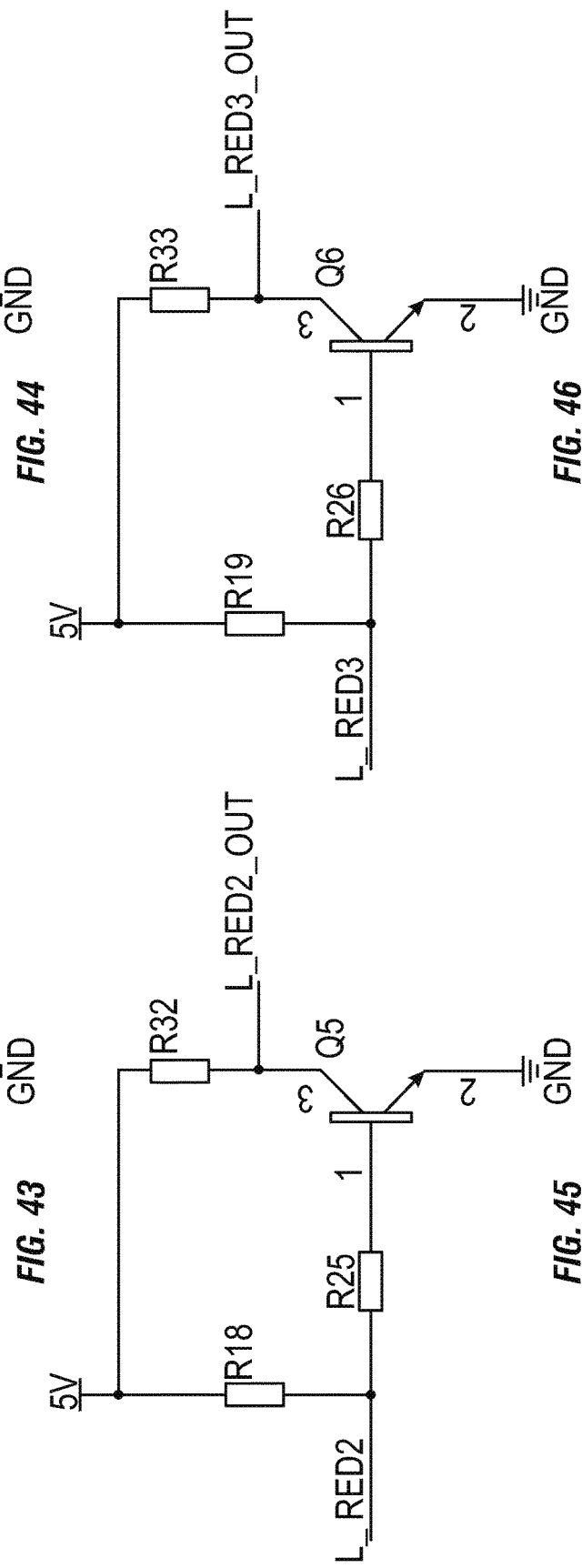
FIG. 43
FIG. 44
FIG. 45
FIG. 46

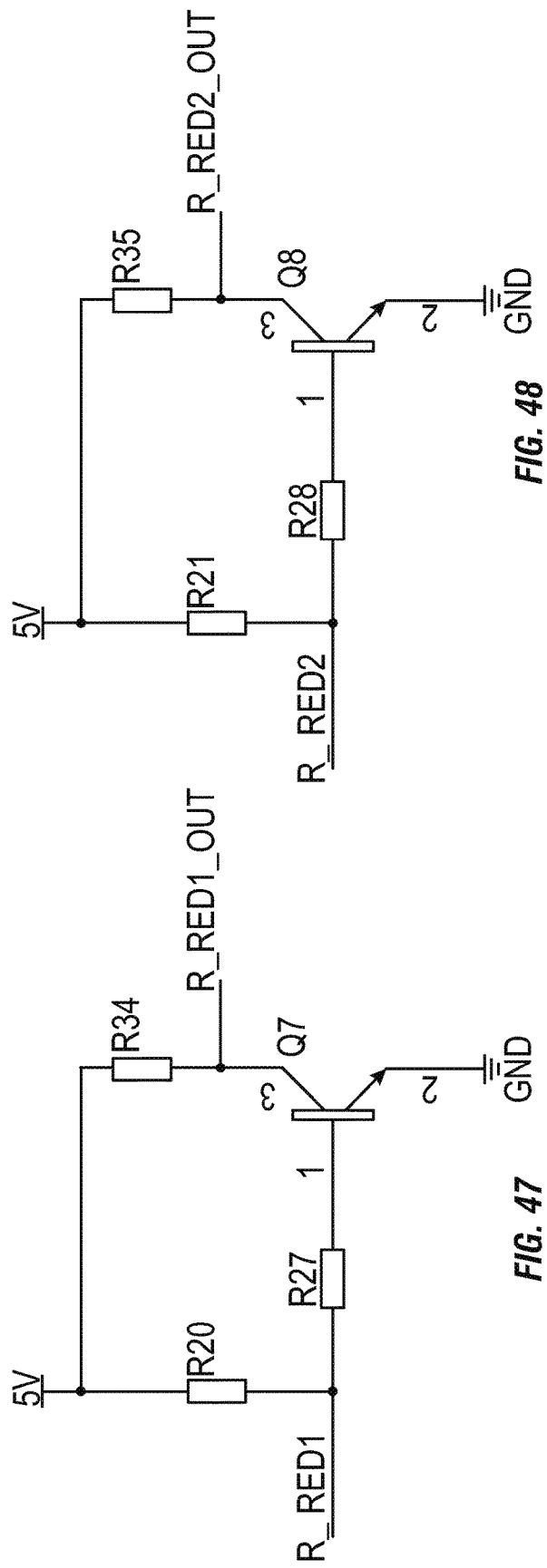
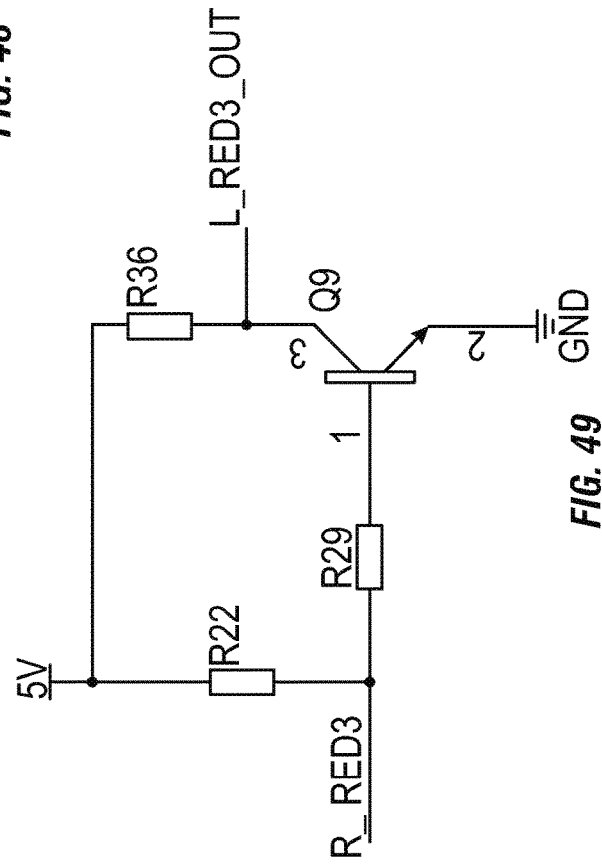
FIG. 48
FIG. 49
FIG. 47

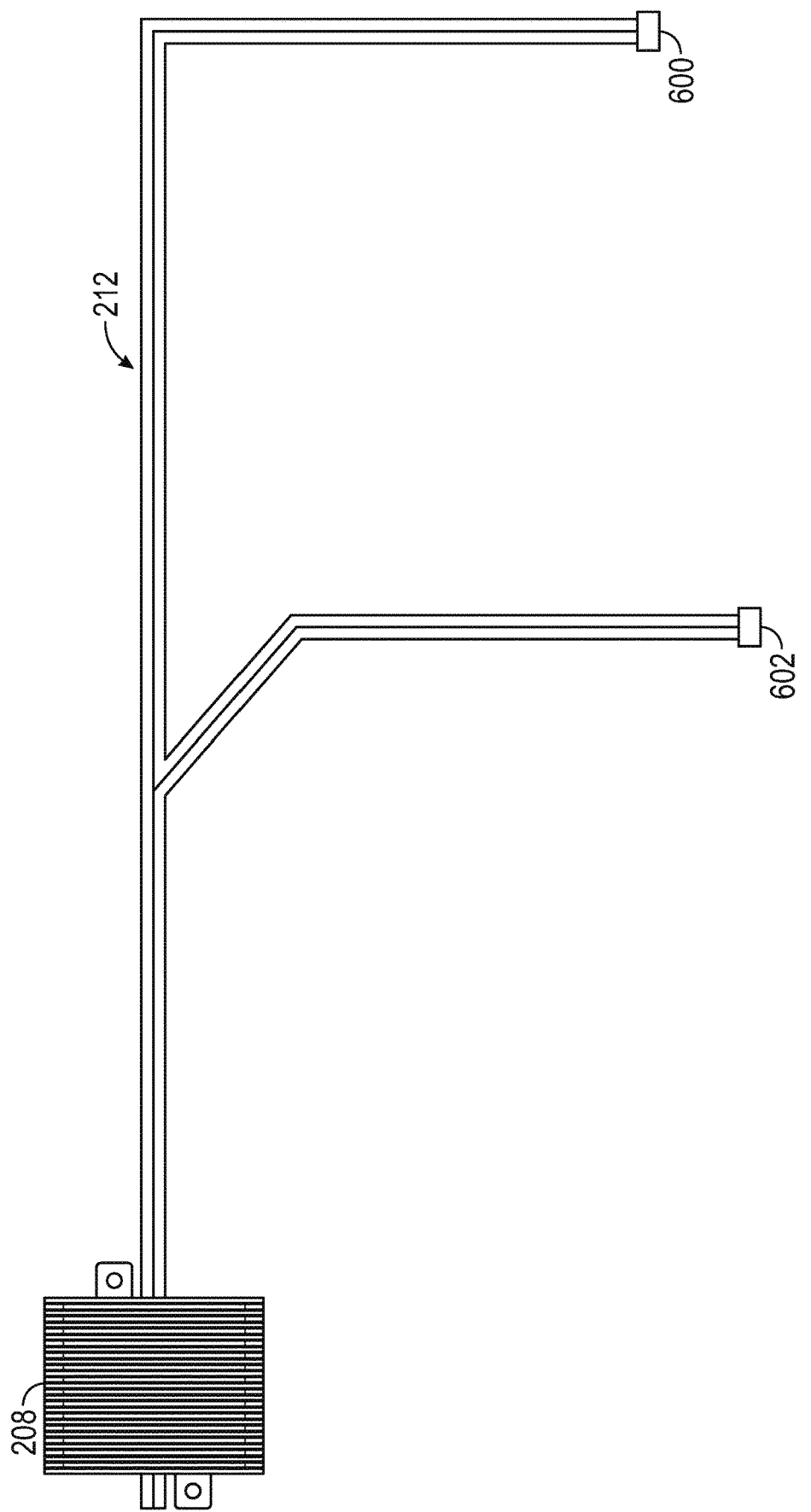

MULTI-SECTION LED LIGHT BAR WITH DRIVER

FIELD OF THE INVENTION

This invention relates to lights. More specifically, and without limitation, this invention relates generally to lighting apparatus(es), system(s), and/or corresponding method(s) of use, manufacture, and/or installation in at least the automobile industry. Even more specifically, and without limitation, this invention relates to a lighting assembly to be used in connection with a vehicle having an electrical system.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Vehicle lights are old and well known. Countless forms of vehicle lights exist, including: headlights, fog lights, tail lights, reverse lights, parking lights, daytime running lights, and turning lights, among countless others. Each type of light or light configuration serves its own unique purpose and provides its own unique advantages.

With improvements in light technology, such as the development of light emitting diodes ("LEDs"), a great variety of accessory lights have been developed. These accessory lights come in a wide array of configurations and provide their own unique functions and advantages.

One common form of an accessory light is known as a light bar. Light bars are designed to fit in the small space between the upper edge of the bumper and the lower edge of the tailgate of a pickup truck and include a long array of lights that are electrically connected to the electrical system of the vehicle. These light bars provide improved illumination and thereby improve visibility when breaking, turning and backing up.

While conventional light bars provide many advantages, they suffer from many disadvantages not solved by the prior art. Traditional light bars often wear out, break down, or degrade over time. Further, traditional light bars often emit electromagnetic interference (EMI), radio-frequency interference (RFI), and/or radio-frequency (RF) emissions. Exposure to RF emissions and/or radio-frequency energy may be harmful to the environment and/or the health of any exposed individuals. Exposure to EMI, RFI, and/or RF emissions by nearby electrical devices and/or components may interfere with and/or disrupt the proper operation of those electrical devices and/or components. Additionally, traditional lights bars often lack proper heat dissipation and often overheat depending on how the light bar is being used. Furthermore, traditional light bars typically are only available as a single bar and lack the ability to include separate portions. Traditional light bars also lack the ability to produce signals other than light-based signals such as auditory signaling. Also, traditional light bars often are difficult to install and/or do not fit seamlessly with a vehicle.

Thus, there exists a need in the art for a lighting assembly for use with a vehicle wherein the assembly is durable and reliable and will function properly over a long period of time.

There also exists a need in the art for a lighting assembly for use with a vehicle that can mitigate potentially harmful RF emissions.

There also exists a need in the art for a lighting assembly for use with a vehicle that provides for proper heat dissipation such as to avoid overheating of the assembly or any underlying components thereof.

There also exists a need in the art for a lighting assembly for use with a vehicle where the assembly includes a light bar that can comprise separate sections to make the light bar more nimble and improve adjustability of the light bar in order to maximize visibility, effectiveness, aesthetic quality, and to improve the ability to safely and effectively attach the light bar to a vehicle.

There also exists a need in the art for a lighting assembly for use with a vehicle that allows for signals to be emitted in addition to traditional light-based signals, such as auditory signals.

There also exists a need in the art for a lighting assembly for use with a vehicle that is easily installed and fits well with the vehicle from both a functional and aesthetic perspective.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to provide a lighting assembly for use with a vehicle wherein the assembly is durable and reliable and will function properly over a long period of time.

It is a further object, feature, and/or advantage of the present invention to provide a lighting assembly for use with a vehicle that can mitigate potentially harmful electromagnetic interference (EMI) such as radio-frequency interference (RFI) and RF emissions.

It is a further object, feature, and/or advantage of the present invention to provide a lighting assembly for use with a vehicle that provides for proper heat dissipation such as to avoid overheating of the assembly or any underlying components thereof.

It is a further object, feature, and/or advantage of the present invention to provide a lighting assembly for use with a vehicle where the assembly includes a light bar that can comprise separate sections to make the light bar more nimble and improve adjustability of the light bar in order to maximize visibility, effectiveness, aesthetic quality, and to improve the ability to safely and effectively attach the light bar to a vehicle.

It is a further object, feature, and/or advantage of the present invention to provide a lighting assembly for use with a vehicle that allows for signals to be emitted in addition to traditional light-based signals, such as auditory signals.

It is a further object, feature, and/or advantage of the present invention to provide a lighting assembly for use with a vehicle that is easily installed and fits well with the vehicle from both a functional and aesthetic perspective.

It is a further object, feature, and/or advantage of the present invention for the lighting assembly to deliver light with desirable and customizable characteristics.

It is a further object, feature, and/or advantage of the present invention to provide the ability for the lighting assembly to be connected to the electrical system of a vehicle to receive signals, commands, and/or information from the electrical system. The assembly can then control and/or manipulate LEDs of the assembly based on the signals, commands, and/or information received from the electrical system of the vehicle. For example, when the vehicle is applying its brakes, the assembly can receive that information from the electrical system of the vehicle and manipulate LEDs of the assembly accordingly as well as emit auditory signals. Further, if the vehicle has engaged its left or right turn signal or is reversing, the assembly can receive that information from the vehicle's electrical system and manipulate the LEDs accordingly as well as emit auditory signals.

The assembly disclosed herein can be used in a wide variety of applications. For example, the lighting assembly disclosed herein is designed so as to be substantially universal to all vehicles, but it can also be customized to be mounted to and operate properly with virtually any make and model of vehicle. Additionally, the portions of the light bar included as part of the assembly can be attached to the vehicle in varying configurations.

It is preferred the apparatus be safe, environmentally-friendly, cost effective, and durable. For example, the lighting apparatus can be adapted to resist excessive thermal transfer, static electricity, and ingress of water, such that the lighting apparatus is substantially weatherproof. The lighting assembly is also preferably durable enough to withstand the elements and debris from the road without failing (e.g., cracking, crumbling, shearing, creeping) due to excessive and/or prolonged exposure to impacts and/or tensile, compressive, and/or balanced forces acting on the lighting assembly and/or its mounts. Additionally, the lighting assembly disclosed herein includes means for mitigating EMI, RFI, and/or RF emissions thereby improving the safety and environmental friendliness over the prior art, and also preventing interference with other nearby devices.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

Methods can be practiced which facilitate use, manufacture, assembly, maintenance, installation, and repair of the lighting assembly which accomplish some or all of the previously stated objectives.

The lighting assembly can be incorporated into systems, kits, and/or larger designs which accomplish some and/or all of the previously stated objectives.

According to some aspects of the present disclosure, a lighting assembly for use with a vehicle, comprises an electronic control unit (ECU), said ECU comprising an ECU circuit board; a light bar comprising a left side and a right side, wherein said light bar is manipulated by the ECU; wherein the left side of the light bar comprises a left-side circuit board housed within a left-side housing; wherein the right side of the light bar comprises a right-side circuit board housed within a right-side housing; wherein one of the left-side or right-side circuit boards comprises a section of white LEDs and a first section of red LEDs and the other comprises a second section of red LEDs; wherein the light bar is configured such that the section of white LEDs is configured to be positioned between the first and second sections of red LEDs.

According to at least some aspects of some embodiments disclosed, the ECU is housed within an ECU box.

According to at least some aspects of some embodiments disclosed, the ECU box, left-side housing, and right-side housing are attached to the vehicle.

According to at least some aspects of some embodiments disclosed, the assembly is configured to be able to produce an auditory noise.

According to at least some aspects of some embodiments disclosed, the left-side circuit board comprises the section of white LEDs and the first section of red LEDs, and the section of white LEDs and the first section of red LEDs are positioned side-by-side on the left-side circuit board such that they are on the same horizontal plane.

According to at least some aspects of some embodiments disclosed, the right-side circuit board comprises the second section of red LEDs.

According to at least some aspects of some embodiments disclosed, the right-side housing and left-side housing are positioned side-by-side on the vehicle such that the section of white LEDs and the first and second sections of red LEDs are all on the same horizontal plane.

According to at least some aspects of some embodiments disclosed, the assembly is operationally connected to the electrical system of the vehicle and each section of LEDs is manipulated based on how the vehicle is driven.

According to at least some aspects of some embodiments disclosed, the first and second sections of red LEDs are illuminated when the vehicle is braking.

According to at least some aspects of some embodiments disclosed, the section of white LEDs is illuminated when the vehicle is reversing.

According to at least some aspects of some embodiments disclosed, the first section of red LEDs flashes when the vehicle turns ON its left-hand turn signal.

According to at least some aspects of some embodiments disclosed, the second section of red LEDs flashes when the vehicle turns ON its right-hand turn signal.

According to at least some aspects of some embodiments disclosed, the first and second sections of red LEDs each comprise one or more blocks of LEDs.

According to at least some aspects of some embodiments disclosed, the assembly mitigates EMI, RFI, and/or RF emissions.

According to at least some aspects of some embodiments disclosed, a method of manufacturing a vehicle light bar, comprises positioning an ECU circuit board within an ECU box; positioning a left-side circuit board within a left side of a light bar housing; positioning a right-side circuit board within a right side of the light bar housing; wherein one of the left-side or right-side circuit boards comprises a section of white LEDs and a first section of red LEDs and the other comprises a second section of red LEDs; wherein the left and right sides of the light bar housing are not structurally connected.

According to at least some aspects of some embodiments disclosed, the method further comprises operationally connecting the ECU circuit board to the left-side circuit board and the right-side circuit board.

According to at least some aspects of some embodiments disclosed, the method further comprises operationally connecting the ECU circuit board to the electrical system of the vehicle such that the ECU circuit board may receive signals, commands, and/or information from the electrical system of the vehicle and control the left-side and right-side circuit boards based on those signals, commands, and/or information.

According to at least some aspects of some embodiments disclosed, each of the right-side circuit board and left-side circuit board have a copper layer, insulation layer, and aluminum base to dissipate heat.

According to at least some aspects of some embodiments disclosed, the method further comprises positioning the ECU circuit board within the ECU box such that a heat conductive insulation sheet is positioned between the ECU circuit board and the ECU box.

According to at least some aspects of some embodiments disclosed, a lighting assembly for use with a vehicle, comprises an electronic control unit (ECU), said ECU comprising an ECU circuit board; a light bar comprising a left side and a right side, wherein said light bar is manipulated by the ECU; wherein the left side of the light bar comprises a left-side circuit board housed within a left-side housing; wherein the right side of the light bar comprises a right-side circuit board housed within a right-side housing; wherein the left side and right side of the light bar are not structurally connected.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

FIG. 1A is a perspective view of an exemplary clip/bracket for use with the lighting assembly presented herein according to some aspects of the present disclosure. The clip/bracket is configured to attach to the body of a vehicle using adhesive and/or a fastener. The clip/bracket includes a back wall that is generally planar in shape and includes opposing arms positioned in each corner of the back wall that extend upward therefrom, the arms include a feature positioned at the outward end of opposing arms that extend toward one another, this feature is configured to grip onto the light bar when the light bar is forced between the opposing arms thereby holding the light bar within the clip, the outward ends of the arms also include a guiding surface that angles toward the open interior of the clip that is configured to guide the light bar between opposing arms, according to some aspects of the present disclosure.

FIG. 1B is an elevation view of the exemplary clip/bracket shown in FIG. 1A, the view taken from the top surface of the clip, according to some aspects of the present disclosure.

FIG. 1C is an elevation view of the exemplary clip/bracket shown in FIGS. 1A and 1B, the view taken from the side surface of the clip/bracket, the view showing the arms extending upward a distance from the back wall, according to some aspects of the present disclosure.

FIG. 1D is an elevation view of the exemplary clip/bracket shown in FIGS. 1A, 1B, and 1C, the view taken from the end of the clip/bracket, the view showing the distance between opposing arms that extend upward a distance from the back wall; the view showing the feature positioned at the outward end of opposing arms that extend toward one another, this feature is configured to grip onto the light bar when the light bar is forced between the opposing arms thereby holding the light bar within the clip/bracket, the view also shows the guiding surface positioned at the outward ends of the arms that angles toward the open interior of the clip/bracket that is configured to guide the light bar between opposing arms, according to some aspects of the present disclosure.

FIG. 7 is a perspective view of an exemplary lighting assembly according to some aspects of the present disclosure.

FIG. 8 is a zoomed in view of an exemplary bracket washer, bracket split washer, and bracket bolt of the lighting assembly disclosed herein according to some aspects of the present disclosure.

FIG. 9 is an elevation view of the exemplary lighting assembly shown in FIG. 7, the view taken from underneath the exemplary assembly.

FIG. 21A is a perspective view of an exemplary center cap according to some aspects of the present disclosure.

FIG. 21B is an elevation view of a top of the exemplary center cap shown in FIG. 21A.

FIG. 21C is an elevation view of a front of the exemplary center cap shown in FIG. 21A.

FIG. 21D is an elevation view of a side of the exemplary center cap shown in FIG. 21A.

FIG. 24 is a schematic view of an exemplary circuit board to be housed within a portion of the housing of the light bar according to some aspects of the present disclosure. The exemplary circuit board shown in FIG. 24 may be a left-side circuit board to be housed within the left side of the light bar.

FIG. 25A is a zoomed in view of a portion of the exemplary circuit board shown in FIG. 24 that includes a portion of left third red block 410.

FIG. 25B is a zoomed in view of a portion of the exemplary circuit board shown in FIG. 24 that includes a portion of left third red block 410.

FIG. 26A is a zoomed in view of a portion of the exemplary circuit board shown in FIG. 24 that includes a portion of left second red block 408.

FIG. 26B is a zoomed in view of a portion of the exemplary circuit board shown in FIG. 24 that includes a portion of left second red block 408.

FIG. 27A is a zoomed in view of a portion of the exemplary circuit board shown in FIG. 24 that includes a portion of left first red block 406.

FIG. 30B is a zoomed in view of a portion of the exemplary circuit board shown in FIG. 29 that includes a portion of right first red block 412.

FIG. 31A is a zoomed in view of a portion of the exemplary circuit board shown in FIG. 29 that includes a portion of right second red block 414.

FIG. 31B is a zoomed in view of a portion of the exemplary circuit board shown in FIG. 29 that includes a portion of right second red block 414.

FIG. 43 is a detailed schematic showing an exemplary portion of the circuitry involved in the lighting assembly, including an exemplary portion of the ECU/driver circuit board, according to some aspects of the present disclosure.

FIG. 44 is a detailed schematic showing an exemplary portion of the circuitry involved in the lighting assembly, including an exemplary portion of the ECU/driver circuit board, according to some aspects of the present disclosure.

FIG. 45 is a detailed schematic showing an exemplary portion of the circuitry involved in the lighting assembly, including an exemplary portion of the ECU/driver circuit board, according to some aspects of the present disclosure.

FIG. 46 is a detailed schematic showing an exemplary portion of the circuitry involved in the lighting assembly, including an exemplary portion of the ECU/driver circuit board, according to some aspects of the present disclosure.

FIG. 47 is a detailed schematic showing an exemplary portion of the circuitry involved in the lighting assembly, including an exemplary portion of the ECU/driver circuit board, according to some aspects of the present disclosure.

FIG. 48 is a detailed schematic showing an exemplary portion of the circuitry involved in the lighting assembly, including an exemplary portion of the ECU/driver circuit board, according to some aspects of the present disclosure.

FIG. 49 is a detailed schematic showing an exemplary portion of the circuitry involved in the lighting assembly, including an exemplary portion of the ECU/driver circuit board, according to some aspects of the present disclosure.

FIG. 61A is an elevation view from above showing an exemplary configuration of the ECU-light bar wiring.

FIG. 62E is an elevation view showing an exemplary wiring tool to be used with the ECU-vehicle wiring.

FIG. 62F is an elevation view showing another exemplary wiring tool to be used with the ECU-vehicle wiring.

Figure 2:
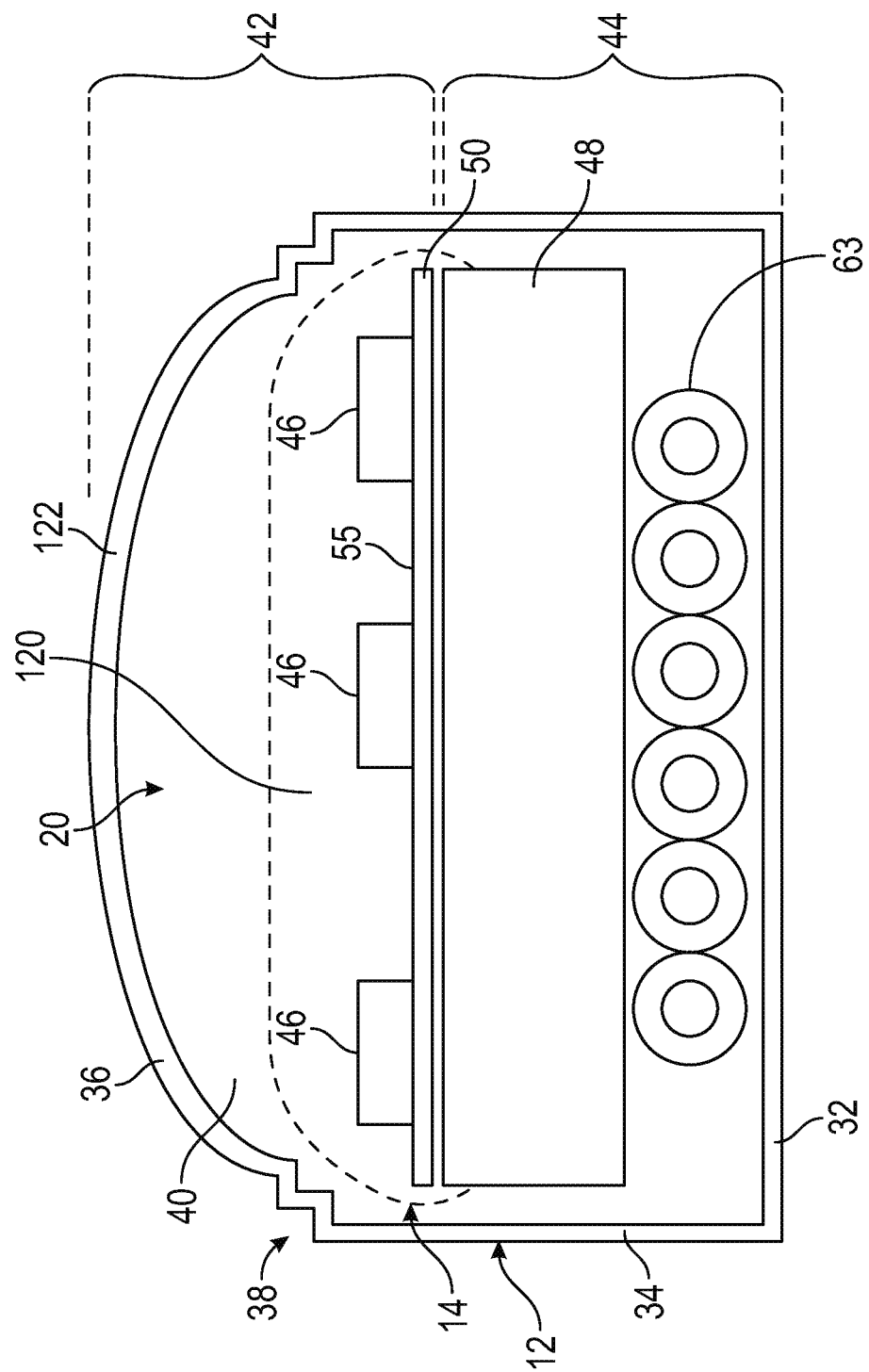
FIG. 2 is an elevation view of a side cut away of an exemplary assembled housing of the light bar, the view showing the housing having a back wall, opposing side walls and a cover with a pair of right angled steps that serve as features positioned between the cover and the sidewalls, the view showing the circuit board formed of a backing material, circuitry layer, and LEDs positioned within the hollow interior of the housing, the view showing the ribbon wire extending below the backing material of the circuit board, the view showing the first layer of encapsulant encapsulating the outward facing surface of the circuit board including the three rows of LEDs, the view also showing the second layer of encapsulant that essentially fills all the remaining space within the hollow interior of the housing thereby fully encapsulating the circuit board and all other components positioned within the hollow interior of the housing, according to some aspects of the present disclosure.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Referring now to the figures, a bracket/clip 28 is shown in FIGS. 1A-1D. The bracket/clip 28 shown in FIGS. 1A-1D may be those that are disclosed in U.S. Pat. No. 11,022,268 or in U.S. Pat. No. 10,859,229, which are both hereby incorporated by reference in their entirety. The bracket/clip 28 shown in FIGS. 1A-1D can be used to attach a light bar 10 of the lighting assembly to a vehicle. The bracket/clip 28 can be attached to a vehicle by any reasonable means, including but not limited to, screws, nuts and bolts, drilling, fasteners, adhesives, ties, friction fit, and the like. The light bar 10, which includes a housing, and/or portions of the light bar 10 can then be inserted into the bracket/clip 28 to facilitate effective attachment of the light bar 10 or portions thereof to the vehicle.

Bracket/clip 28 is formed of any suitable size, shape and design and is configured to connect generic housing 12 of the light bar 10 to a vehicle. In one arrangement, as is shown, bracket/clip 28 has a back wall 100 that extends between opposing end walls 102 and opposing sidewalls 104. Back wall 100 has a generally flat forward face 106 and a generally flat rearward face 108 that form planes that extend in approximate parallel spaced relation to one another. Opposing sidewalls 104 extend in approximate parallel spaced relation to one another and opposing end walls 102 extend in approximate parallel spaced relation to one another. As such, sidewalls 104 and end walls 102 extend in approximate perpendicular alignment to one another thereby forming a generally rectangular member.

A pair of opposing arms 110 are connected to each end of bracket/clip 28. Arms 110 are connected to sidewalls 104 and extend upward a distance from forward face 106. The outward edge of arm 110 is in planar alignment with sidewall 104. The outward end of arm 110 is in alignment with end wall 102 and extends inward a distance therefrom. Arms 110 include a locking feature 112 positioned at their outward most end. Locking features 112 are formed of any suitable size, shape and design and are designed to engage and lock housing 12 into bracket/clip 28. In one arrangement, locking features 112 are formed of a step or ledge or hook that matingly engage the feature 38 of the light bar 10 or step in the exterior surface of housing 12 positioned at the intersection of cover portion 36 and sidewalls 34. In the arrangement shown, when bracket/clip 28 is viewed from the end 102, locking features 112 on opposing arms 110 extend inward and over the forward face 106 of back wall 100 a distance. Accordingly, to facilitate locking engagement, arms 110 extend upward from forward face 106 approximately the same distance as sidewall 34 of housing 12.

To further facilitate a firm, durable and strong connection between bracket/clip 28 and housing 12, arms 110 are slightly biased inward toward one another. This causes the distance between the outward ends of arms 110 to be slightly narrower than the width of housing 12. As such, when housing 12 is placed between opposing arms 110 and locked into place an inward force is applied on housing 12 by arms 110. This helps to hold housing 12 within bracket/clip 28. This also helps to keep engagement between locking feature 112 of arm 110 and the feature 38 of housing 12.

Due to the slight inward bias of the arms 110 of clip 28, the outward most ends of arms 110 include a curved or angled guiding surface 114. Guiding surface 114 helps to guide the housing 12 into the space between opposing arms 110. In the arrangement shown, guiding surface 114 curves or angles inward from the upper most end of arms 110 down to the step of locking feature 112. This causes the upper ends of guiding surface 114 to be wider than the width of back wall 32 of housing 12, while the lower end of guiding surface 114 is narrower than the width of back wall 32 of housing 12. This causes the arms 110 to flex or bend outward as the light bar 10 is forced within the clip 28.

The rearward face 108 of back wall 100 is flat and thereby provides maximum surface area for connection to the body of vehicle. This allows for the use of an adhesive, such as a double-sided tape or foam or gel to be positioned between the rearward face 108 of bracket/clip 28 and the body of vehicle. Using adhesive eliminates the need to put screws or bolts into the body of vehicle, simplifies the installation process, speeds the installation process, eliminates the need to use tools to install the brackets/clips 28 and provides a durable installation.

Despite that the installation process uses adhesives instead of drilling and screwing, back wall 100 includes an opening 116 therein that facilitates reception of a screw or other fastening device therein if the installer chooses to use a fastener. In one arrangement, to ensure the head of the screw does not protrude, the opening 116 is countersunk. That is, the walls of the opening angle inward as they extend from forward face 106 to rearward face 108.

Figure 3:
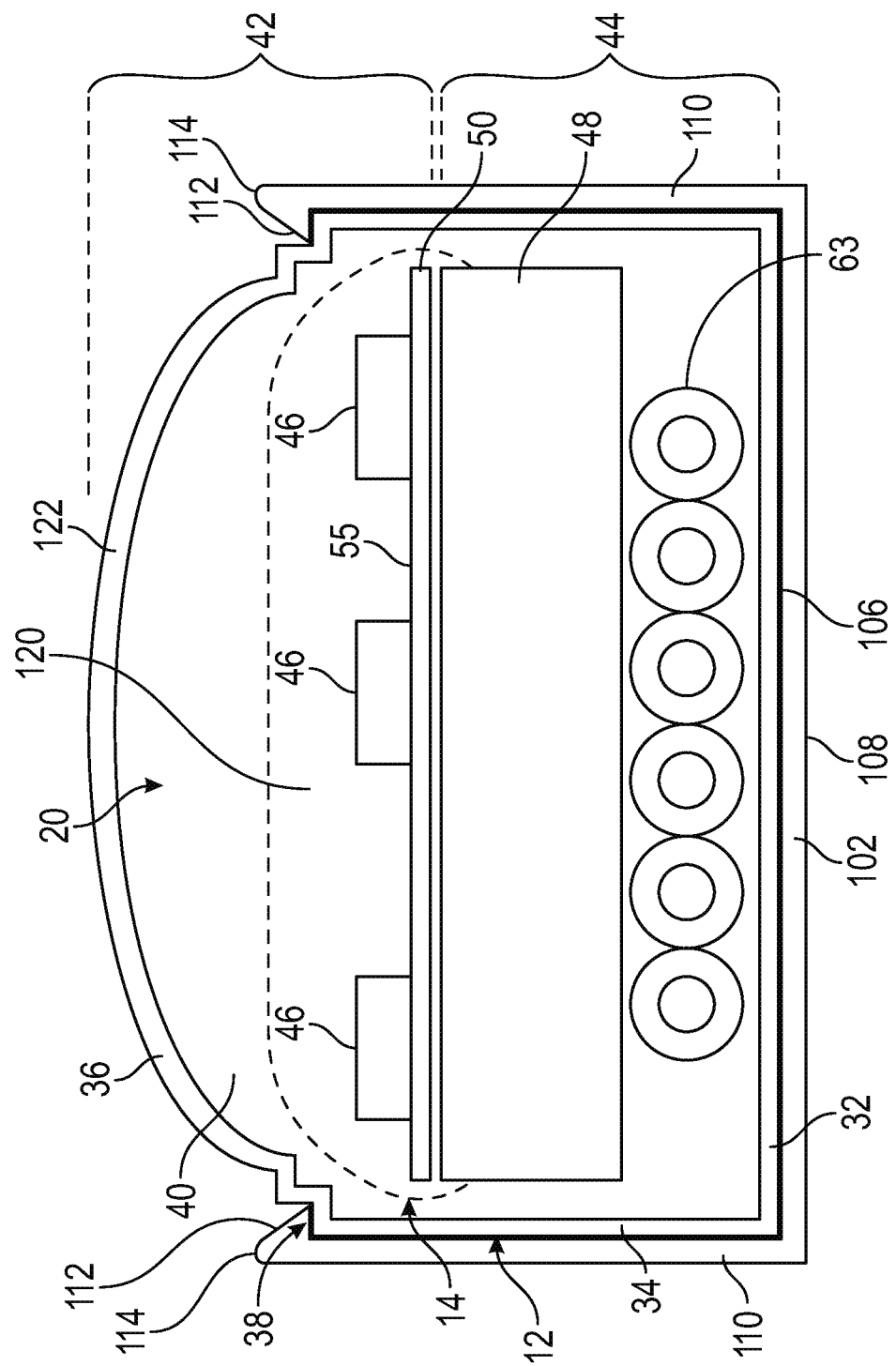
FIG. 3 is a side elevation view of a side cut away of the exemplary assembled housing of the light bar of FIG. 2, the view showing the addition of the clip/bracket shown in FIGS. 1A-1D attached to the exterior of the housing, the view showing the features of the arms of the clip connected to and holding onto the features of the housing positioned between the sidewalls of the housing and the cover of the housing, the view showing the interior surface of the sidewalls of the arms in approximately flat and flush engagement with the exterior surface of the sidewalls of the housing, the view showing the exterior surface of the back wall of the housing in approximately flat and flush engagement with the forward surface of the back wall of the clip/bracket, according to some aspects of the present disclosure.

FIG. 2 shows a generic housing 12 wherein a generic circuit board 14 can be housed within the housing 12. FIG. 3 shows the housing 12 positioned within a bracket/clip 28. Generic housing 12 is formed of any suitable size, shape and design and is configured to house some electrical components of the lighting assembly 10. In one arrangement, housing 12 is an elongated hollow member that extends a length between opposing ends that are closed by end caps of the light bar. Housing 12 includes a back wall 32 that is generally flat and planar in shape when viewed from the side. The upper and lower edges of back wall 32 that extend the length of housing 12 connect to opposing sidewalls 34. Like back wall 32, sidewalls 34 are generally flat and planar in shape. Opposing sidewalls 34 connect at their rearward edges to the upper and lower edges of back wall 32 and extend in approximate parallel spaced alignment to one another. Sidewalls 34 extend in approximate perpendicular alignment to back wall 32. This arrangement, with the generally planar and perpendicular alignment of the back wall 32 and side walls 34 form a generally rectangular space between the back wall 32 and opposing side walls 34, as can be seen from the side cut away view of FIGS. 2 and 3.

The forward edges of sidewalls 34 connect to a cover portion 36 of housing 12. In the arrangement shown, cover portion 36 has a generally smooth and curved exterior surface that connects at its upper and lower edges to the forward edges of sidewalls 34. In the arrangement shown, cover portion 36 has a convex exterior surface, and a concave interior surface, which helps to shed water, dirt and contaminants off of the housing. However, any other size, shape and design is contemplated for use as cover portion 36, including a flat and square shape, a peaked shape, a concave shape or any other shape.

In one arrangement, as is shown, one or more features 38 are positioned at the intersection or connection point between sidewalls 34 and cover portion 36. Features 38 are formed of any suitable size, shape and design and are configured to support the engagement between and connection of bracket/clip 28 to housing 12 and to facilitate a strong and durable hold there between while also facilitating selective removal of housing 12 from bracket/clip 28. As one example, as is shown FIGS. 2 and 3, features 38 include a first step or ledge positioned between the exterior surface of sidewalls 34 and where cover portion 36 connects to sidewalls 34. In this arrangement, the first step of features 38 include a small generally planar portion that extends in approximate parallel spaced relation to back wall 32 which serves as a connection point for bracket/clip 28 to hold on to and secure housing 12, as can be seen in FIG. 3. That is, in the arrangement shown, the first step of features 38 is a small generally right angle notch or step between sidewall 34 and cover portion 36 when viewed from the side as can be seen in FIGS. 2 and 3. Also, in the arrangement shown, a second step is also positioned just above the first step of features 38 and is configured in a similar manner. That is, in the arrangement shown, the second step of features 38 is a small generally right angle notch or step between sidewall 34 and cover portion 36 that connects at its lower or outward side to the first step of features and connects at its upper or outward side to cover portion 38 when viewed from the side as can be seen in FIGS. 2 and 3. In the arrangement wherein more than one step is present in features 38, bracket/clip 28 may connect to only one of the steps or both of the steps. Any number of steps is hereby contemplated for use as features 38 such as none, one, two, three, four or more. Alternatively, any other size, shape and design for features 38 is hereby contemplated for use, such as a hook, a concave recess that is recessed inward toward back wall 32, a protrusion or any other shaped feature 38, which in some configurations or applications may provide a more affirmative and durable connection between bracket/clip 28 and housing 12.

The connection of back wall 32, sidewalls 34, and cover portion 36 define a hollow interior 40 there between which houses and holds generic circuit board 14 therein. In one arrangement, housing 12 is formed of a single monolithic piece or extrusion and therefore the features, size, and shape of housing 12 extend the length of housing 12. In other embodiments, the housing can be composed of one or more portions of housing having the characteristics as described herein wherein one or more circuit boards may be positioned within each portion of the housing. Being formed of a single piece reduces the number of parts, simplifies the manufacturing process in many ways (and complicates it in other ways) and provides enhanced water proofing and contaminant protection as there are no seams or connection points for infiltration of water or contaminants into the hollow interior 30 of housing 12. As such, the hollow interior 40 of housing 12 serves as a complete or as close to a complete shield to water and contaminants as is possible. This arrangement provides enhanced water and contaminant protection for the components positioned within the hollow interior 40 of housing 12. To provide further protection, the components positioned within the hollow interior 40 of housing 12 are encapsulated in an encapsulant 20 as is further described herein. Having a consistent size and shape throughout the length of housing 12 facilitates easier installation as bracket/clip 28 can be positioned along any portion of housing 12 and the components can be inserted into hollow interior 40 of housing 12 from either end, and these components may be slid along the length of hollow interior 40 of housing 12 during installation.

In the arrangement shown, generic housing 12 includes a transparent portion 42 and a non-transparent portion 44. In one arrangement, the back wall 32 and the sidewalls 34 or only the rearward portions of sidewalls 34 of housing 12 are painted with a black or dark or non-transparent paint which is placed on the exterior and/or the interior of housing 12. Alternatively, these portions of housing 12 (back wall 32 and all or a portion of sidewalls 34) are formed of a black or dark or non-transparent material that prevents or reduces light transmission there through. In this arrangement, the cover portion 36 and the forward portions of sidewalls 34 of housing 12 are formed of a clear, transparent, translucent or other material that allows light to be transmitted there through. In one arrangement, the color black has been tested with success as it reduces the appearance of the assembly 10 when installed on a vehicle. In the arrangement where the back wall 32 and sidewalls 34 and the cover portion 36 are formed of different colored materials, the back wall 32 and sidewalls 34 are manufactured as a single unitary piece of two different colored materials or two materials with different colors and light-transmission properties, such as a co-extrusion process or the like so as to form a single unitary and simultaneously manufactured piece without seams or other areas where water or contaminants can infiltrate the housing 12.

In an alternative arrangement, housing 12 is formed of multiple pieces. In one arrangement, a back portion or non-transparent portion 44, connects to a front portion or transparent portion 42 along a connection point or seamline that is glued, welded, adhered or connected in any other suitable way to one another. In this arrangement, the back portion or non-transparent portion 44 is formed of a black or dark or non-transparent material or is painted with a black or dark or non-transparent paint, whereas the front portion or transparent portion 42 is formed of a transparent or translucent material that allows light to be transmitted there through. In one arrangement, the back portion or non-transparent portion 44 is formed of the back wall 32 and the entirety of the sidewalls 34 which connect to the cover portion 36 at the outward ends of sidewalls 34. In another arrangement, the back portion or non-transparent portion 44 is formed of the back wall 32 and a portion of the sidewalls 34 which connect to the cover portion 36 which includes a portion of the sidewalls 34 and as such, sidewalls 34 connect to one another along a seamline where the back portion of the sidewalls 34 are part of the nontransparent portion 44 and the forward portion of the sidewalls 34 are part of the transparent portion 42. Any other suitable configuration is hereby contemplated for use.

As is shown in FIGS. 2 and 3, a generic circuit board 14 may be positioned within the housing 12 of the light bar 10. Circuit board 14 is formed of any suitable size, shape and design and is configured to house a plurality of light emitting diodes 46 ("LEDs") thereon and facilitate selective illumination of the LEDs 46. In one arrangement, as is shown, circuit board 14 is formed of a backing material 48 and a circuitry layer 50.

Backing material 48 is formed of any suitable size, shape and design and serves to provide support to circuitry layer 50 as well as serve heat dissipation purposes. In one arrangement, backing material 48 is formed of a metallic material, such as aluminum, copper, an aluminum alloy, a copper alloy, or any other metallic material, rigid material and/or material that provides for support and/or heat dissipation. In an alternative arrangement backing material 48 is formed of a non-metallic material. The backing material 48 may also act as a shield to mitigate EMI, RFI, and/or RF emissions.

Backing material 48 provides structural support for circuitry layer 50 as well as heat dissipation. That is, when circuitry layer 50 is connected to backing material 48 and backing material 48 is formed of a material with a high coefficient of diffusivity (such as aluminum, an aluminum alloy, copper, a copper alloy, or another alloy material) backing material 48 helps to absorb and diffuse heat generated by LEDs 46. To maximize space utilization within the hollow interior 40 of housing 12, backing material 48 is relatively thick, and substantially thicker than circuitry layer 50, and backing material 48 fits within the hollow interior 40 of housing 12 within relatively close and tight tolerances. In the arrangement shown, when viewed from the side, backing material 48 is generally rectangular in shape with an opposing back wall and forward wall that approximate the size of or are slightly the size of the interior surface of back wall 32 of housing 12 and are positioned in approximate parallel planar spaced relationship with one another; and similarly backing material 48 has a pair of opposing sidewalls that extend a portion of the interior surface of sidewalls 34. The width of backing material 48 is slightly smaller than the width between the interior surfaces of opposing sidewalls 34 of housing 12 so as to facilitate insertion of backing material 48 into the hollow interior 40 of housing 12. The height of backing material 48 is smaller than the height of the interior surfaces of sidewalls 34 so as to provide room for ribbon wire 63 behind backing material 48 as well as to provide room for circuitry layer 50 and LEDs 46 on top of backing material 48. Maximizing the size of backing material 48 within the hollow interior 40 of housing 12, while providing ample room for the other components of the system 10 maximizes heat diffusion and structural rigidity provided by backing material 48.

Circuitry layer 50 is formed of any suitable size, shape, and design and provides the electrical connection between the electrical components of the assembly 10. In one arrangement, circuitry layer 50 includes the electrical leads and traces that connect and interconnect the electrical components of assembly 10 including LEDs 46, ribbon wire 63 and ECU/driver box 208. Circuitry layer 50 may be formed of multiple layers itself so as to provide electrical isolation between the many electrical leads therein.

While backing material 48 and circuitry layer 50 are described as separate components in one arrangement they may be formed as a single component, or alternatively they may be formed of separate components. That is, circuitry layer 50 may be manufactured separately and then applied to backing material 48. Alternatively, circuitry layer 50 may be formed onto and/or into backing material 48. In some embodiments backing material 48 and circuitry layer 50 may be formed as integral to the circuit board 14.

Generic circuit board 14 is formed of any suitable size, shape, and design and is configured to house, hold and provide the electrical connections for LEDs 46. In the arrangement shown, circuit board 14 includes three rows of densely packed LEDs 46 that extend a length or the entire length between end caps of the light bar within the hollow interior 40 of housing 12. This may include zero or more blocks and/or rows of red LEDs, zero or more blocks and/or rows of white LEDs, zero or more blocks and/or rows of amber LEDs, zero or more blocks and/or rows of blue LEDs, and/or zero or more blocks and/or rows of any other color of LEDs. Any suitable configuration of LEDs on the circuit board 14 is hereby contemplated for use such as rows, blocks, individual LEDs, and/or any other arrangement.

To provide independent control of various portions of light bar system 10, circuit board 14 can be electrically separated into a plurality of segments/blocks wherein separate segments/blocks allow for independent control of each segment/block. Separate segments/blocks can be independently illuminated as well as simultaneously illuminated. The ECU/driver box 208 can illuminate particular portions of the light bar 10 for braking, reversing, and/or for the turning signal.

To reduce the appearance of the light bar 10 when installed, the exterior facing surface 55 of circuit board 14 can be a dark or black color. This dark or black color reduces the visibility of the light bar 10 when installed thereby improving the aesthetic appearance of the light bar 10.

Further, according to some aspects of the present disclosure, the LEDs used in the assembly 10, such as LEDs 46 of FIGS. 2 and 3, can be Chip-On-Board (COB) LEDs, and/or they can also be surface mount technology (SMT) LEDs. COB LED technology describes the mounting of a bare LED chip in direct contact with the substrate to produce LED arrays. It is a method of LED packaging which has a number of advantages over traditional surface mount technologies such as the use of "T-pack" and Surface mount LEDs.

Due to the small size of the LED chip, Chip-on-Board technology allows for a much higher packing density than surface mount technology. This results in higher intensity & greater uniformity of light for the user.

COB light source can save about 30% cost in the application, mainly including LED package cost, light engine production costs, and the secondary light distribution costs, which is of great significance for many applications. In performance, through the rational design and micro-lens molding, a COB light module can avoid the defects of point and glare light and other deficiencies of prior art LEDs. COB modules make the production of lighting simpler and more convenient and reduce costs effectively. In production, existing technology and equipment can support high yield and large-scale COB module manufacturing, assembly and installation. As such, the use of COB LEDs provides many advantages including brighter illumination and an appearance of a single continuous light instead of a plurality of individual lights.

Figure 4:
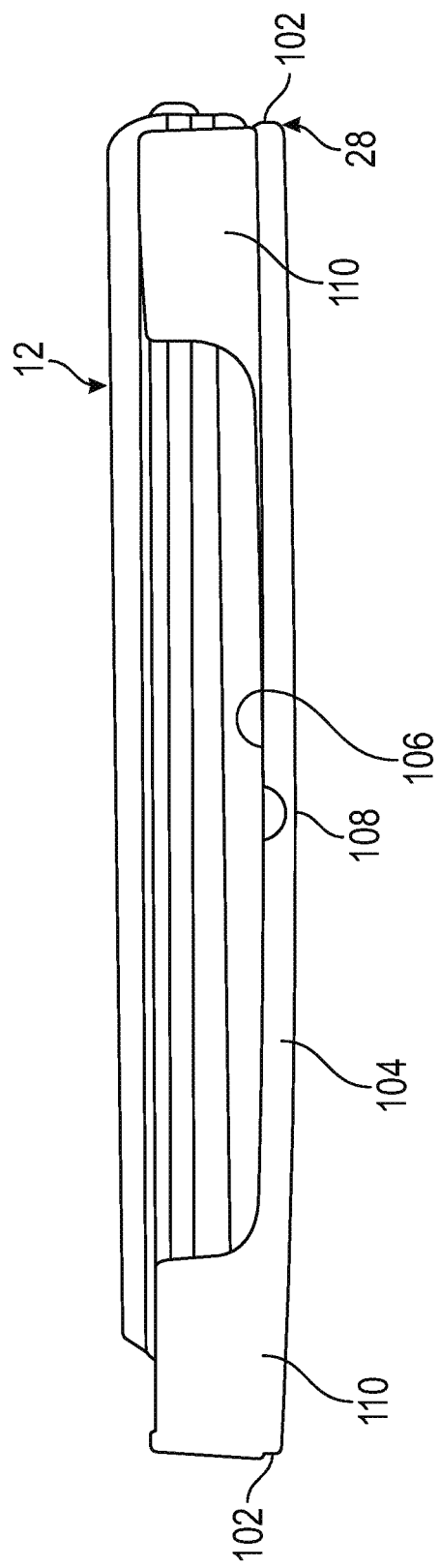
FIG. 4 is a perspective view of the exemplary clip/bracket of FIGS. 1A-1D wherein a portion of the housing of the light bar is shown installed within the clip/bracket, according to some aspects of the present disclosure.

FIG. 4 shows the generic housing 12 of the light bar 10 positioned within a bracket/clip 28. One or more brackets/clips 28 may be used to secure the light bar 10. FIGS. 1-4 provide description for installation of the light bar 10. While many different manners of installation are contemplated, according to some aspects of the present disclosure, the assembly 10 is installed by first placing adhesive on the rearward face 108 of a plurality of brackets/clips 28. In one arrangement, the brackets/clips 28 are then adhered to the body of vehicle. Once the clips 28 are installed on the vehicle, the housing 12 is aligned with the brackets/clips 28 and the housing 12 is forced into the clips 28. Alternatively, the clips 28 are installed onto the housing 12 and then the housing 12 and clips 28 are simultaneously installed onto the body of the vehicle.

When the housing 12 is forced into the brackets/clips 28, the back wall 32 of housing 12 engages the upper or outward end of the guiding surface 114 of arms 110 of brackets/clips 28. As the guiding surfaces 114 angle inward and because the arms 110 are angled slightly inward, force is applied causing the arms 110 to elastically bend outward as the housing 12 is forced downward between opposing arms 110. The arms 110 continue to bend outward until the ledge or step of features 112 of bracket/clip 28 passes or engages the step or features 38 of housing 12. At this point the locking features 112 of arms 110 engage or lock onto the step or features 38 of housing 12 thereby locking the housing 12 within the bracket/clip 28 with a strong and durable connection. In this position, the flat back wall 32 of housing 12 is in flat and flush engagement with the forward face 106 of the flat back wall 100 of bracket/clip 28. In this position, the exterior surface of sidewalls 34 of housing 12 are in flat and flush engagement with the interior faces of arms 110 of bracket/clip 28. In this position, the lower surface of features 112 in the end of arms 110 are in flat and flush locking engagement with the upper surface of the features 38 of the housing 12.

Once the housing 12 is installed, the circuit board(s) housed within the housing 12 can be operationally connected to the circuit board(s) housed within the ECU/driver box, which can be operationally connected to the electrical system of the vehicle. Once electrically connected, the ECU/driver box 208 and its respective circuit board(s) can receive power and operational signals from the electrical system of the vehicle. The circuit board(s) 403 housed within the ECU/driver box 208 can then interpret the signals received from the electrical system of the vehicle and generate and send operational instructions to the light bar 10 to control and/or manipulate the light bar 10.

According to some embodiments wherein the light bar 10 comprises a single light bar rather than comprising separate portions of a light bar 10, the light bar 10 can be manufactured in two lengths, 60 inches or 48 inches. The use of these two lengths facilitates use on practically all commercially available pickup trucks. Any other length is hereby contemplated for use. The light bar has a depth approximately ⅜ of an inch without the bracket/clip 28 and approximately ½ of an inch with the bracket/clip 28 installed. The light bar 10 has a height of approximately ⅝ of an inch without the bracket/clip 28 and ¾ of an inch with the bracket/clip 28 installed. In one arrangement, the brackets/clips 28 are approximately 3 and ¼ inches long. Any other depth and/or width is hereby contemplated for use.

FIGS. 1-4 provide description for method of manufacture. According to some aspects of the present disclosure, the assembly 10 is manufactured in the following manner.

The housing 12 is extruded of a clear plastic material and the back wall 32 and the rear portions of the sidewalls 34 (nontransparent portion 44) are painted with a dark or black color. Alternatively, the housing 12 is extruded and the nontransparent portion 44 is extruded of a nontransparent material whereas the transparent portion 42 is extruded of a transparent material.

Next, the circuit board 14 is formed in segments and/or portions. This is accomplished by installing the LEDs 46 onto the circuitry layer 50 and then installing the LEDs 46 and circuitry layer 50 on the backing material 48. Once the LEDs 46 are installed onto the circuit board 14 a first layer 120 of encapsulant 20 is laid over the LEDs 46 and the exterior facing surface 55 of circuit board 14.

Encapsulant 20 is formed of any flowable material that seals the LEDs 46 and circuit board 14. In one arrangement, encapsulant 20 is a flowable material when initially applied that later cures to a non-flowable material. In one arrangement, encapsulant 20 is a flowable plastic material that is transparent or translucent. In one arrangement, while the encapsulant 20 is initially flowable, it hardens to a rigid, semi-rigid, flexible or rubber-like material.

Next, the separate segments and/or portions are connected together by aligning the adjacent segments and/or portions in end-to-end engagement thereby forming a seamline there between and then an adhesive is laid over the rearward face of the circuit board 14, such as a glue, paste, tape, double sided tape or the like. This using an adhesive such as a double-sided tape, gel or the like holds the two segments and/or portions together while also provides for adhesion of ribbon wire 63 to the back of circuit board 14 as well.

Since both segments and/or portions have ribbon wire 63 extending outward from an end of the segment and/or portion, and it is desirable to have wires only coming out one end of the housing 12, the ribbon wire 63 of one segment and/or portion is folded around and onto the back of circuit board 14 such that both ribbon wires 63 extend out of the same end of light bar 10. In this position, the adhesive holds the folded ribbon wire 63 in place on the back of circuit board 14.

Now that both ribbon wires 63 extend outward from the same end of circuit board 14, the combined and assembled circuit board 14 formed of both segments and/or portions is slid into the hollow interior 40 of housing 12 through an open end of the housing 12 until the assembled circuit board 14 is fully installed within the hollow interior 40 of housing 12.

Once fully installed, an end cap is positioned over each end of the light bar 10. Once installed, the end caps are sealed in place.

Next, to fully encapsulate the housing 12, the housing 12 is vertically aligned, so as to help the bubbles flow out of the hollow interior 40 of the housing 12 and a second layer 122 of encapsulant 20 is injected through the lower end cap and into the remaining air-space within the hollow interior 40 of housing 12. This encapsulant 20 fills most if not all of the voids and spaces within the hollow interior 40 thereby providing an additional contaminant and water proofing barrier. In one arrangement, this second layer 122 of encapsulant 20 is over-flowed, that is more encapsulant 20 is forced into the hollow interior 40 of the housing 12 such that the excess escapes out the opposite end of the housing 12 and in doing so, excess air bubbles are forced out of the hollow interior 40. The encapsulant 20 is left to cure over time. Once cured the light bar 10 is ready for use.

When encapsulant 20 is properly injected within the hollow interior 40 of housing 12, the second layer 122 of encapsulant 20 fills all of the air space left within the hollow interior 40 of housing 12. In one arrangement, the second layer 122 surrounds all portions of the circuit board 14 and engages the entire exterior surface of the circuit board 14 as well as engages the entire interior surface of the hollow interior 40 of housing 12. By filling all of the air space within the hollow interior 40 of housing 12 after the circuit board 14 has been inserted within the hollow interior 40 this prevents any water or contamination from getting into the hollow interior 40 by filling this space already. In addition, even if water or contaminants did get into the hollow interior 40 of housing 12 this water and/or contaminants would not be able to get to the circuit board 14 itself as the circuit board 14 is fully encapsulated within the second layer 122 of encapsulant 20. In addition, the LEDs 46 are also encapsulated by the first layer 120 of encapsulant 20 thereby providing a second layer of protection. These first and second layers 120, 122 of encapsulant 20 are protected by being housed within the sealed housing 12 thereby protecting the encapsulant 20 from exposure to water and contaminants as well as from physical contact and abuse. By forming the housing 12 out of a single continuous extrusion, this prevents water or contaminants from getting into housing 12 except for the ends which are covered by end caps that are sealed in place and then sealed again with second layer 122 of encapsulant 20. In this way, a lighting assembly 10 is provided that is extremely durable and practically impenetrable.

Figure 5:
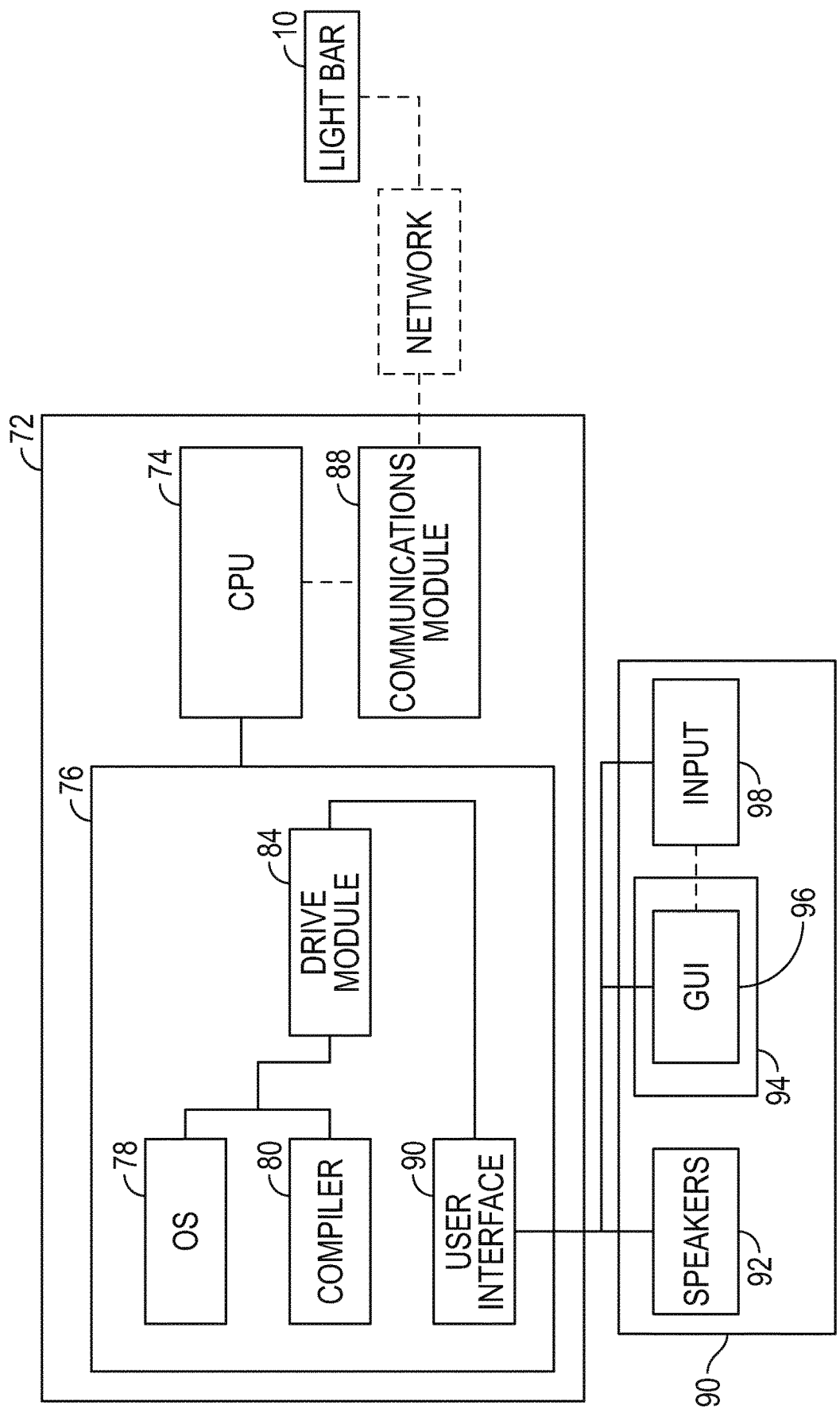
FIG. 5 shows a diagram illustrating an exemplary hardware environment for practicing some aspects of the present disclosure.

FIG. 5 shows an exemplary hardware environment for practicing some aspects of the present disclosure. The embodiment described in FIG. 5 includes a non-transitory computer readable medium 72 comprising a central processing unit (CPU) 74, memory 76, and a communications module 88. According to the embodiment of FIG. 5, the memory 76 comprises an operating system (OS) 78, a compiler 80, a drive module 84, and a user interface 90. The embodiment of FIG. 5 also includes a light bar 10, a network, speakers 92, a display 94, a graphical user interface 96, and input 98 offered by a user. The non-transitory computer readable medium 72 could be used to implement selected elements of the present disclosure.

The non-transitory computer readable medium 72 may act as the primary means for programming which functions are capable of being carried out by the assembly 10. The non-transitory computer readable medium 72 may be operated by person(s) considered to be the initial programmer, such as a manufacturer, which is generally a person other than the end user. The non-transitory computer readable medium can be a standalone device or can form part of a phone, gaming console, tablet, other computing device (e.g., laptop and desktop computers), or even a software application usable with a computing device such as a web browser. The programmer is the one who sets which functions the assembly 10 is allowed to perform and/or is restricted from performing.

The CPU 74 may include components such as an intelligent control and communication components (e.g., communications module 88). The central processing unit processes inputs and outputs and is capable of interfacing with different types of modules such as a drive module 84 and/or a user interface 90. Examples of a CPU include a processor, a microprocessor, a microcontroller, an arithmetic logic unit ("ALU"), or any other suitable programmable device. The central processing unit 74 could even include other components and can be implemented partially or entirely on a semiconductor (e.g., a field-programmable gate array ("FPGA")) chip, such as a chip developed through a register transfer level ("RTL") design process. The CPU 74 comprises a portion of the electronic circuitry within the assembly 10 that carries out the instructions by performing the basic arithmetic, logic, controlling, and input/output ("I/O") operations specified by the instructions. Processing units are common in tablets, telephones, handheld devices, laptops, user displays, smart devices (TV, speaker, watch, etc.), and other computing devices.

The memory 76 includes, in some embodiments, a program storage area and a data storage area. The program storage area and the data storage area can include combinations of different types of memory, such as read-only memory ("ROM", an example of non-volatile memory, meaning it does not lose data when it is not connected to a power source) or random access memory ("RAM", an example of volatile memory, meaning it will lose its data when not connected to a power source). Some additional examples of volatile memory include static RAM ("SRAM"), dynamic RAM ("DRAM"), synchronous DRAM ("SDRAM"), etc. Additional examples of non-volatile memory include electrically erasable programmable read only memory ("EEPROM"), flash memory, a hard disk, an SD card, etc. The central processing unit 74 executes software instructions that are capable of being stored in the memory 76. Additionally, certain operating instructions can be stored in the memory 76 such that when particular signals, commands, and/or information are received from the electrical system of the vehicle, based on those signals, commands, and/or information, the assembly 10, 200 can access operational instructions from the memory 76 in order to control and/or manipulate the light bar 10 and its components such as the LEDs 46.

Generally, the non-transitory computer readable medium 72 operates under control of an operating system 78 stored in the memory 76. The non-transitory computer readable medium 72 implements a compiler 80 which allows a software application written in a programming language such as COBOL, C++, FORTRAN, or any other known programming language to be translated into code readable by the central processing unit 74. After completion, the software application accesses and manipulates data stored in the memory 76 of the non-transitory computer readable medium 72 using the relationships and logic that was generated using the compiler 80.

In one embodiment, instructions implementing the operating system 78, a software application, and the compiler 80 are tangibly embodied in the non-transitory computer readable medium 72, which could include one or more fixed or removable data storage devices, such as a zip drive, floppy disc drive, hard drive, CD-ROM drive, tape drive, etc. Furthermore, the operating system 78 and the software application are comprised of instructions which, when read and executed by the non-transitory computer readable medium 72, causes the non-transitory computer readable medium 72 to perform the steps necessary to implement and/or use the present invention (e.g., give or restrict functionality to the light bar 10). According to some aspects of the present disclosure, a software application, operating instructions, and/or firmware (semi-permanent software programmed into read-only memory) may also be tangibly embodied in the memory 76 and/or communications module 88, thereby making the software application a product or article of manufacture according to the present disclosure.

For example, according to some aspects of the present disclosure, the program storage area and/or data storage areas comprise a drive module 84. The drive module gives the programmer the ability to quickly and easily turn ON and OFF certain functionalities from the light bar 10. To the end user of the light bar 10, these changes would appear permanent.

For example, the drive module 84 could be configured to receive and interpret signals, commands, and/or information from the electrical system of the vehicle and generate and apply operational instructions based on those signals, commands, and/or information. It should be appreciated that the drive module 84 may include submodules which program the assembly to emit particular colors of light in particular patterns, at specific times, for specific durations, or even at specific speeds (or frequencies).

Furthermore, the programming of any one or more of these modules may include a priority, where the lighting patterns and/or strobes associated therewith will either override or be disabled in the event certain driving functions are occurring (e.g., braking, turning, reversing, etc.). If two light bars 10 are used on a single vehicle, one could be programmed such that lighting patterns associated with normal driving operations override the other available patterns programmed to be carried out by the light bar 10 and the other could be programmed such that the other available strobing patterns programmed to be carried out by the light bar 10 override the lighting patterns associated with normal driving operations.

The communications module 88 can comprise data communication devices to allow the non-transitory computer readable medium 72 to connect to a network. The network, for example, may also be connected to the Internet, the light bar 10, other electronic devices, and/or an electronic database.

The assembly may include a database wherein the database is a structured set of data typically held in a computer. The database, as well as data and information contained therein, need not reside in a single physical or electronic location. For example, the database may reside, at least in part, on a local storage device, in an external hard drive, on a database server connected to a network, on a cloud-based storage system, in a distributed ledger (such as those commonly used with blockchain technology), or the like.

In some embodiments, the network is, by way of example only, a wide area network ("WAN") such as a TCP/IP based network or a cellular network, a local area network ("LAN"), a neighborhood area network ("NAN"), a home area network ("HAN"), or a personal area network ("PAN") employing any of a variety of communications protocols, such as Wi-Fi, Bluetooth, ZigBee, near field communication ("NFC"), etc., although other types of networks are possible and are contemplated herein. The network typically allows communication between the communications module 88 and a central location during moments of low-quality connections. Communications through the network can be protected using one or more encryption techniques, such as those techniques provided in the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

The Internet Protocol ("IP") is the principal communications protocol in the Internet protocol suite for relaying datagrams across network boundaries. Its routing function enables internetworking, and essentially establishes the Internet. IP has the task of delivering packets from the source host to the destination host solely based on the IP addresses in the packet headers. For this purpose, IP defines packet structures that encapsulate the data to be delivered. It also defines addressing methods that are used to label the datagram with source and destination information.

The Transmission Control Protocol ("TCP") is one of the main protocols of the Internet protocol suite. It originated in the initial network implementation in which it complemented the IP. Therefore, the entire suite is commonly referred to as TCP/IP. TCP provides reliable, ordered, and error-checked delivery of a stream of octets (bytes) between applications running on hosts communicating via an IP network. Major internet applications such as the World Wide Web, email, remote administration, and file transfer rely on TCP, which is part of the Transport Layer of the TCP/IP suite.

Transport Layer Security, and its predecessor Secure Sockets Layer ("SSL/TLS"), often runs on top of TCP. SSL/TLS are cryptographic protocols designed to provide communications security over a computer network. Several versions of the protocols find widespread use in applications such as web browsing, email, instant messaging, and voice over IP ("VoIP"). Websites can use TLS to secure all communications between their servers and web browsers.

In some embodiments, the non-transitory computer readable medium 72 could include one or more communications ports such as Ethernet, serial advanced technology attachment ("SATA"), universal serial bus ("USB"), or integrated drive electronics ("IDE"), for transferring, receiving, or storing data.

Ethernet is a family of computer networking technologies commonly used in local area networks ("LAN"), metropolitan area networks ("MAN") and wide area networks ("WAN"). Systems communicating over Ethernet divide a stream of data into shorter pieces called frames. Each frame contains source and destination addresses, and error-checking data so that damaged frames can be detected and discarded; most often, higher-layer protocols trigger retransmission of lost frames. As per the OSI model, Ethernet provides services up to and including the data link layer. Ethernet was first standardized under the Institute of Electrical and Electronics Engineers ("IEEE") 802.3 working group/collection of IEEE standards produced by the working group defining the physical layer and data link layer's media access control ("MAC") of wired Ethernet. Ethernet has since been refined to support higher bit rates, a greater number of nodes, and longer link distances, but retains much backward compatibility. Ethernet has industrial application and interworks well with Wi-Fi. The Internet Protocol ("IP") is commonly carried over Ethernet and so it is considered one of the key technologies that make up the Internet.

The non-transitory computer readable medium 72 interfaces with the programmer to accept input(s) and commands through at least part of the user interface 90. Although the user interface 90 is depicted as a collection of input receiving components, the instructions performing the user interface functions can be resident or distributed in the operating system 78, another software application, or module. Alternatively, the instructions can be implemented with special purpose memory and processors.

The user interface 90 is how the programmer interacts with the non-transitory computer readable medium 72. The user interface 90 could be a digital interface, a command-line interface, a graphical user interface ("GUI") 96, or any other way a user can interact with a machine. For example, in one embodiment, the user interface 90 comprises speakers 92, a display 94, and one or more means for receiving an input 98 from the programmer. The speakers 92 can transmit audio in response to instructions received from the operating system 78, the non-transitory computer readable medium 72, the drive module 84, the communications module 88, and/or the user interface 90.

The display 94 typically comprises an electronic screen which projects a graphical user interface 96 to the programmer. More particularly, the display could be a liquid crystal display ("LCD"), a light-emitting diode ("LED") display, an organic LED ("OLED") display, an electroluminescent display ("ELD"), a surface-conduction electron emitter display ("SED"), a field-emission display ("FED"), a thin-film transistor ("TFT") LCD, a bistable cholesteric reflective display (i.e., e-paper), etc. The display 94 can display new options and/or instructions in response to instructions received from the operating system 78, the drive module 84, the communications module 88, and/or the user interface 90.

The means for receiving an input 98 can comprise a combination of digital and analog input and/or output devices or any other type of user interface input/output device required to achieve a desired level of control and monitoring for a device. Examples of input and/or output devices include computer mice, keyboards, touchscreens, knobs, dials, switches, buttons, speakers, microphones, etc. Input(s) 98 received from the user interface 90 can then be sent to components of the circuit board(s) housed within the ECU/driver box to control operational aspects of the light bar 10.

Various electrical and communication connections present in the assembly can include wired connections as well as wireless connections. This can include, but is not limited to Bluetooth, Wi-Fi, cellular data, radio waves, satellite, or generally any other form of wireless connection which will allow for communication. Therefore, the unit will include generally any electronic components necessary to allow for such wireless or wired communication. The wired communication can take the form of CAN bus, Ethernet, co-axial cable, fiber optic line, copper wire, or generally any other line which will allow for communication between the unit and the implement and/or planter.

Figure 6:
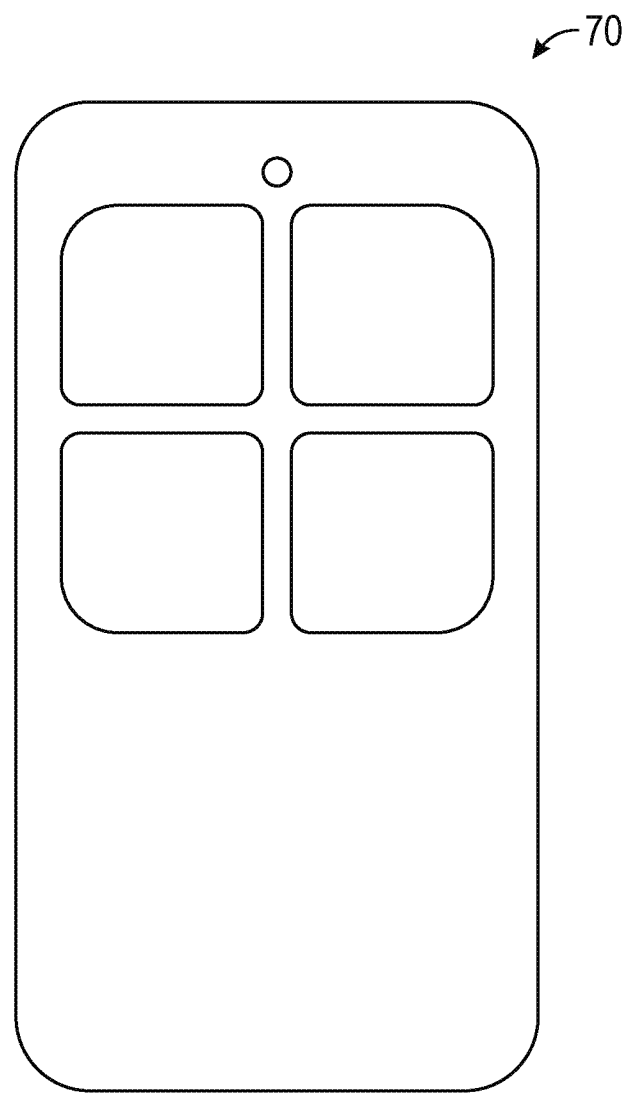
FIG. 6 shows an elevation view of an exemplary wireless remote capable of sending manual instructions or signals which correspond with specific lighting instructions for the lighting assembly disclosed herein, according to some aspects of the present disclosure.

FIG. 6 shows an exemplary wireless remote 70 capable of sending manual instructions or signals which correspond with specific lighting instructions for the lighting assembly disclosed herein. Such a remote control 70 may be wireless and may allow an operator to manually choose the timing, color, and brightness of a pulse by sending an instruction to components of the circuit board(s) housed within the ECU/driver box to perform a specific lighting pattern. The manual instruction may also be created by switches, buttons, or dials that are directly or operationally attached to the assembly 10. Still in other embodiments, the manual instruction could be controlled by depressing the pedals, using turn signals, etc. In other words, the manual instruction could be used to override the normal operational lights of the vehicle, or the normal operational lights of the vehicle could override a specific lighting pattern, such as an emergency or work light strobing pattern. The different pulsing and color combinations result in at least sixty-four separate strobe operations in addition to a completely white override and the ability to manually pulse the lights.

FIG. 7 shows an exemplary embodiment of the lighting assembly 200. The lighting assembly 200 includes a light bar 202 wherein the light bar comprises a left side 204 and a right side 206. The left side 204 and right side 206 of the light bar 202 may be structurally connected such that they only include one housing or are connected by structural components. Also, as shown in FIG. 7, the left side 204 and right side 206 of the light bar 202 may not be structurally connected such that they have separate housings and are movable independent of each other. The exemplary lighting assembly 200 further includes zero or more left wire exit end caps 216, zero or more left end caps 220, zero or more right end caps 222, zero or more right wire exit end caps 218, zero or more light bar brackets 236, zero or more center caps 224, an ECU/driver box 208, an ECU bracket 210, one or more ECU-light bar wires 212, and one or more ECU-vehicle wires 214. The assembly 200 is configured to be attached to a vehicle and to interact with the electrical system of the vehicle.

The ECU/drive circuit board can be connected to the electrical system of the vehicle via the ECU-vehicle wiring 214. The ECU-vehicle wiring 214 can be encased within a wire harness. One aspect of the ECU-vehicle wiring 214 may include a 7-pin connection wire harness, however, other types of wire harnesses are contemplated herein. The wire harness can be connected to a socket of the vehicle and foam tape can be used to wrap the socket. A wire cover can be used to cover the wire harness's connection with the socket. Any type of connectors including, but not limited to, female housings, female terminals, male housings, male terminals, wire seals, dummy plugs, and the like may be used for connecting the ECU/driver box 208 to the vehicle and/or to the light bar 202. The ECU-vehicle wires 214 can include one, two, or more wire harness containing wiring wherein the wire harness(es) can encase the wires and can be connected to one, two, or more sockets of the vehicle. Thereby the electrical system of the vehicle can provide inputs, signals, commands, and/or other information to the ECU/driver circuit board 403. The inputs, signals, commands, and/or other information can be delivered via pulse-width modulation (PWM), BAT input, and/or any other type of suitable method. The ECU/driver circuit board 403 can receive, interpret, and/or process those inputs, signals, commands, and/or other information from the electrical system of the vehicle and then control and/or manipulate the circuit board(s) housed within the light bar 202, including the left-side circuit board 400 and the right-side circuit board 402. Control and/or manipulation of the left-side circuit board 400 and the right-side circuit board 402 can include, but is not limited to, illumination and prevention of illumination of particular LEDs and/or blocks of LEDs located on the left-side circuit board 400 and the right-side circuit board 402. The ECU/driver circuit board 403 can also control, manipulate, and/or create auditory noise signals based on the inputs, signals, commands, and/or other information received from the electrical system of the vehicle. For example, when the vehicle is reversing, the ECU/driver circuit board 403 can create and/or cause an auditory noise signal to be produced and/or emitted. This auditory signal may be similar to any other auditory reversing signal common in the industry and may be a constant sound or may be a pattern of sounds.

Additionally, according to some aspects of the present disclosure, the light bar 202 and lighting assembly 200 may be manufactured in the same manner as light bar/assembly 10 as described above.

FIG. 8 shows a zoomed in view of a portion of the ECU bracket 210 shown in FIG. 7. The ECU bracket 210 shown in FIG. 8 includes bracket washer 230, bracket split washer 232, and a bracket bolt 234. The ECU bracket 210, bracket washer 230, bracket split washer 232, and bracket bolt 234, work in conjunction to help secure and/or attach the ECU/driver box 208 to a vehicle. The bracket washer 230, bracket split washer 232, and bracket bolt 234, can be any type of reasonably suitable off-the-shelf washer and/or bolt. More than one bracket washer 230, bracket split washer 232, and bracket bolt 234 could be included. Additionally, one or more welded nuts and/or one or more welded brackets could be used to facilitate effective attachment of the ECU/driver box 208 to the vehicle.

FIG. 9 shows a view from underneath the exemplary assembly 200 shown in FIG. 7. FIG. 9 shows an ECU-bracket bolt 226 and an ECU-bracket nut 228 which facilitate securing and/or attaching the ECU/driver box 208 to the vehicle. More than one ECU-bracket bolt 226 and ECU-bracket nut 228 could be used. Any reasonably suitable off-the-shelf nuts and/or bolts could be used. Additionally, the ECU/driver box 208 can be secured and/or attached to the vehicle by other means including, but not limited to, screws, drilling, fasteners, adhesives, ties, friction fit, foam tape, and/or any other methods of attachment described herein.

Figure 10:
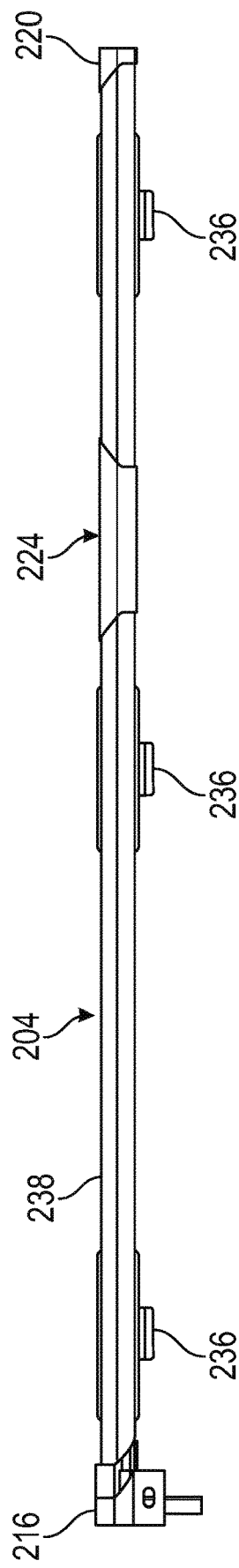
FIG. 10 is a perspective view of a left side of the exemplary light bar shown in FIG. 7 according to some aspects of the present disclosure.
Figure 11:
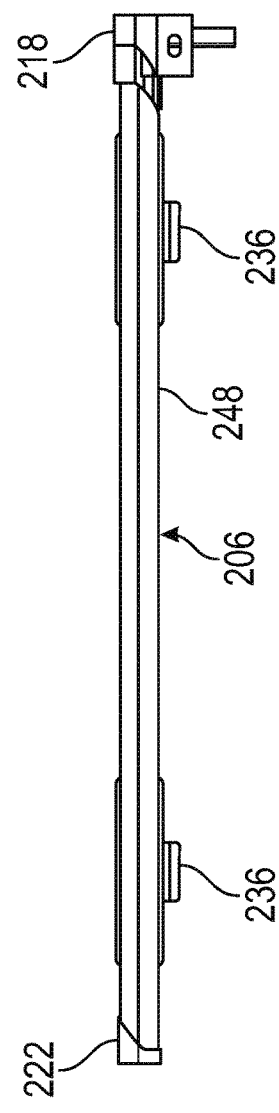
FIG. 11 is a perspective view of a right side of the exemplary light bar shown in FIG. 7 according to some aspects of the present disclosure.

FIG. 10 shows the left side 204 of the light bar 202 shown in FIG. 7. The light bar 202 can be of the type described above with reference to FIGS. 2-4 and/or can include any and/or all characteristics of the light bar and/or assembly 10 described above. As shown in FIGS. 10 and 11, according to some aspects of the present disclosure, the light bar 202 of the lighting assembly 200 can comprise a left side 204 and a right side 206. The left side 204 can comprise a left-side housing 238. The right side 206 can comprise a right-side housing 248. According to other embodiments, the light bar 202 could comprise a single bar or could be split into two or more portions such as a left side 204 and a right side 206. As can be seen in the embodiment described in FIGS. 10 and 11, the left end of the left side 204 of the light bar 202 can be capped with a left wire exit and end cap 216. A portion of the left-side housing 238 can be inserted into a hollow portion of the left wire exit end cap 216. Use of a left wire exit end cap 216 anchors the left end of the left side 204 of the light bar 202 and provides stability and durability in the attachment of the left side 204 to the vehicle. Further, a left wire exit end cap 216 allows for wires extending from circuit board(s) housed within the left-side housing 238 to safely and effectively exit the housing 238 in an organized and efficient manner. The left wire exit end cap 216 allows the wire exiting the left-side housing 238 to connect with circuitry housed within the ECU/driver box 208. Any reasonable sort of wire harness can be used to harness the wires 212 exiting the left-side housing 238 and connecting with circuitry housed within the ECU/driver box 208. Alternatively, the wires 212 exiting the left wire exit end cap 216 may not include a wire harness. Any type of connectors including, but not limited to, female housings, female terminals, male housings, male terminals, wire seals, dummy plugs, and the like may be used for connecting the ECU/driver box 208 to the left side 204 of the light bar 202. The left wire exit end cap 216 also caps the left end of the left side 204 of the light bar 202 such that it protects the contents housed within the left-side housing 238. The left wire exit end cap 216 prevents, dirt, rocks, or any other moisture or debris from entering the left end of the left side 204 of the light bar 202.

Also shown in the embodiment described in FIG. 10, are several light bar brackets 236 used to facilitate effective attachment of the left side 204 to the vehicle. While three brackets 236 are shown in FIG. 10 to support the left side 204 and facilitate effective attachment of the left side 204, any number of light bar brackets 236 greater than or equal to zero may be used to aid in attaching the light bar 202 to the vehicle, including both the left side 204 and right side 206 of the light bar 202. The light bar brackets 236 provide stability and durability of the light bar 202 and its attachment to the vehicle. The brackets 236 attach to the vehicle via adhesive, ties, nut and bolt connection, or any other means of attachment and/or connection mentioned in the present disclosure. The left-side housing 238 and right-side housing 248 of the light bar 202 extend through the arms of brackets 236 as shown in FIGS. 10, 11, and 60B.

Also shown in the embodiment described in FIG. 10 is a center cap 224. The center cap 224 is another element that provides for a stable and durable connection of the light bar 202 to the vehicle. While one center cap 224 is shown in the embodiment described in FIG. 10, any number of center caps 224 greater than or equal to zero could be used. As seen in FIG. 21D, the center cap 224 includes a somewhat hollow portion located between the inward face 298, top 300, bottom 302, and arms 304 of the center cap 224. The center cap 224 can also include an outward facing front 296. The left-side housing 238 and right-side housing 248 of the light bar 202 can extend through this hollow portion. The center cap 224 can be attached to the vehicle by adhesive or any means of attachment and/or connection mentioned in the present disclosure. The center cap 224 can also be used to display a logo, trademark, company name, product name, slogan, advertising, marketing information, and/or any other information wherein the logo, trademark, company name, product name, slogan, advertising, marketing information, and/or any other information can be displayed on the outward facing front 296. The outward facing front 296 can be configured so that it is positioned on top of a portion of the left-side circuit board 400 and/or left side housing 238 such that it covers a portion of the left-side circuit board 400 and/or left-side housing 238. The outward facing front 296 can be transparent and/or translucent such that light illuminating from LEDs positioned beneath the center cap 224 can escape. Alternatively, the outward facing front 296 can be opaque such that no light escapes from beneath the center cap 224. Additionally, the center cap 224 can be positioned on the left-side circuit board 400 and/or left-side housing 238 such that it is positioned on a portion wherein no LEDs are present so that the center cap 224 does not cover any LEDs.

Also shown in the embodiment described in FIG. 10 is a left end cap 220 to cap the right end of the left side 204 of the light bar 202. A portion of the left-side housing 238 can be inserted into a hollow portion of the left end cap 220. Similar to the left wire exit end cap 216, use of a left end cap 220 anchors the right end of the left side 204 of the light bar 202 and provides stability and durability in the attachment of the left side 204 to the vehicle. The left end cap 220 also caps the right end of the left side 204 of the light bar 202 such that it protects the contents housed within the left-side housing 238. The left end cap 220 prevents, dirt, rocks, or any other moisture or debris from entering the right end of the left side 204 of the light bar 202. The left end cap 220 can be attached to the vehicle by adhesive or any means of attachment and/or connection mentioned in the present disclosure.

FIG. 11 shows an embodiment of the right side 206 of the light bar 202 according to some aspects of the present disclosure. As can be seen in FIG. 11, the left end of the right side 206 of the light bar 202 can be capped with a right end cap 222. A portion of the right-side housing 248 can be inserted into a hollow portion of the right end cap 222. The right end cap 222 can include some or all of the characteristics and/or functionality of the left end cap 220. The right end cap 222 and left end cap 220 can include some or all of the same characteristics and/or functionality as the end caps described above in reference to FIGS. 1-4.

Also shown in the embodiment described in FIG. 11 is the use of two light bar brackets 236. The light bar brackets 236 of FIG. 11 are the same as those used in FIG. 10 and can include the same characteristics and/or functionality. While two brackets 236 are shown in FIG. 11, any number of brackets greater than or equal to zero could be used. Additionally, while no center cap 224 is included in FIG. 11, the right side 206 of the light bar 202 can include zero or more center caps 224.

Also shown in the embodiment described in FIG. 11, is right wire exit end cap 218. The right wire exit end cap 218 is similar to the left wire exit end cap 216 in that it has the same characteristics and provides the same functionality to the assembly 200. The right wire exit end cap 218 allows the wire exiting the right-side housing 248 to connect with circuitry housed within the ECU/driver box 208. Any reasonable sort of wire harness can be used to harness the wires exiting the right-side housing 248 and connecting with circuitry housed within the ECU/driver box 208. Alternatively, the wires 212 exiting the left wire exit end cap 216 may not include a wire harness. Any type of connectors including, but not limited to, female housings, female terminals, male housings, male terminals, wire seals, dummy plugs, and the like may be used for connecting the ECU/driver box 208 to the left side 204 of the light bar 202.

Figure 12A:
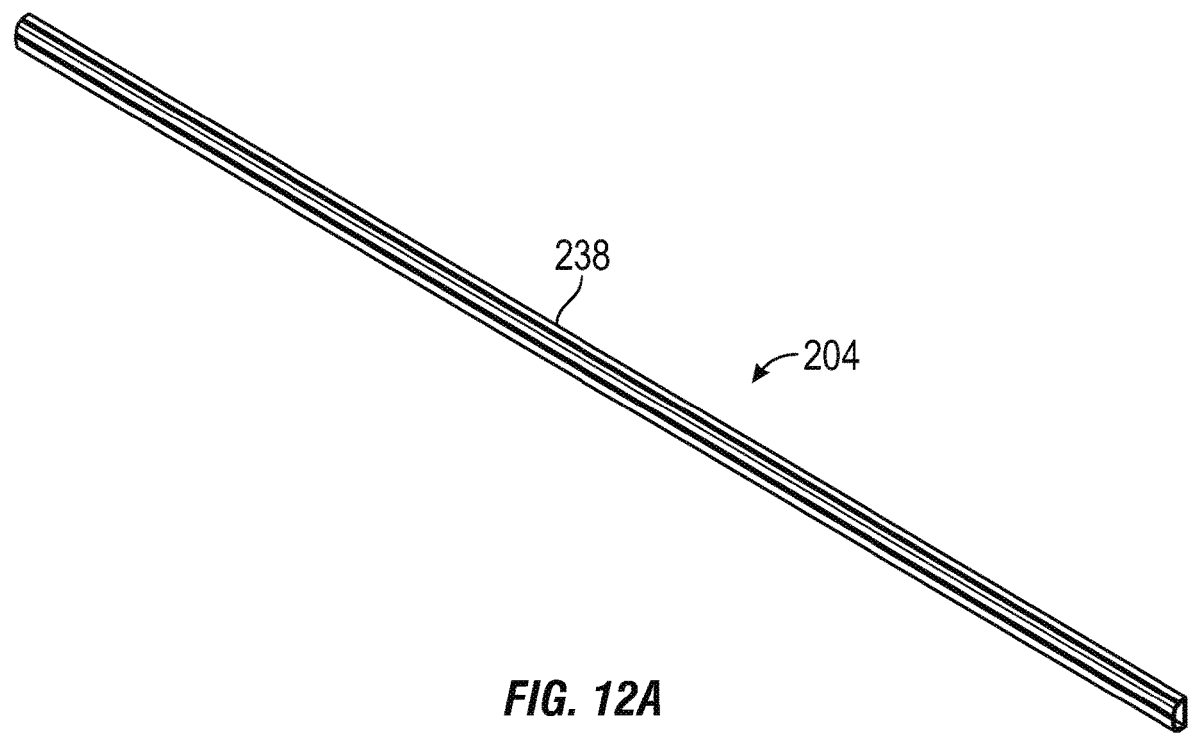
FIG. 12A is perspective view of an exemplary housing of the left side of the light bar shown in FIG. 10 according to some aspects of the present disclosure.
Figure 12B:
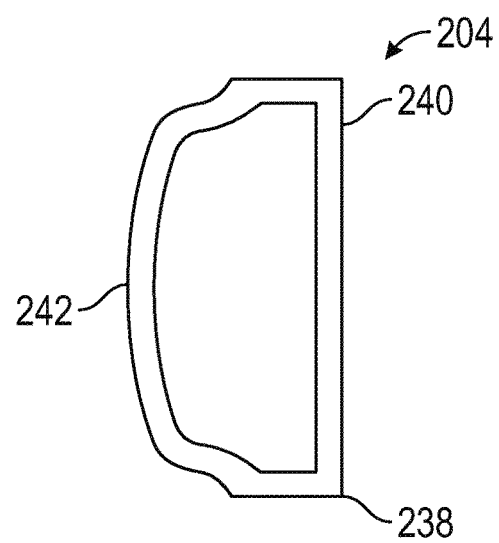
FIG. 12B is an elevation view of a side cut away of the exemplary housing shown in FIG. 12A.

FIGS. 12A and 12B show an embodiment of the left-side housing 238 of the left side 204 of the light bar 202 according to some aspects of the present disclosure. The left-side housing 238 can be formed of any suitable size, shape and design. According to an exemplary embodiment, the length of the left-side housing 238 is about 730 mm and the length of the rear face 240 is about 8.4 mm, however any suitable size of the left-side housing 238 is contemplated herein. The left-side housing 238 can include a rear face 240 and a cover portion 242 wherein the cover portion 242 is translucent and/or transparent. Additionally, the left-side housing 238 can be the same as or include some or all of the same characteristics and/or functionality as the generic housing 12 described above. As can be seen in FIG. 12A, the left-side housing 238 may include a hollow portion wherein circuitry can be inserted into and housed within the left-side housing 238. The circuitry housed within the left-side housing 238 can include circuit board(s) that include LEDs such that when the LEDs are illuminated, the light emanating from the LEDs can transmit through the translucent and/or transparent cover portion 242 such that the light is viewable by individuals who can see the light bar 202. The exemplary cover portion 242 of FIG. 12B provides for 50% light transmittance. However, the disclosure herein contemplates any percentage of light transmittance. Further, the exemplary cover portion 242 of FIG. 12B provides for two color extrusion such that light of two different colors of LEDs housed within the left-side housing 238 can be transmitted through the cover portion 242. However, the disclosure contemplates any number of different colored LEDs being housed within the left-side housing 238 wherein the cover portion 242 can provide for color extrusion of any number of colors such as four-color extrusion for red, white, blue, and amber. The rear face 240 of the left-side housing 238 can be configured so that it provides 0% light transmittance. Additionally, the left-side housing 238 can be any reasonable length to be attached to a vehicle.

Figure 13A:
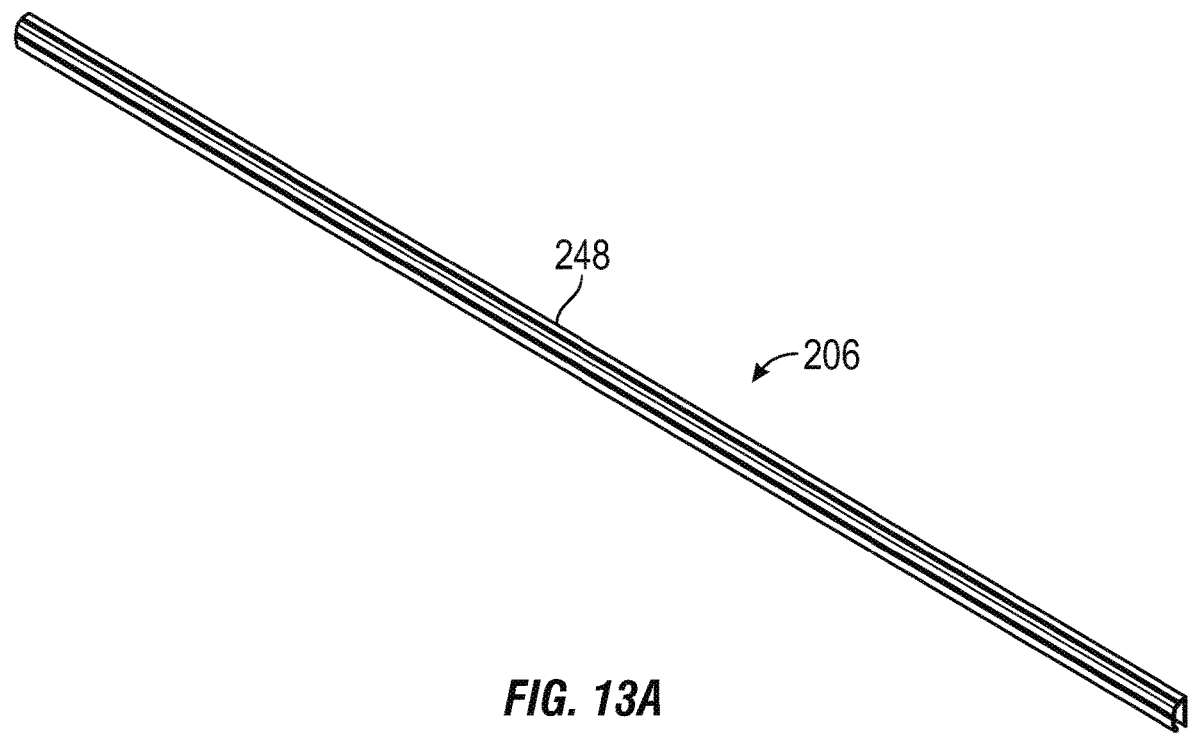
FIG. 13A is perspective view of an exemplary housing of the right side of the light bar shown in FIG. 11 according to some aspects of the present disclosure.
Figure 13B:
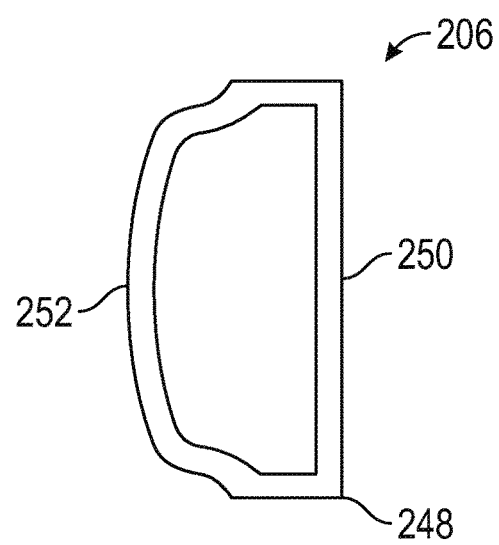
FIG. 13B is an elevation view of a side cut away of the exemplary housing shown in FIG. 13A.
Figure 14A:
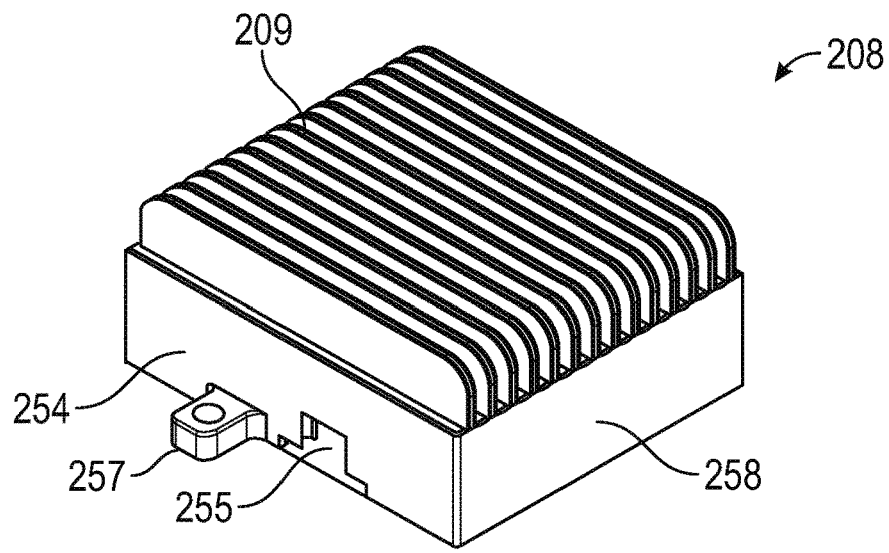
FIG. 14A is a perspective view of an exemplary electrical control unit (ECU) box according to some aspects of the present disclosure.
Figure 14B:
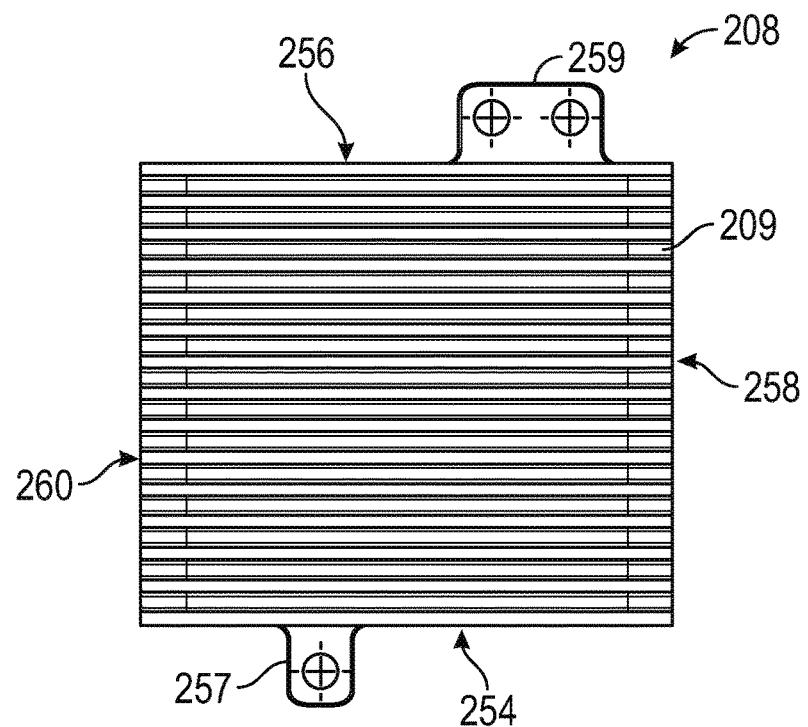
FIG. 14B is an elevation view of a front of the exemplary housing shown in FIG. 14A.
Figure 14C:
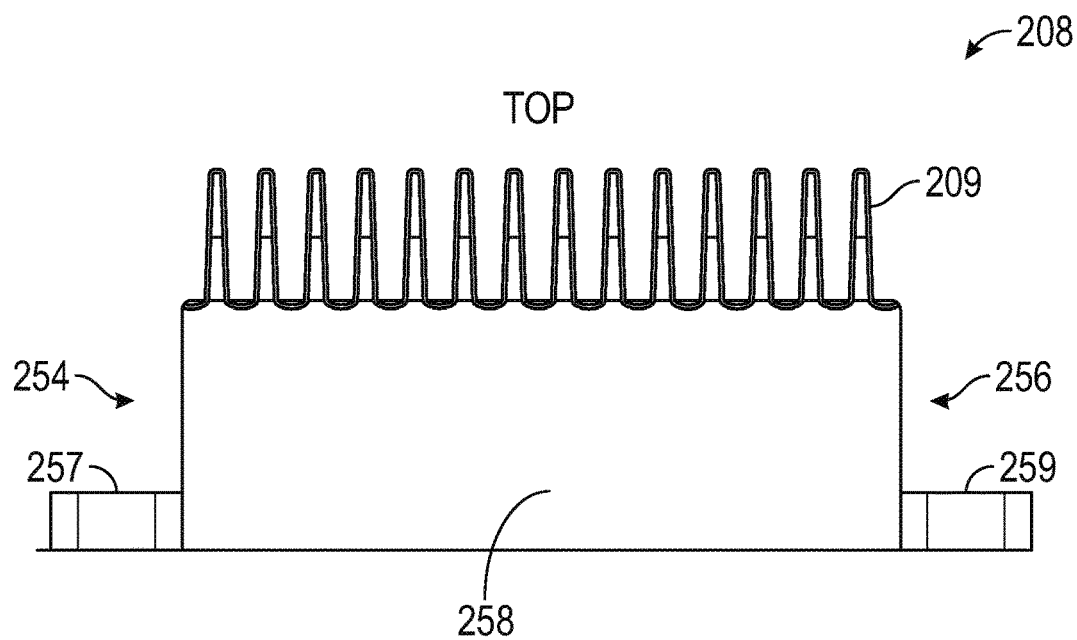
FIG. 14C is an elevation view of a side of the exemplary housing shown in FIG. 14A.
Figure 14D:
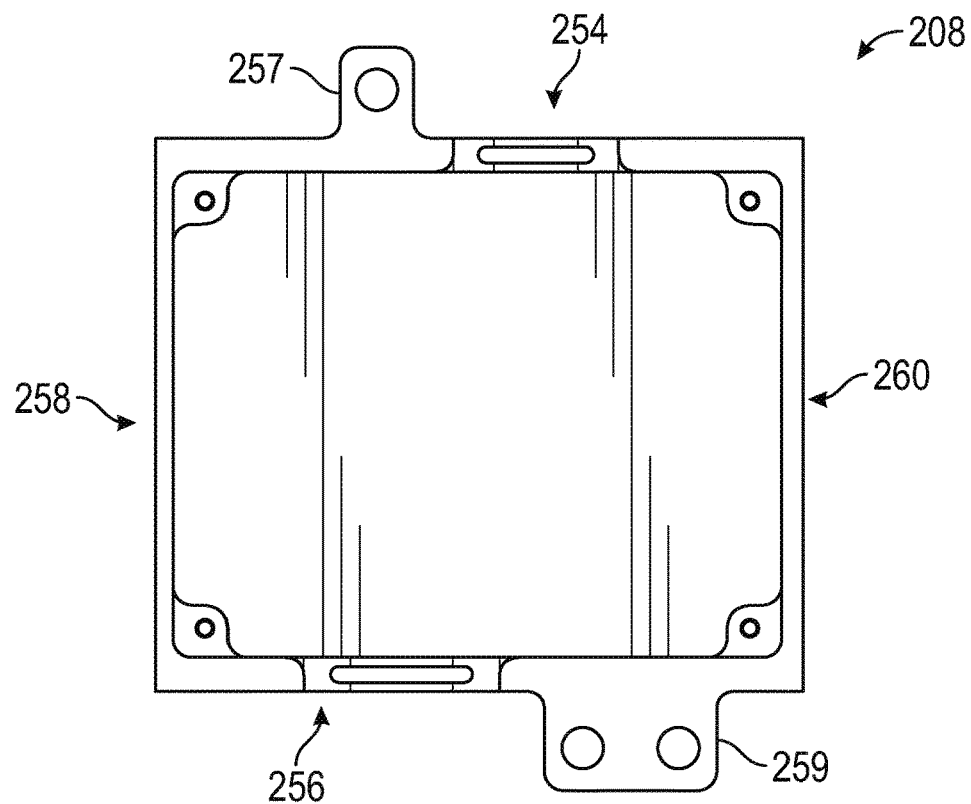
FIG. 14D is an elevation view of a back of the exemplary housing shown in FIG. 14A.

FIGS. 13A and 13B show an embodiment of the right-side housing 248 of the right side 206 of the light bar 202 according to some aspects of the present disclosure. According to an exemplary embodiment, the length of the right-side housing 248 is about 460 mm and the length of the rear face 250 is about 8.4 mm, however any suitable size of the right-side housing 248 is contemplated herein. The right-side housing 248 can be the same as or include some or all of the same characteristics and/or functionality as the left-side housing 238 and/or the generic housing 12. The right-side housing 248 can include a cover portion 252 and a rear face 250. The cover portion 252 can be the same as or include some or all of the characteristics and/or characteristics as cover portion 242, and the rear face 250 can be the same as or include some or all of the same characteristics and/or functionality as rear face 240.

FIGS. 14A-D show an exemplary embodiment of the ECU/driver box 208, which may be included as part of the assembly 200 according to some aspects of the disclosure. The exemplary ECU/driver box 208 of FIGS. 14A-D comprises fins 209, a top 254, an opening 255 in the top 254 of the box 208, another opening (not visible in FIGS. 14A-D) in the bottom 256 of the box 208, a bottom 256, a first fastener 257, a left side 258, a second fastener 259, and a right side 260. The ECU/driver box 208 may be made of aluminum, however the box 208 may be made of any other suitable metal or nonmetal substance. By being made of aluminum, the box 208 can act as a shield to mitigate EMI, RFI, and/or RF emissions. The exemplary ECU/driver box 208 of FIGS. 14A-D is configured to house circuitry. The ECU/driver box 208 being made aluminum helps dissipate heat. As will be described herein, the present disclosure includes heat dissipation technology of which the aluminum box 208 is a part. The ECU/driver box 208 can be of any reasonable size, shape, and/or design. According to an exemplary embodiment of the ECU/driver box 208, the top 254 and the bottom 256 measure 100 mm in length, the left 258 and right 260 measure 80-90 mm in length, the height of the box 208 measures 25-30 mm in length, the height of the fins 209 measure 16-30 mm, nine fins 209 are included, and the fins 209 are each spaced 10 mm apart. In this embodiment, the box 208 can be made of aluminum wherein the aluminum is 2 mm thick. In this configuration the total heat dissipation area is 520 cm, and the heat dissipation is 1 degree Celsius per watt of power. Foam tape can also be used in conjunction with the ECU/driver box 208 for insulation and/or any other purposes.

The ECU/driver box 208 of FIGS. 14A-D includes fins 209 to help with heat dissipation. The box 208 may be positioned and/or attached on a vehicle such that air can flow between the fins to dissipate heat. The box 208 can be positioned such that the fins 209 are vertical, such that the fins 209 are horizontal, or such that the fins 209 are positioned in any other manner. The box 208 is configured such that the fins 209 can be oriented in any manner and/or direction. Improved air flow can be achieved when the ECU/driver box 208 is positioned so that the fins 209 are vertical, which can help to dissipate heat. Additionally, the ECU/driver box 208 and the fins 209 can be painted mat black to improve heat exchange between the air and the fins 209. The number of fins 209 can vary. The exemplary embodiment of FIGS. 14A-D includes fourteen fins 209, however, the number of fins 209 such that nine fins 209 are included or could vary such that any reasonable number of fins 209 could be included.

The ECU/driver box of FIGS. 14A-D includes an opening 255 at the top 254 of the box 208 that allows for wiring and/or a wire harness containing wires to enter and/or exit through the opening 255. The box 208 can include two or more openings similar to opening 255 such that one opening can be used for wiring 212 and/or a wire harness to connect to the light bar 202 and another can be used for wiring 214 and/or a wire harness to connect to the vehicle. A similar opening to opening 255 on the top 254 of the box 208 could be included on the left 258, right 260, or bottom 256 of the box 208.

The ECU/driver box 208 can also include one or more fasteners to facilitate effectively attaching the box 208 to the vehicle. The exemplary box 208 of FIGS. 14A-D includes a first fastener 257 and a second fastener 259. The exemplary first fastener 257 includes one opening through which a nut and bolt configuration could be utilized to attach the box 208 to the vehicle. The exemplary second fastener 259 includes two openings through which a nut and bolt configuration could be utilized to attach the box 208 to the vehicle. Other means of attachment such as adhesive, ties, nut and bolt connection, welding, and/or any of the means of attachment and/or connection discussed herein could be used. While the exemplary first fastener 257 includes one opening and the exemplary second fastener 259 includes two openings, it is contemplated that each fastener could comprise zero or more openings and that any suitable number of fasteners could be used.

Figure 15A:
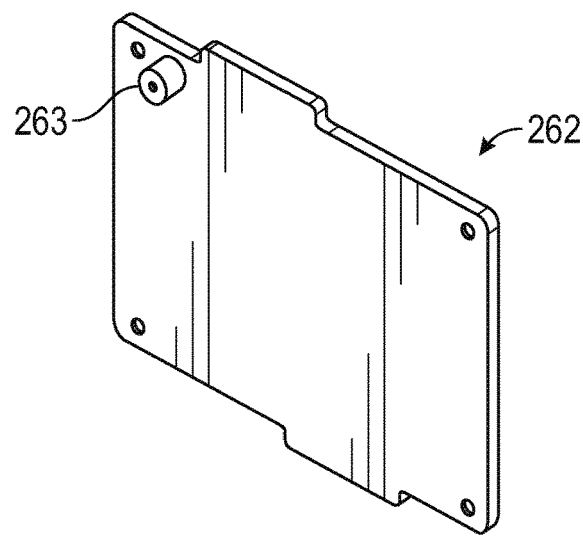
FIG. 15A is a perspective view of an exemplary ECU cover plate according to some aspects of the present disclosure.
Figure 15B:
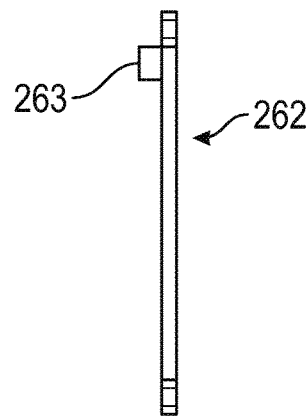
FIG. 15B is an elevation view of a side of the exemplary ECU cover plate show in FIG. 15A.
Figure 15C:
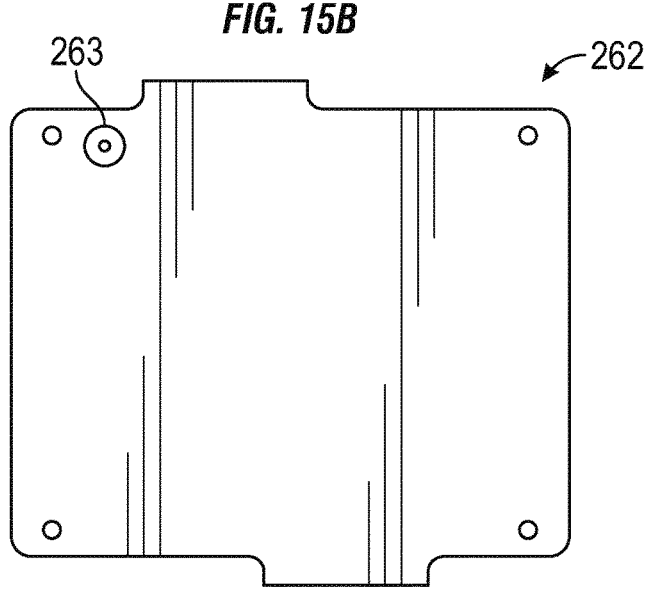
FIG. 15C is an elevation view of a front of the exemplary ECU cover plate show in FIG. 15A.

FIGS. 15A-C show an exemplary cover plate 262 for the ECU/driver box 208. The cover plate 262 can be used to facilitate effective attachment of the ECU/driver box 208 to the vehicle and to create a buffer between the ECU/driver box 208 and the vehicle to cut down on wear and tear and natural degradation of the ECU/driver box 208. The cover plate 262 can include a cylindrical extension 263 as well as a plurality of holes to facilitate effective attachment of the cover plate 262 to the vehicle and/or to the ECU/driver box 208. The ECU cover plate 262 can be of any reasonable size, shape, and/or design. According to an exemplary embodiment, the ECU cover plate 262 is generally rectangular with dimensions of about 86 mm×97 mm and the height of the cylindrical protrusion 263 is about 5 mm, however any size of the ECU cover plate 262 and cylindrical protrusion 263 is contemplated herein.

Figure 16A:
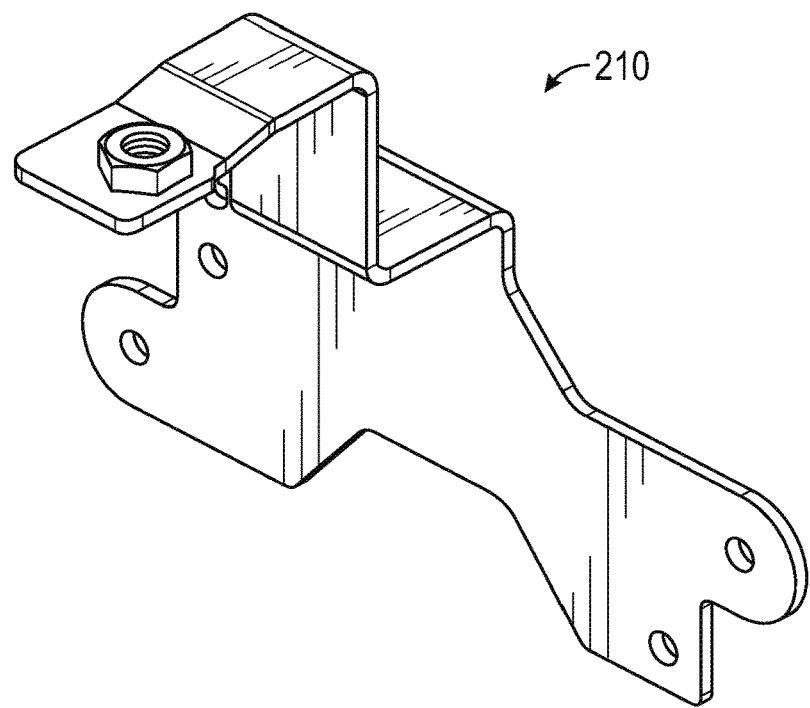
FIG. 16A is a perspective view of an exemplary ECU bracket according to some aspects of the present disclosure.
Figure 16B:
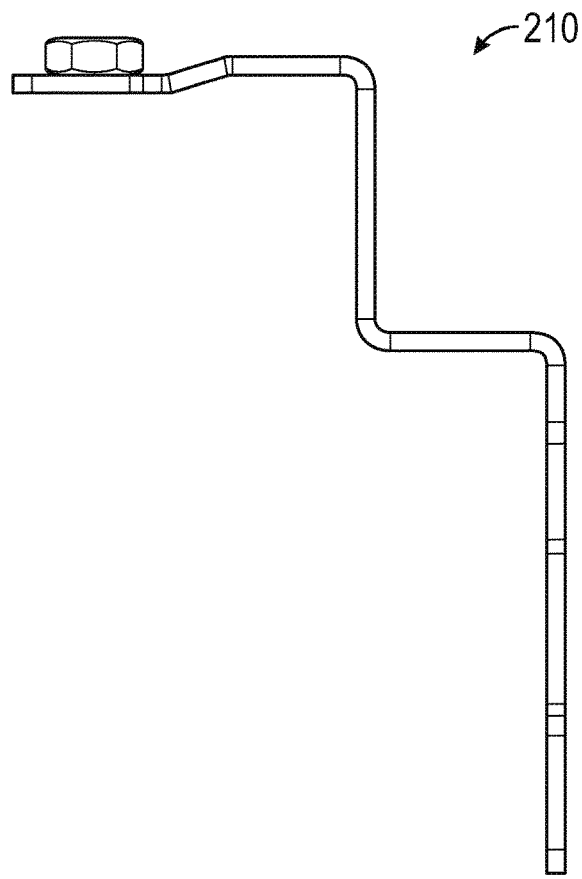
FIG. 16B is an elevation view of a side of the exemplary ECU bracket shown in FIG. 16A.
Figure 17B:
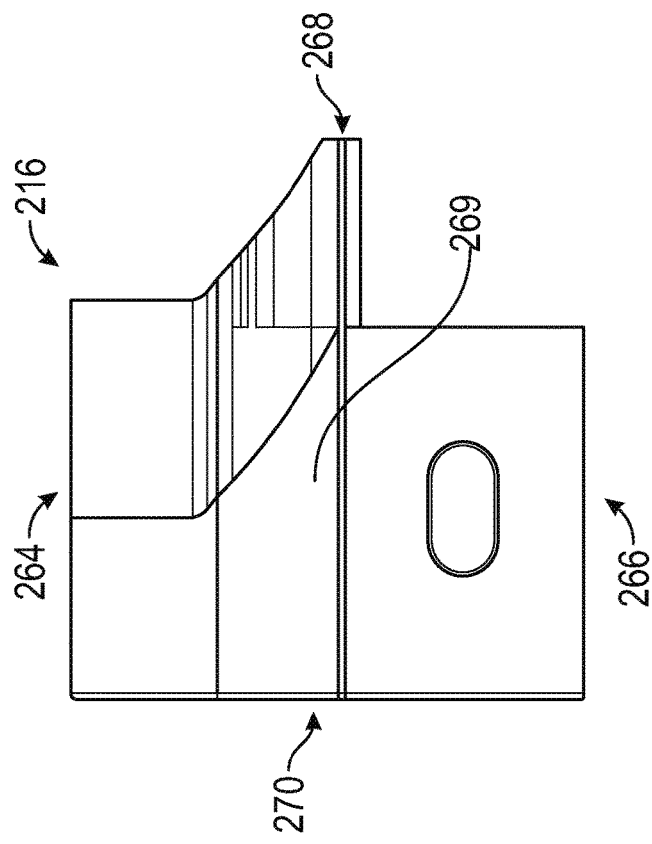
FIG. 17B is an elevation view of a side of the exemplary left wire exit end cap shown in FIG. 17A.
Figure 17D:
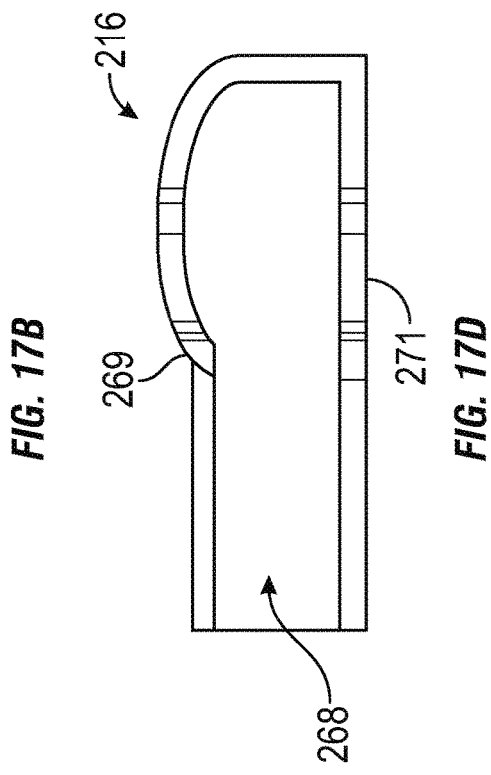
FIG. 17D is an elevation view of another side of the exemplary left wire exit end cap shown in FIG. 17A.
Figure 17A:
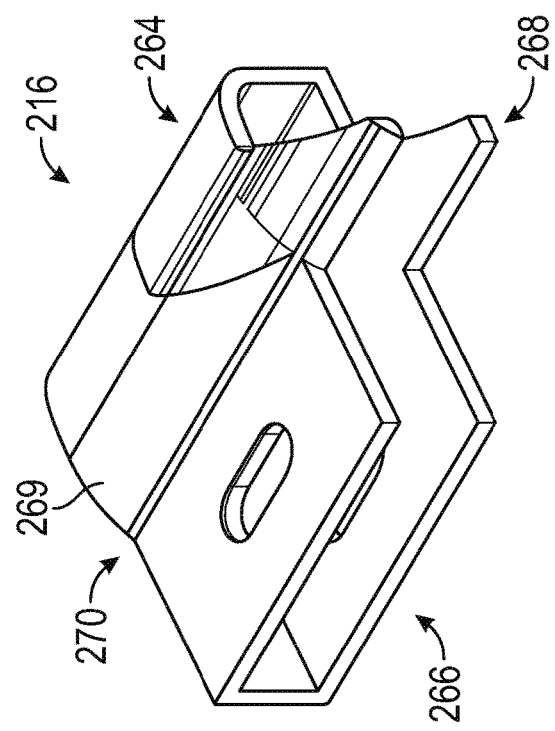
FIG. 17A is a perspective view of an exemplary left wire exit end cap according to some aspects of the present disclosure.
Figure 17C:
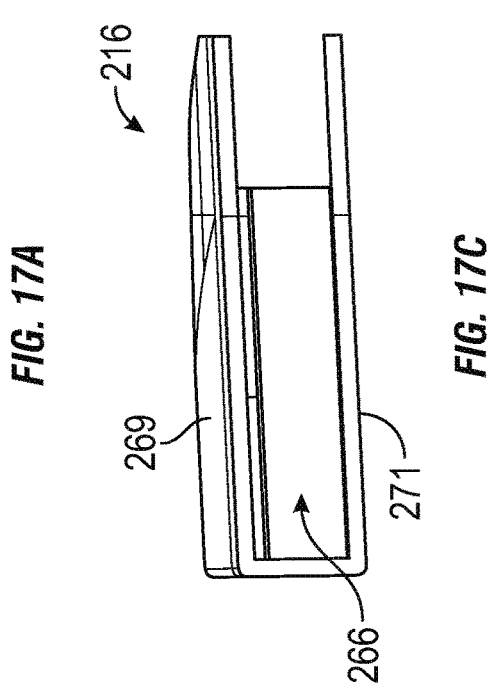
FIG. 17C is an elevation view of a bottom of the exemplary left wire exit end cap shown in FIG. 17A.
Figure 18B:
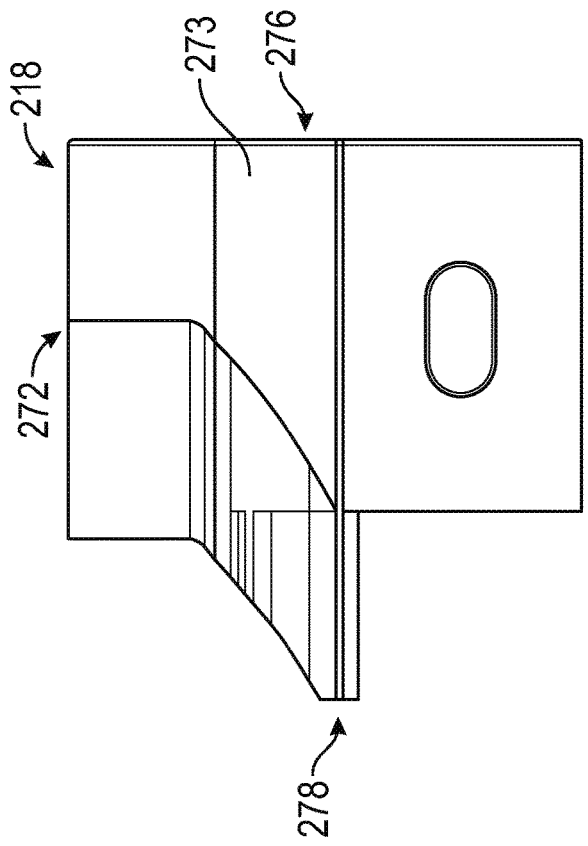
FIG. 18B is an elevation view of a side of the exemplary right wire exit end cap shown in FIG. 18A.
Figure 18D:
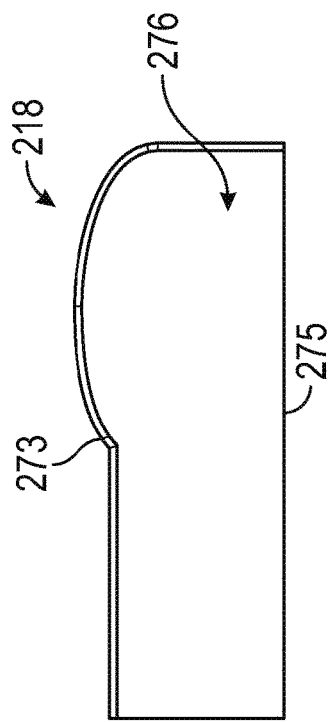
FIG. 18D is an elevation view of another side of the exemplary right wire exit end cap shown in FIG. 18A.
Figure 18A:
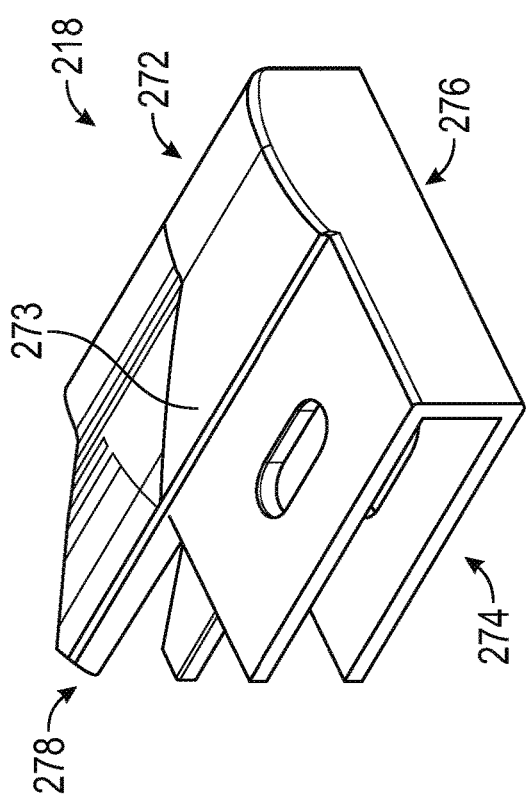
FIG. 18A is a perspective view of an exemplary right wire exit end cap according to some aspects of the present disclosure.
Figure 18C:
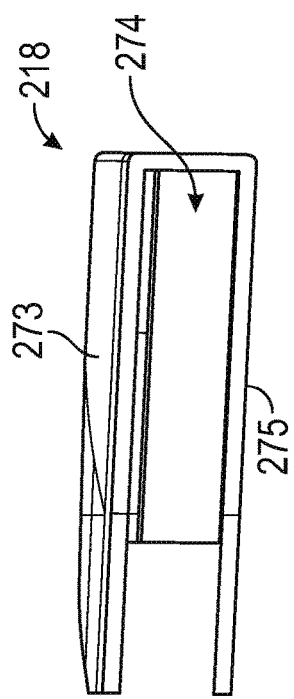
FIG. 18C is an elevation view of a bottom of the exemplary right wire exit end cap shown in FIG. 18A.
Figure 19B:
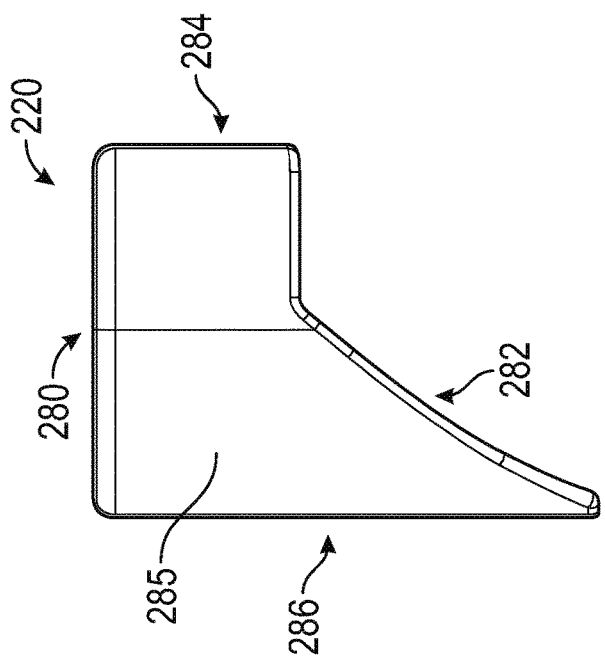
FIG. 19B is an elevation view of a side of the exemplary left end cap shown in FIG. 19A.
Figure 19D:
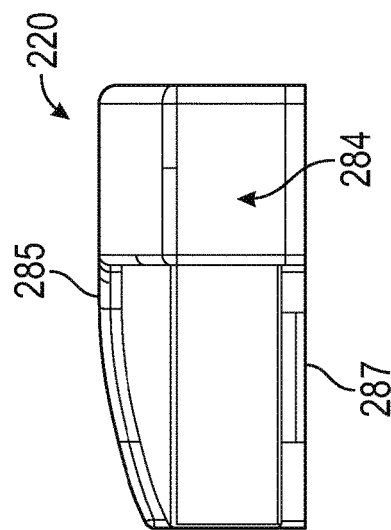
FIG. 19D is an elevation view of another side of the exemplary left end cap shown in FIG. 19A.
Figure 19A:
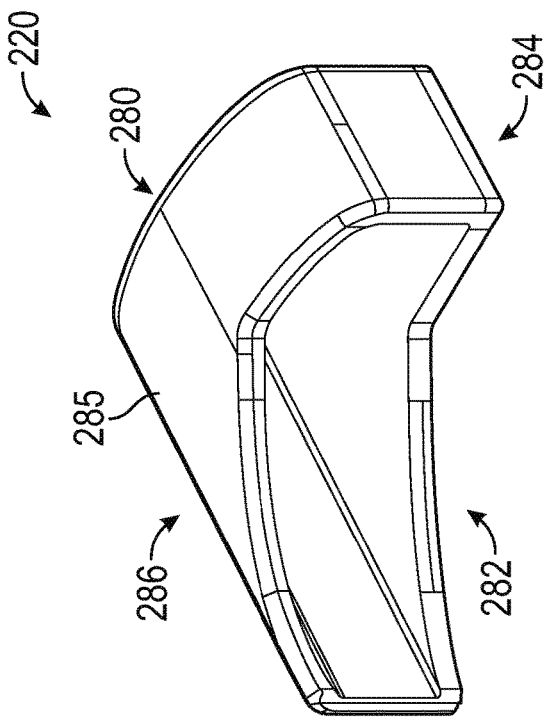
FIG. 19A is a perspective view of an exemplary left end cap according to some aspects of the present disclosure.
Figure 19C:
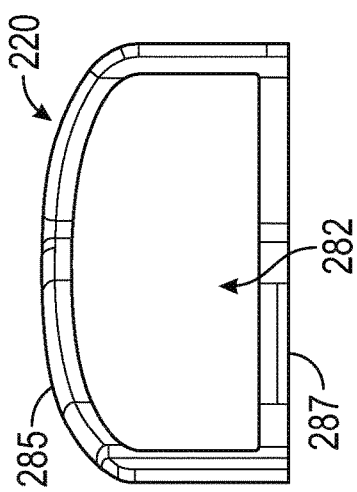
FIG. 19C is an elevation view of a bottom of the exemplary left end cap shown in FIG. 19A.
Figure 20B:
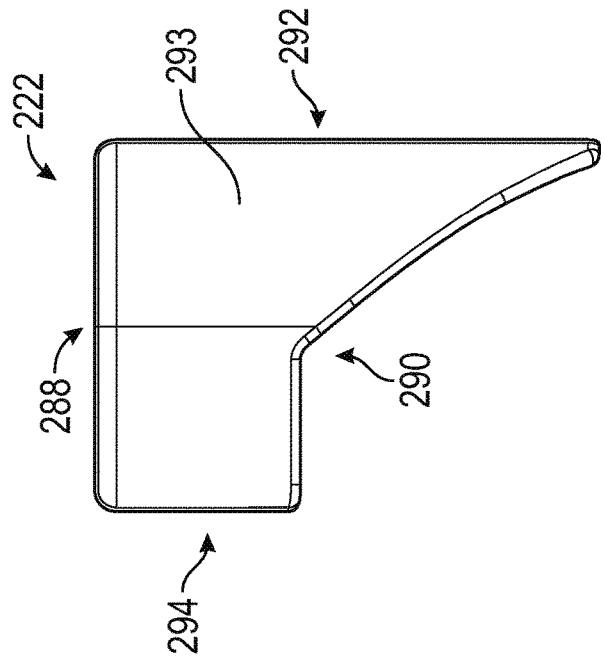
FIG. 20B is an elevation view of a side of the exemplary right end cap shown in FIG. 20A.
Figure 20D:
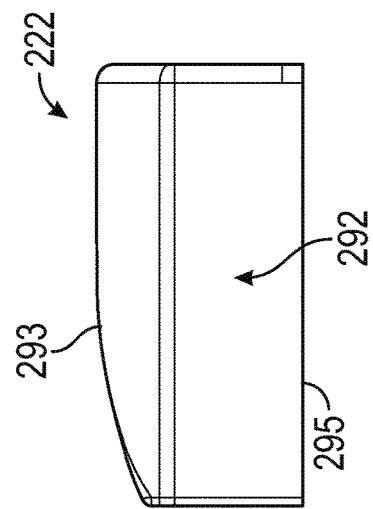
FIG. 20D is an elevation view of another side of the exemplary right end cap shown in FIG. 20A.
Figure 20A:
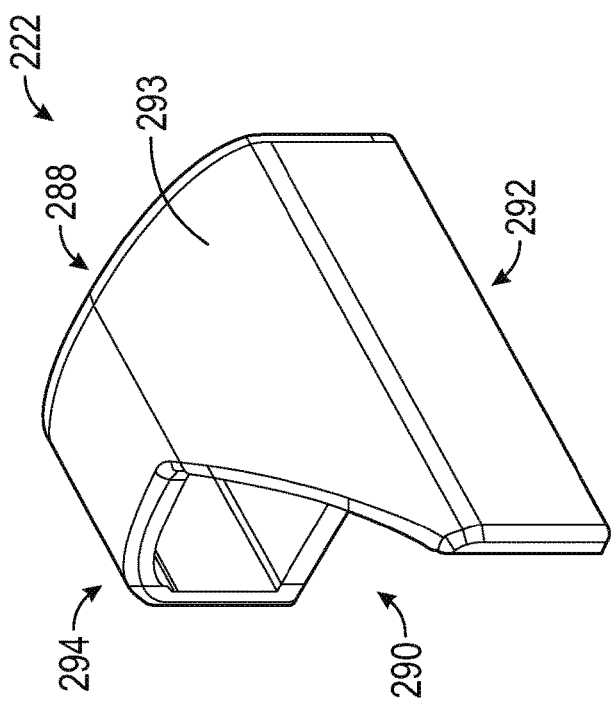
FIG. 20A is a perspective view of an exemplary right end cap according to some aspects of the present disclosure.
Figure 20C:
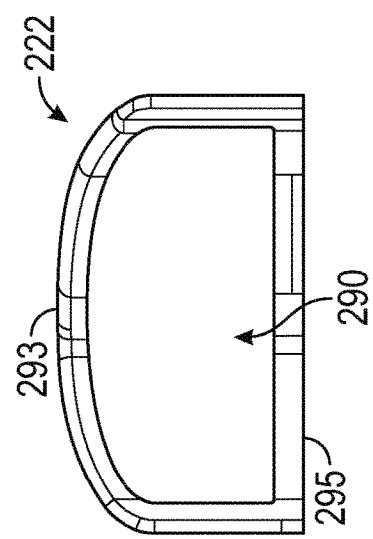
FIG. 20C is an elevation view of a bottom of the exemplary right end cap shown in FIG. 20A.
Figure 22A:
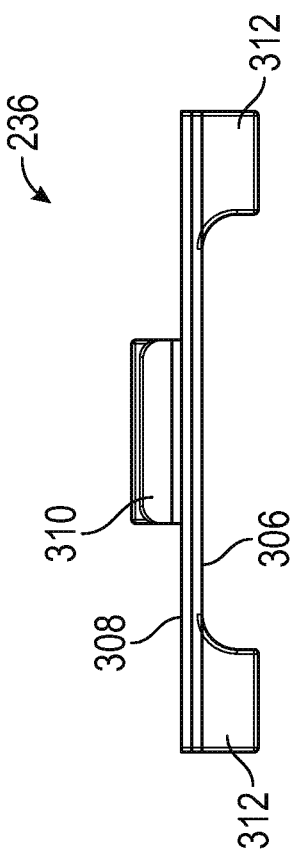
FIG. 22A is a perspective view of an exemplary light bar bracket according to some aspects of the present disclosure.
Figure 22B:
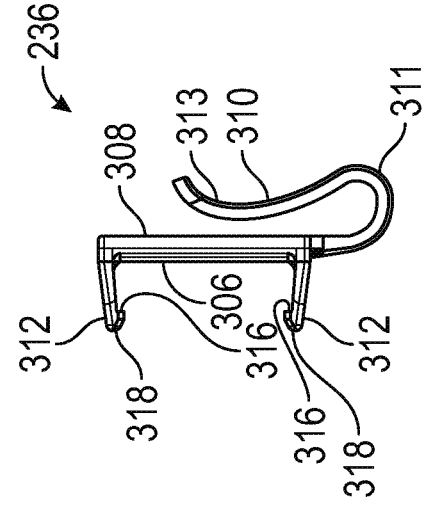
FIG. 22B is an elevation view of a top of the exemplary light bar bracket shown in FIG. 22A.
Figure 22C:
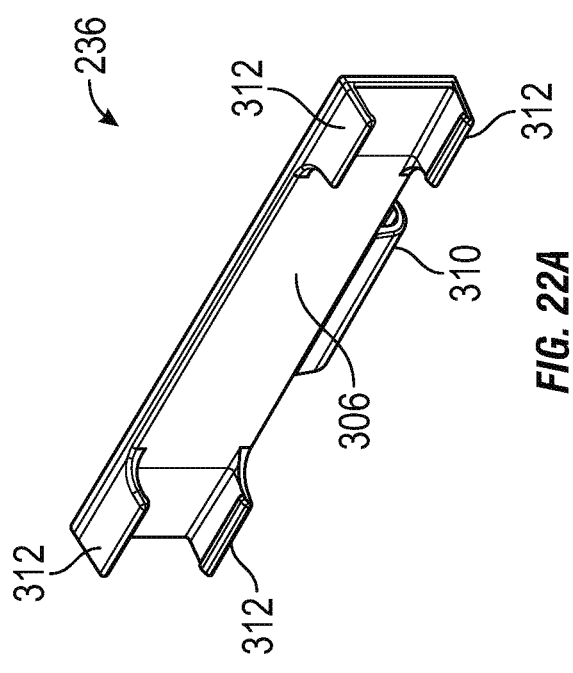
FIG. 22C is an elevation view of a front of the exemplary light bar bracket shown in FIG. 22A.
Figure 22D:
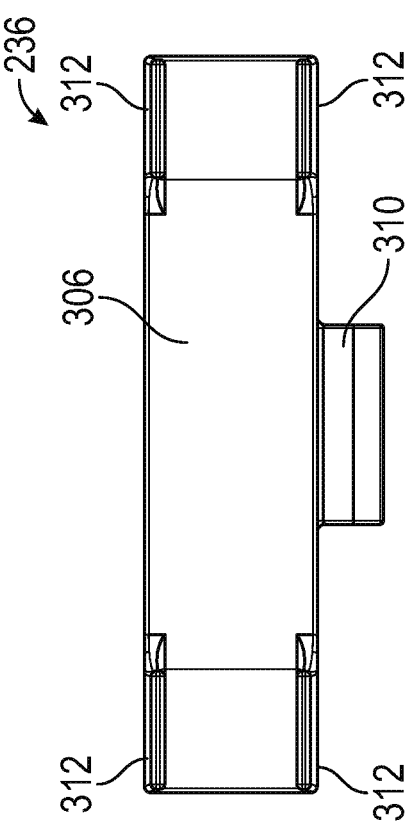
FIG. 22D is an elevation view of a side of the exemplary light bar bracket shown in FIG. 22A.
Figure 23B:
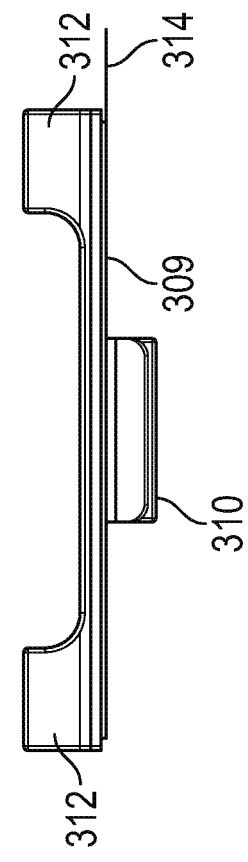
FIG. 23B is an elevation view of a top of the exemplary light bar bracket shown in FIG. 23A.
Figure 23D:
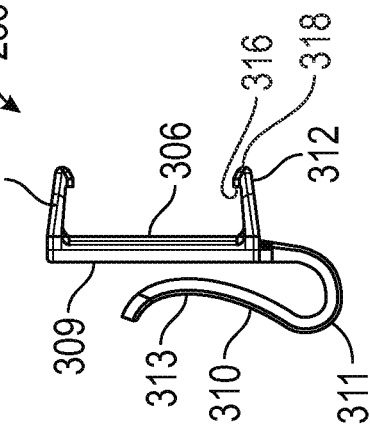
FIG. 23D is an elevation view of a side of the exemplary light bar bracket shown in FIG. 23A.
Figure 23A:
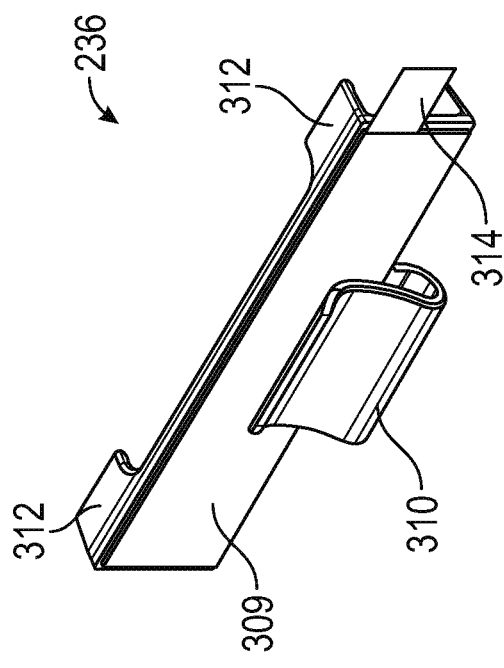
FIG. 23A is a perspective view of another embodiment of an exemplary light bar bracket according to some aspects of the present disclosure.
Figure 23C:
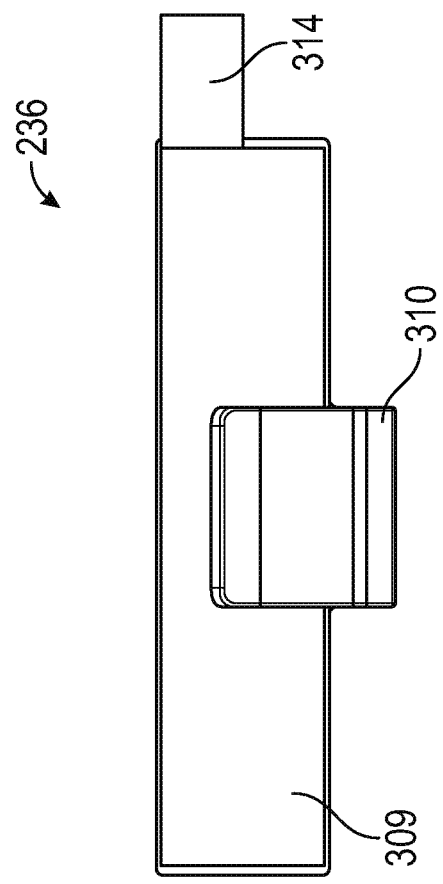
FIG. 23C is an elevation view of a back of the exemplary light bar bracket shown in FIG. 23A.

FIGS. 16A and 16B show an exemplary ECU bracket 210, which may be included as part of the assembly 200 according to some aspects of the present disclosure. The ECU bracket 210 may include various holes and/or other protrusions that facilitate a nut and bolt type of connection and/or attachment. However, any other means of attachment and/or connection mentioned herein could be used. The ECU bracket 210 can include different bends and formations as shown in FIGS. 16A-B. The ECU bracket 210 can be formed with one or more bends and/or cuts. The ECU bracket 210 can be of any reasonable size, shape, and/or design. According to an exemplary embodiment, the ECU bracket 210 has a height of about 135 mm, however any suitable size of the ECU bracket 210 is contemplated herein.

FIGS. 17A-D each show an exemplary left wire exit end cap 216 according to some aspects of the current disclosure. The left wire exit end cap 216 can include a top 264, bottom 266, right 268, front 269, left 270, and back 271. The top 264 and left 270 of the left wire exit end cap 216 can be enclosed and the bottom 266 and right 268 can be open wherein a hollow portion of the left wire exit end cap 216 is created. The front 269 and back 271 of the left wire exit end cap 216 can each include an opening generally in the shape of an oval. As seen in FIGS. 17A-D, the front 269 of the left wire exit end cap 216 can include a curved portion wherein the curved portion substantially matches, or is slightly larger than, the curvature of the left-side housing 238 of the light bar 202 such that the left-side housing 238 can be inserted into part of the hollow of the left wire exit end cap 216 and fit snugly and securely. The back 271 of the left wire exit end cap 216 can be generally flat and/or planar in order to facilitate effective attachment to the vehicle. The left wire exit end cap 216 can be attached to the vehicle using adhesives, ties, nut and bolt connection, and/or any other means of attachment and/or connection mentioned herein. The left wire exit end cap 216 can be configured to receive an end of the left-side housing 238 of the light bar 202 in part of the hollow portion of the left wire exit end cap 216. The left wire exit end cap 216 can help facilitate a stable and durable attachment of the left-side housing 238 to the vehicle. The left wire exit end cap 216 can be of any reasonable size, shape, and/or design. According to an exemplary embodiment, the left side 270 of the left wire exit end cap 216 is about 34 mm in length and the bottom 266 of the left wire exit end cap 216 is about 40 mm in length, however any suitable size of the left wire exit end cap 216 is contemplated herein. As noted above, the left wire exit end cap 216 can facilitate effective, efficient, and organized exit of wiring from the left-side housing 238. Also, as mentioned above, the left wire exit end cap 216 can create a weatherproof seal on one end of the left-side housing 238 to protect the contents of the left-side housing 238 and to prevent moisture, dirt, rocks, etc. from entering the left-side housing 238.

FIGS. 18A-D each show an exemplary right wire exit end cap 218 according to some aspects of the current disclosure. The right wire exit end cap 218 can include a top 272, front 273, bottom 274, back 275, right 276, and left 278. The right wire exit end cap 218 is similar to the left wire exit end cap 216 except that it is a mirror image of the left wire exit end cap 216. The top 272 and right 276 of the right wire exit end cap 218 can be enclosed and the bottom 274 and left 278 can be open wherein a hollow portion of the right wire exit end cap 218 is created. The front 273 and back 275 of the right wire exit end cap 218 can each include an opening generally in the shape of an oval. As seen in FIGS. 18A-D, the front 273 of the right wire exit end cap 218 can include a curved portion wherein the curved portion substantially matches, or is slightly larger than, the curvature of the right side housing 248 of the light bar 202 such that the right side housing 248 can be inserted into part of the hollow portion of the right wire exit end cap 218 and fit snugly and securely. The back 275 of the right wire exit end cap 218 can be generally flat and/or planar in order to facilitate effective attachment to the vehicle. The right wire exit end cap 218 can be attached to the vehicle using adhesives, ties, nut and bolt connection, and/or any other means of attachment and/or connection mentioned herein. The right wire exit end cap 218 can be configured to receive an end of the right-side housing 248 of the light bar 202 in part of the hollow portion of the right wire exit end cap 218. The right wire exit end cap 218 can help facilitate a stable and durable attachment of the right-side housing 248 to the vehicle. The right wire exit end cap 218 can be of any reasonable size, shape, and/or design. According to an exemplary embodiment, the right side 276 of the right wire exit end cap 218 is about 34 mm in length and the bottom 274 of the right wire exit end cap 218 is about 40 mm in length, however any size of the right wire exit end cap 218 is contemplated herein. As noted above, the right wire exit end cap 218 can facilitate effective, efficient, and organized exit of wiring from the right-side housing 248. Also, as mentioned above, the right wire exit end cap 218 can create a weatherproof seal on one end of the right-side housing 248 to protect the contents of the right-side housing 248 and to prevent moisture, dirt, rocks, etc. from entering the right-side housing 248.

FIGS. 19A-D each show an exemplary left end cap 220 according to some aspects of the current disclosure. The left end cap can include a top 286, bottom 284, right 280, front 285, left 282, and back 287. The top 286 and right side 280 can be enclosed, the bottom side 284 can be partially enclosed, and the left side 282 can be open wherein a hollow portion of the left end cap 220 is created. The top 286 can be configured as an elongated, straight portion. The back 287 can be generally flat and/or planar to facilitate effective attachment to the vehicle, and the front 285 can include a curved portion wherein the curved portion of the front 285 substantially matches, or is slightly larger than, the curvature of the left-side housing 238 of the light bar 202 such that the left-side housing 238 can be inserted into the hollow portion of the left end cap 220 and fit snugly and securely. The left end cap 220 can be attached to the vehicle using adhesives, ties, nut and bolt connection, and/or any other means of attachment and/or connection mentioned herein. The left end cap 220 can be configured to receive an end of the left-side housing 238 of the light bar 202 in the hollow portion of the left end cap 220. The left end cap 220 can help facilitate a stable and durable attachment of the left-side housing 238 to the vehicle. The left end cap 220 can be of any reasonable size, shape, and/or design. According to an exemplary embodiment, the top 286 of the left end cap 220 is about 25 mm in length and the distance between the back 287 and the apex of the curved portion of the front 285 is about 11 mm, however any suitable size of the left end cap 220 is contemplated herein.

FIGS. 20A-D each show an exemplary right end cap 222 according to some aspects of the current disclosure. The right end cap can include a top 292, bottom 294, right 290, front 293, left 288, and back 295. The right end cap 222 is similar to the left end cap 220 except that it is a mirror image of the left end cap 220. The top 292 and left side 288 can be enclosed, the bottom side 294 can be partially enclosed, and the left side 288 can be open wherein a hollow portion of the right end cap 222 is created. The top 292 can be configured as an elongated, straight portion. The back 295 can be generally flat and/or planar to facilitate effective attachment to the vehicle, and the front 293 can include a curved portion wherein the curved portion of the front 293 substantially matches, or is slightly larger than, the curvature of the right side housing 248 of the light bar 202 such that the right side housing 248 can be inserted into the hollow portion of the right end cap 222 and fit snugly and securely. The right end cap 222 can be attached to the vehicle using adhesives, ties, nut and bolt connection, and/or any other means of attachment and/or connection mentioned herein. The right end cap 222 can be configured to receive an end of the right-side housing 248 of the light bar 202 in the hollow portion of the right end cap 222. The right end cap 222 can help facilitate a stable and durable attachment of the right-side housing 248 to the vehicle. The right end cap 222 can be of any reasonable size, shape, and/or design. According to an exemplary embodiment, the top 292 of the right end cap 222 is about 25 mm in length and the distance between the back 295 and the apex of the curved portion of the front 293 is about 11 mm, however any suitable size of the right end cap 222 is contemplated herein.

FIGS. 21A-D each show an exemplary center cap 224 according to some aspects of the present disclosure. The exemplary center cap 224 can include a top 300, bottom 302, arms 304, outward facing front 296, and inward facing back 298. The center cap 224 can help facilitate a stable and durable attachment of the light bar 202 to the vehicle. The center cap 224 can be connected and/or attached to the vehicle by adhesives or any other means of connection and/or attachment mentioned herein. The front face 296 and rearward facing back 298 can be curved wherein the curve substantially matches, or is slightly larger than, the curvature of the right-side housing of the light bar 202 such that the housing can be inserted into a hollow portion of the center cap 224 and fit snugly and securely. When the housing of the light bar 202 is inserted within the center cap 224, the arms 304 work together to secure the housing. The outward facing front 296 of the center cap 224 can include a logo, company name, or any other type of advertising and/or promotional information. The outward facing front 296 of the center cap 224 could include the logo and/or make and/or model names of the vehicle upon which it is attached. The outward facing front 296 faces outward so that it can be viewed by individuals when attached to the vehicle. The outward facing front 296 can include translucent and/or transparent portions so that when LEDs housed within the light bar 202 are illuminated, light can be emitted through the outward facing front 296. While the embodiment of FIG. 7 only includes one center cap 224 attached to the left-side housing 238 of the light bar 202, it is contemplated that any number of center caps 224 greater than or equal to zero could be included. Also, one or more center caps 224 could be attached to the left-side housing 238, right side housing 248, and/or both. The center cap 224 can be of any reasonable size, shape, and/or design. According to an exemplary embodiment, the top 300 of the center cap 224 is about 105 mm in length, the distance between the arms 304 and the apex of the curved portion of the front 296 is about 11 mm, and height of the center cap 224 measure from bottom 302 to top 300 is about 19 mm, however any suitable size of the center cap 224 is contemplated herein.

FIGS. 22A-D each show a light bar bracket 236 according to some aspects of the present disclosure. The exemplary light bar bracket of FIGS. 22A-D can include an outward facing front 306, an inward facing back 308, a clip 310, arms 312, notch(es) 316, and guiding surface(s) 318. Additionally, it should be noted that the light bar brackets 236 can be the brackets/clips 28 mentioned above and/or can include any and all of the characteristics, functionality, and/or features of the brackets/clips 28 mentioned above. The light bar bracket 236 may be those that are described in U.S. Pat. Nos. 11,022,268 or 10,859,229, which are both already incorporated by reference in their entirety. The outward facing front 306 and inward facing back 308 can be generally rectangular as shown in FIGS. 22A-D. The brackets 236 shown in FIGS. 22A-D can be used to attach a light bar 202 of the lighting assembly 200 to a vehicle. The inward facing back 308 can be generally flat and/or planar to facilitate effective attachment to the vehicle. The brackets 236 can be attached to a vehicle by any reasonable means, including but not limited to, screws, nuts and bolts, drilling, fasteners, adhesives, ties, friction fit, and/or any other means of attachment mentioned herein. The light bar 202, which includes a housing, and/or portions of the light bar 202 can then be inserted into the bracket/clip 28 to facilitate effective attachment of the light bar 202 or portions thereof to the vehicle.

Light bar bracket 236 is formed of any suitable size, shape and design and is configured to connect generic housing 12, which could include left-side housing 238 and/or right-side housing 248, of the light bar 202 to a vehicle. In one arrangement, as is shown, bracket 236 has an inward facing back 308 that faces the vehicle and is in contact with the vehicle when the bracket(s) 236 are attached to the vehicle. Back 308 is generally planar and rectangular.

A pair of opposing arms 312 are connected to each end of bracket 236. Arms 312 are connected to the longer sides of the rectangular bracket 236 and extend upward a distance from outward facing front 306. An outward end of each arm 312 is in alignment with a long side of the rectangular bracket 236 and extends inward a distance therefrom. Arms 312 include a locking feature 316 positioned at their outward most end. Locking features 316 are formed of any suitable size, shape and design and are designed to engage and lock housing 12 into bracket 236. In one arrangement, locking features 316 are formed of a step or ledge or hook that matingly engage the feature 38 of the light bar 202 or step in the exterior surface of housing 12 positioned at the intersection of cover portion 36 and sidewalls 34. In the arrangement shown, locking features 316 on opposing arms 312 extend inward and over the outward facing front 306 a distance. Accordingly, to facilitate locking engagement, arms 312 extend upward from outward facing front 306 approximately the same distance as sidewall 34 of housing 12.

To further facilitate a firm, durable, and strong connection between bracket 236 and housing 12, arms 312 are slightly biased inward toward one another. This causes the distance between the outward ends of arms 312 to be slightly narrower than the width of housing 12. As such, when housing 12 is placed between opposing arms 312 and locked into place an inward force is applied on housing 12 by arms 312. This helps to hold housing 12 within bracket 236. This also helps to keep engagement between locking feature 316 of arm 312 and the feature 38 of housing 12.

Due to the slight inward bias of the arms 312 of bracket 236, the outward most ends of arms 312 include a curved or angled guiding surface 318. The guiding surface 318 helps to guide the housing 12 into the space between opposing arms 312. In the arrangement shown, the guiding surface 318 curves or angles inward from the upper most end of arms 312 down to the step of locking feature 316. This causes the upper ends of the guiding surface 318 to be wider than the width of back wall 32 of housing 12, while the lower end of the guiding surface 318 is narrower than the width of back wall 32 of housing 12. This causes the arms 312 to flex or bend outward as the light bar 10 is forced within the bracket 236.

The inward facing back 308 is flat and thereby provides maximum surface area for connection to the body of vehicle. This allows for the use of an adhesive, such as a double-sided tape or foam or gel to be positioned between the back 308 of bracket 236 and the body of vehicle. Using adhesive eliminates the need to put screws or bolts into the body of vehicle, simplifies the installation process, speeds the installation process, eliminates the need to use tools to install the brackets 236, and provides a durable installation.

The exemplary bracket 236 of FIGS. 22A-D also includes a clip 310. In addition to adhesives, ties, nut and bolt connection, and/or other means of attaching the bracket 236 to the vehicle, the clip 310 provides even additional means of attachment. The clip 310 of bracket 236 can grab ahold of elements of the vehicle to facilitate an even more stable and durable attachment. An adhesion promoter can also be included as part of the assembly to facilitate effective attachment of the brackets 236 to the vehicle. The clip 310 can include a curved portion 311 and a flange portion 313 to facilitate grabbing ahold of element of the vehicle to form a more stable and durable connection.

The brackets 236 can be of any reasonable size, shape, and/or design. According to an exemplary embodiment, the bracket 236 is about 85 mm in length, the width of the bracket 236 measured from the apex of the curved portion 311 of the clip 310 is about 27 mm, and the thickness of the clip 310 can be about 1 mm, however any suitable size of the bracket 236 is contemplated herein.

Additionally, according to some aspects of the present disclosure, the light bar 202 can be installed with the brackets 236 in the same manner as described above regarding light bar/assembly 10 and brackets/clips 28.

FIGS. 23A-D show the exemplary light bar bracket 236 of FIGS. 22A-D with the addition of adhesive tape 309 that includes a tab 314. The manufactured brackets 236 may include adhesive tape 309 attached to the inward facing back 308. The adhesive tape 309 may be 3M tape. The tape 309 may include a tape backer. An adhesion promoter can also be used in conjunction with the tape 309 to form a more stable and durable attachment. When the bracket is ready to be installed on the vehicle, the installer can remove the tape 309 by pulling on the tap 314. The tab 314 provides easy, quick, and efficient removal of the adhesive tap 309. Thereby the sticky inward facing back 308 can then be attached to the vehicle via adhesion. The adhesive tape 309 and tab 314 can be of any reasonable size, shape, and/or design. According to an exemplary embodiment, the adhesive tape 309 is generally rectangular with dimensions of about 18 mm×80 mm (about the same dimensions and/or slightly smaller than that of the rectangular inward facing back 308) and the tab 314 is generally rectangular with a height of about 9 mm, however any size of the adhesive tape 309 and tab 314 is contemplated herein.

FIG. 24 shows an exemplary embodiment of a left-side circuit board 400 according to some aspects of the disclosure. The left-side circuit board 400 can be inserted into the left-side housing 238 of the light bar 202 according to any of the installation steps mentioned above. The left-side circuit board 400 may be placed in the hollow portion of the left-side housing 238 of the light bar 202 between the cover portion 242 of the left-side housing 238 and the rear face 240 of the left-side housing 238. The left-side circuit board 400 can be positioned within the left-side housing 238 such that the LEDs of the left-side circuit board 400 are aligned with the translucent and/or transparent cover portion 242 of the left-side housing 238. Therefore, when the LEDs are illuminated (i.e., turned ON), light will escape from the translucent and/or transparent cover portion 242 of the light bar 202. The configuration of the left-side circuit board 400 in FIG. 24 includes a left first red block 406, a left second red block 408, a left third red block 410, and a white block 404. The three red blocks 406, 408, 410 can make up a section of red LEDs and the white block 404 can make up a section of white LEDs. Each block comprises a plurality of LEDs. The white block 404 includes a plurality of white LEDs and the red blocks 406, 408, 410 each include a plurality of red LEDs. While the exemplary left-side circuit board 400 of FIG. 24 includes three blocks of red LEDs and one block of white LEDs, it is contemplated that any number of different blocks of different colored LEDs could be used. Other colored LEDs that could be used include blue and amber, however, any color of LED could be used. Additionally, blocks of LEDs can vary in shape, size, and/or arrangement. Also, individual LEDs or rows of LEDs could be included wherein the LED is not part of a block. Also, layers of different blocks of LEDs could be included. Furthermore, while the left-side circuit board 400 of FIG. 24 is arranged such that the blocks of red LEDs appear to the left of the block of white LEDs and wherein the red blocks 406, 408, 410 and the white block 404 are all on the same horizontal plane, it is contemplated that the blocks of LEDs can be arranged in any manner. The circuitry involved with the left-side circuit board 400 will be described in detail below.

As can be seen in FIG. 24, a portion of the left-side circuit board 400 can be included between the left first red block 406 and the white block 404 such that no LEDs are positioned in said portion. Said portion can be of such size as the center cap 224. Therefore, the center cap 224 cap be positioned over said portion of left-side circuit board 400 and left-side housing 238. As mentioned above, the center cap 224 can provide additional stability and durability of the attachment of the light bar 202 to the vehicle. Also, by being able to position the center cap 224 over said portion of the light bar 202, the advertising, logo, trademark, company name, slogan, etc. that is shown on the outward facing front 296 of the center cap 224 can be prominently displayed on the light bar 202 and/or vehicle without disrupting visibility of the LEDs of the light bar 202. Additionally, the size of said portion the left-side circuit board 400 described in this paragraph can be of varying sizes.

The left-side circuit board 400 can be of any reasonable size, shape, and/or design. According to an exemplary embodiment, the left-side circuit board 400 is generally rectangular having dimensions of about 735 mm×13 mm and a left second red block 408 is generally rectangular having dimensions of about 140 mm×13 mm, however any size of the left-side circuit board 400 and left second red block 408, or any block of LEDs, is contemplated herein. According to some embodiments each block of LEDs is 96 mm in length.

The exemplary left-side circuit board 400 can be a printed circuit board having the characteristics of thermal conductivity of greater than or equal to 1 W/mK (1 watt/meter-Kelvin), a Glass Transition Temperature (Tg) greater than or equal to 125 degrees Celsius, that the board 400 passes the 94V-0 flammability test, and that the left-side housing 238 is aluminum. The thermal conductivity can be provided by insulation layers.

FIG. 25A shows a zoomed in view of a portion of the exemplary left third red block 410 of FIG. 24 such that the components included on the left-side circuit board 400 are viewable.

FIG. 25B shows a zoomed in view of another portion of the exemplary left third red block 410 of FIG. 24 such that the components included on the left-side circuit board 400 are viewable. While the left third red block 410 shown in FIG. 25A-B includes a specific number of LEDs in a specific arrangement, it is contemplated that any reasonable number of LEDs could be used in any reasonable arrangement.

FIG. 26A shows a zoomed in view of a portion of the exemplary left second red block 408 of FIG. 24 such that the components included on the left-side circuit board 400 are viewable.

FIG. 26B shows a zoomed in view of another portion of the exemplary left second red block 408 of FIG. 24 such that the components included on the left-side circuit board 400 are viewable. While the left second red block 408 shown in FIG. 26A-B includes a specific number of LEDs in a specific arrangement, it is contemplated that any reasonable number of LEDs could be used in any reasonable arrangement.

FIG. 27A shows a zoomed in view of a portion of the exemplary left first red block 406 of FIG. 24 such that the components included on the left-side circuit board 400 are viewable.

Figure 27B:
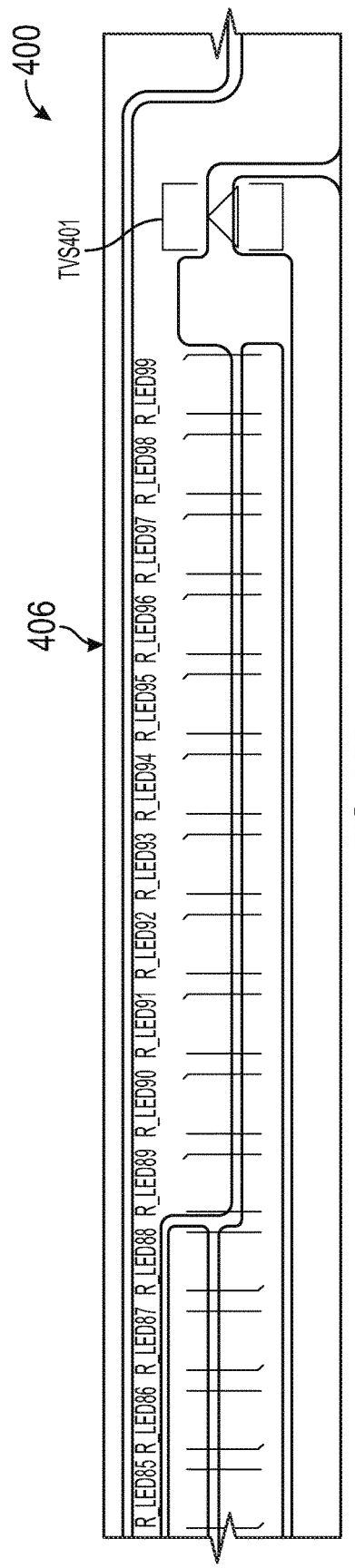
FIG. 27B is a zoomed in view of a portion of the exemplary circuit board shown in FIG. 24 that includes a portion of left first red block 406.

FIG. 27B shows a zoomed in view of another portion of the exemplary left first red block 406 of FIG. 24 such that the components included on the left-side circuit board 400 are viewable. While the left first red block 406 shown in FIG. 27A-B includes a specific number of LEDs in a specific arrangement, it is contemplated that any reasonable number of LEDs could be used in any reasonable arrangement.

Figure 28A:
FIG. 28A is a zoomed in view of a portion of the exemplary circuit board shown in FIG. 24 that includes a portion of white block 404.

FIG. 28A shows a zoomed in view of a portion of the exemplary white block 404 of FIG. 24 such that the components included on the left-side circuit board 400 are viewable.

Figure 28B:
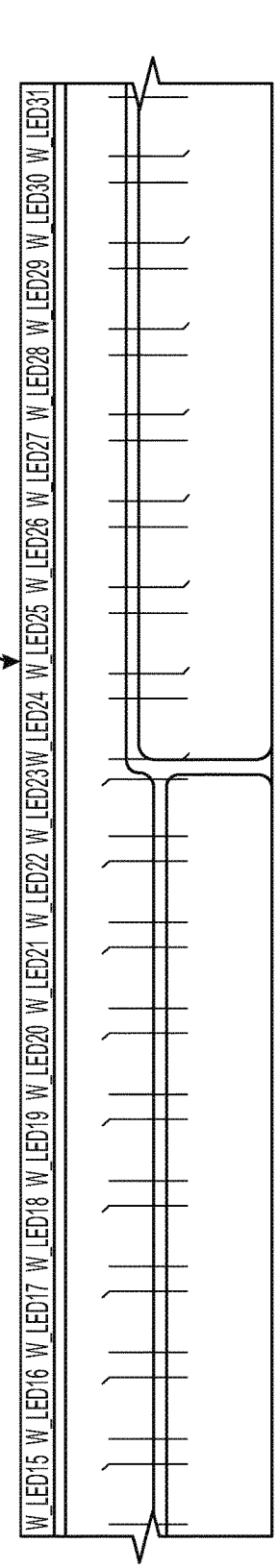
FIG. 28B is a zoomed in view of a portion of the exemplary circuit board shown in FIG. 24 that includes a portion of white block 404.

FIG. 28B shows a zoomed in view of another portion of the exemplary white block 404 of FIG. 24 such that the components included on the left-side circuit board 400 are viewable.

Figure 28C:
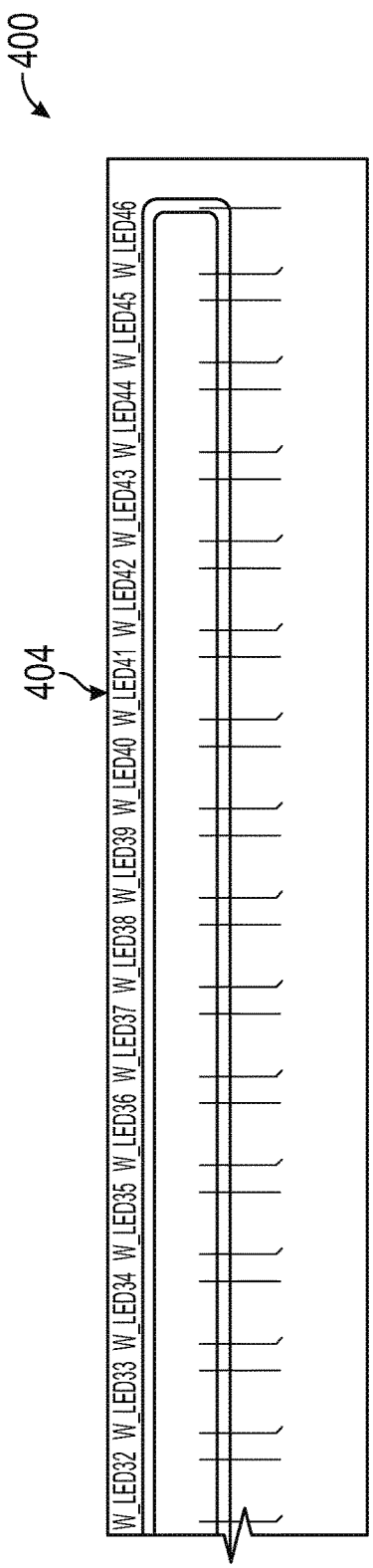
FIG. 28C is a zoomed in view of a portion of the exemplary circuit board shown in FIG. 24 that includes a portion of white block 404.

FIG. 28C shows a zoomed in view of another portion of the exemplary white block 404 of FIG. 24 such that the components included on the left-side circuit board 400 are viewable. While the white block 404 shown in FIG. 28A-C includes a specific number of LEDs in a specific arrangement, it is contemplated that any reasonable number of LEDs could be used in any reasonable arrangement.

Figure 29:
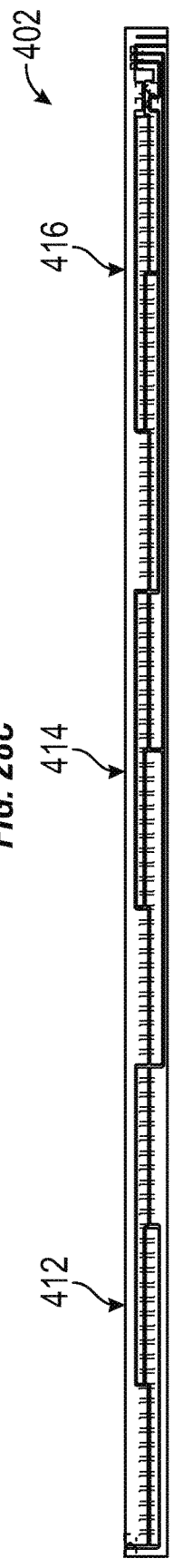
FIG. 29 is schematic view of another exemplary circuit board to be housed within another portion of the light bar according to some aspects of the present disclosure. The exemplary circuit board shown in FIG. 29 may be a right-side circuit board to be housed within the right side of the light bar.

FIG. 29 shows an exemplary embodiment of a right-side circuit board 402 according to some aspects of the disclosure. The right-side circuit board 402 can be inserted into the right-side housing 248 of the light bar 202 according to any of the installation steps mentioned above. The right-side circuit board 402 may be placed in the hollow portion of the right-side housing 248 of the light bar 202 between the cover portion 252 of the right-side housing 248 and the rear face 250 of the right-side housing 248. The right-side circuit board 402 can be positioned within the right-side housing 248 such that the LEDs of the right-side circuit board 402 are aligned with the translucent and/or transparent cover portion 252 of the right-side housing 248. Therefore, when the LEDs are illuminated (i.e., turned ON), light will escape from the translucent and/or transparent cover portion 252 of the light bar 202. The configuration of the right-side circuit board 402 in FIG. 29 includes a right first red block 412, a right second red block 414, and a right third red block 416. The three red blocks 412, 414, 416 can make up a section of red LEDs. Each block comprises a plurality of red LEDs. While the exemplary right side circuit board 402 of FIG. 29 includes three blocks of red LEDs, it is contemplated that any number of different blocks of different colored LEDs could be used. Other colored LEDs that could be used include white, blue, and amber, however, any color of LED could be used. Additionally, blocks of LEDs can vary in shape, size, and/or arrangement. Also, individual LEDs or rows of LEDs could be included wherein the LED is not part of a block. Also, layers of different blocks of LEDs could be included. Furthermore, while the right-side circuit board 402 of FIG. 29 is arranged such that the blocks of red LEDs 412, 414, 416 are all on the same horizontal plane, it is contemplated that the blocks of LEDs can be arranged in any manner. The circuitry involved with the right-side circuit board 402 will be described in detail below.

The right-side circuit board 402 can be of any reasonable size, shape, and/or design. According to an exemplary embodiment, the right-side circuit board 402 is generally rectangular having dimensions of about 460 mm×13 mm and a right second red block 414 is generally rectangular having dimensions of about 140 mm×13 mm, however any size of the right-side circuit board 402 and right second red block 414, or any block of LEDs, is contemplated herein. According to some embodiments each block of LEDs is 96 mm in length. According to some aspects of the present disclosure, the right-side circuit board 402 could have the same characteristics, functionality, and/or features as the left-side circuit board 400. According to some aspects of the present disclosure the left side 204 of the light bar 202 is configured to be attached to the vehicle wherein the block of white LEDs 404 is configured to be in the middle of the red blocks of LEDs 406, 408, 410 of the left-side circuit board 400 and the blocks of red LEDs 412, 414, 416 of the right side circuit board 402, and wherein the left 204 and right 206 sides of the light bar 202 are attached in the same horizontal plane. In this embodiment, the section of red LEDs on the left-side circuit board 400 and the section of red LEDs on the right-side circuit board 402 are configured to be manipulated to blink in response to a signal from the electrical system of the vehicle that a left turn signal is engaged or that a right turn signal is engaged, respectively. Therefore, in this embodiment, the two sections of red LEDs, one on the left-side circuit board 400 and one on the right-side circuit board 402 are configured to be positioned on either side of the section of white LEDs of the left-side circuit board 400 to effectively function with the turn signals of the vehicle, both from a practical and aesthetic standpoint. However, other arrangements of the sides 204, 206 of the light bar 202 are contemplated herein.

The exemplary right side circuit board 402 can be a printed circuit board having the characteristics of a thermal conductivity greater than or equal to 1 W/mK (1 watt/meter-Kelvin), a Glass Transition Temperature (Tg) greater than or equal to 125 degrees Celsius, that the board 402 passes the 94V-0 flammability test, and that the right side housing 248 is aluminum. The thermal conductivity can be provided by insulation layers.

According to some embodiments of the present invention, the light bar 202 may be split into three portions wherein the third portion, in addition to the left side 204 and right side 206, could include its own circuit board(s) that may include any number of different individual LEDs of different colors and/or blocks and/or rows of LEDs of different colors. Colors of LEDs that could be used include white, red, blue, and amber, however, any color of LED could be used. Additionally, blocks of LEDs can vary in shape, size, and/or arrangement. Also, individual LEDs and/or rows of LEDs could be included wherein the LED is not part of a block. Also, layers of different blocks of LEDs could be included. Furthermore, the blocks of LEDs could be arranged in any reasonable manner. The circuit board of the third portion of the light bar 202 could have the same characteristics, functionality, and/or features of the left-side circuit board 400 and/or the right-side circuit board 402. The light bar 202 could comprise any number of additional portions. The position of the portions of the light bar 202, which could include the left side 204 and right side 206, or more portions, relative to one another as attached on the vehicle could vary horizontally and/or vertically such that any suitable arrangement of the portions of the light bar 202 is contemplated herein.

Figure 30A:
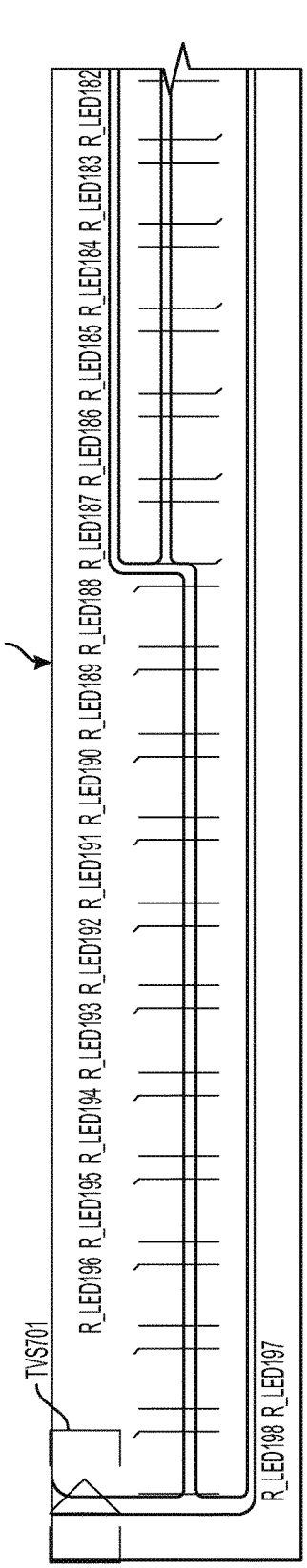
FIG. 30A is a zoomed in view of a portion of the exemplary circuit board shown in FIG. 29 that includes a portion of right first red block 412.

FIG. 30A shows a zoomed in view of a portion of the exemplary right first red block 412 of FIG. 29 such that the components included on the right-side circuit board 402 are viewable.

FIG. 30B shows a zoomed in view of another portion of the exemplary right first red block 412 of FIG. 29 such that the components included on the right-side circuit board 402 are viewable. While the right first red block 412 shown in FIG. 30A-B includes a specific number of LEDs in a specific arrangement, it is contemplated that any reasonable number of LEDs could be used in any reasonable arrangement.

FIG. 31A shows a zoomed in view of a portion of the exemplary right second red block 414 of FIG. 29 such that the components included on the right-side circuit board 402 are viewable.

FIG. 31B shows a zoomed in view of another portion of the exemplary right second red block 414 of FIG. 29 such that the components included on the right-side circuit board 402 are viewable. While the right second red block 414 shown in FIG. 31A-B includes a specific number of LEDs in a specific arrangement, it is contemplated that any reasonable number of LEDs could be used in any reasonable arrangement.

Figure 32A:
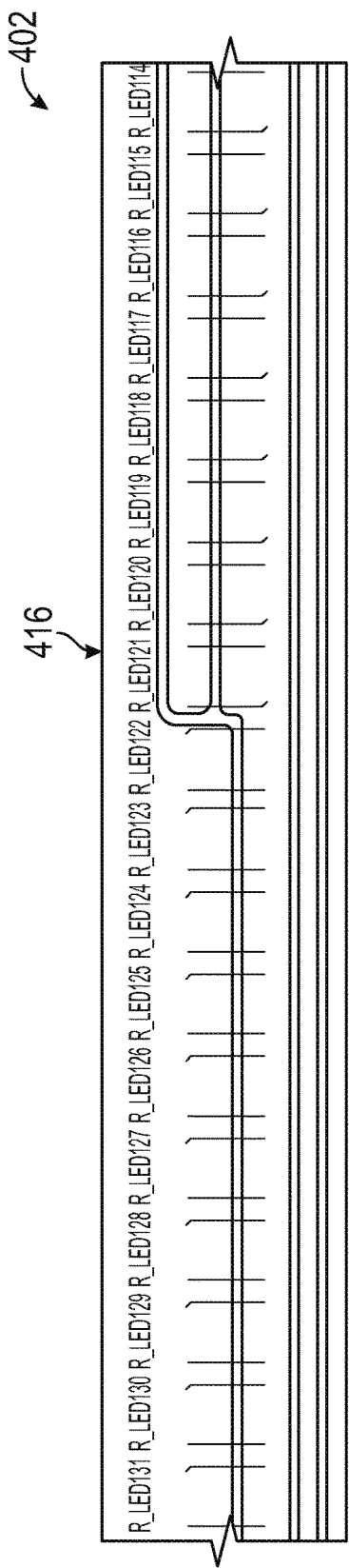
FIG. 32A is a zoomed in view of a portion of the exemplary circuit board shown in FIG. 29 that includes a portion of right third red block 416.

FIG. 32A shows a zoomed in view of a portion of the exemplary right third red block 416 of FIG. 29 such that the components included on the right-side circuit board 402 are viewable.

Figure 32B:
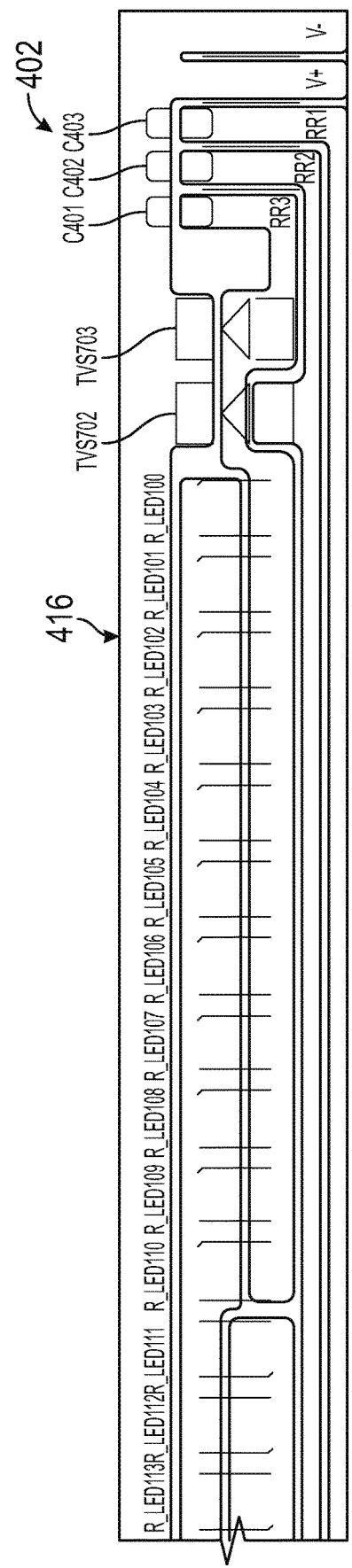
FIG. 32B is a zoomed in view of a portion of the exemplary circuit board shown in FIG. 29 that includes a portion of right third red block 416.

FIG. 32B shows a zoomed in view of another portion of the exemplary right third red block 416 of FIG. 29 such that the components included on the right-side circuit board 402 are viewable. While the right third red block 416 shown in FIG. 32A-B includes a specific number of LEDs in a specific arrangement, it is contemplated that any reasonable number of LEDs could be used in any reasonable arrangement.

According to some aspects of the disclosure, the various circuit boards and LEDs described herein are capable of producing light with varying characteristics. For example, the emitted light may vary based on its intensity. In some situations, the emitted light may have a relatively high intensity while in other situations a relatively low intensity. Additionally, the intensity of the emitted light may vary based on the type of LEDs that are used as well as other attributes. The intensity of the light may also be user-controlled.

Further, the emitted light may vary based on beam pattern/shape. For instance, the emitted light may employ a relatively narrow beam and/or a relatively wide beam. Additionally, the beam pattern may be a flood beam, a spot beam, a hybrid beam, a beam in which all LEDs are illuminated at the same time, or may be some other type of beam. Additional beam patterns and/or shapes may be used. The beam pattern/shape may be user-controlled. While intensity, color temperature, and beam pattern/shape are all examples of characteristics of the light produced by the assembly 200 that may vary, other characteristics of the light produced by the assembly 200 may vary as well.

FIGS. 33A-51 show detailed schematics of various aspects of the exemplary ECU/driver circuit board 403 according to some aspects of the present disclosure. The ECU/driver circuit board 403 can be one circuit board or can comprise more than one circuit board according to some aspects of the present disclosure. The ECU/driver circuit board 403 can be housed within the ECU/driver box 208 according to some aspects of the present disclosure. The various circuit boards described herein, including the left-side circuit board 400, right side circuit board 402, and ECU/driver circuit board 403, each can comprise zero or more transistors labeled as Q, zero or more diodes labeled as D, zero or more Zener diodes labeled as ZD, zero or more capacitors labeled as C, zero or more resistors labeled as R, zero or more LEDs labeled as LED, zero or more inductors labeled as L, zero or more filters (EMI filters), and/or feed through capacitors, labeled as FL, zero or more transient voltage suppressor diodes labeled as TVS, zero or more jumpers labeled as W, zero or more integrated circuits labeled as IC, zero or more ferrite cores labeled as FC, zero or more plugs labeled as P, and zero or more common mode choke coils labeled as CM. Each of the electrical components described above may be followed by an identification number in the various figures to differentiate each component, such as C301, C302, R75, etc.

The ECU/driver circuit board 403 can be connected to the electrical system of the vehicle and can receive input, signals, commands, and/or other information from the electrical system of the vehicle. The ECU/driver circuit board 403 can also receive input, signals, commands, and/or other information from users. The ECU/driver circuit board 403 can interpret and/or process the input, signals, commands, and/or information from the electrical system of the vehicle and/or from users. The ECU/driver circuit board 403 can then manipulate and/or control the left-side circuit board 400 and right-side circuit board 402 housed within the housing 12 of the light bar 202 based on those inputs, signals, commands, and/or information. The ECU/driver circuit board 403 can also create, produce, cause to produce, and/or emit auditory noises based on those inputs, signals, commands, and/or information received from the electrical system of the vehicle or from a user. The ECU/driver circuit board can be operationally and/or electrically connected to speakers to facilitate production and/or emission of the auditory noises.

As an example, the zero or more transistors Q may be a SK2310AA or DMN4035L model transistor, however, any suitable transistor may be used. According to some aspects of the present disclosure, the zero or more transistors Q are semiconductor devices configured to amplify, switch, control, and/or generate electrical signals so that the circuit board(s) function properly. As an example, the zero or more diodes D may be a IN4007WS or SK5200AFL model diode, however, any suitable diode may be used. According to some aspects of the present disclosure, the zero or more diodes D are semiconductor devices configured to act as a one-way switch for current so that the circuit board(s) function properly. As an example, the zero or more Zener diodes ZD may be a BZT52C18S model Zener diode, however, any suitable Zener diode may be used. As an example, the one or more Zener diodes may range from 5.1V Zener diodes to 18V Zener diodes, however, any Zener diode regardless of voltage level may be used. According to some aspects of the present disclosure, the zero or more Zener diodes ZD are semiconductor devices configured to allow current to flow in a forward and/or in a reverse direction so that the circuit board(s) function properly. As an example, the zero or more capacitors C may be a C3216X7R1H106K160AC or C5750X7R2E105K230KA model capacitor, however, any suitable capacitor may be used. As an example, the one or more capacitors C may range from 0.01-1000 micro-Farad capacitors, however, any suitable capacitor regardless of capacitance may be used. Additionally, as an example, the maximum amount of voltage the one or more capacitors C may be exposed to may range from 35V-250V, however, any suitable capacitor regardless of maximum voltage may be used. According to some aspects of the present disclosure, the zero or more capacitors C are configured to store energy so that the circuit board(s) function properly. As an example, the zero or more resistors R may range from a 27-ohm resistor to a 100K ohm resistor, however, any suitable resistor regardless of resistance level may be used. Also, resistors R can have 5% tolerance, however, any tolerance level resistor can be used. Also, resistors R and capacitors C can be size 0603 as measured by the Electronic Industries Alliance (EIA), however, any suitable size resistor R and/or capacitor C can be used. According to some aspects of the present disclosure, the zero or more resistors R are configured to implement electrical resistance so that the circuit board(s) function properly. As described previously in the disclosure, the zero or more LEDs, each labeled as LED, may be capable of producing varying intensity, color, and/or beam pattern/shape. The one or more LEDs may be white, red, blue, amber, or any other color. Any suitable LED may be used. According to some aspects of the present disclosure, the zero or more LEDs are configured to convert electrical energy into light and/or to produce light. As an example, the zero or more inductors L may be a CMF1270-101MC inductor, however, any suitable inductor may be used. As an example, the one or more inductors may range from 4.7 µH to 100 µH, however, any inductor regardless of inductance level may be used. According to some aspects of the present disclosure, the zero or more inductors L are configured to store energy so that the circuit board(s) function properly. As an example, the zero or more filters (EMI filters), and/or feed-through capacitors, FL may be a NFM21PC104R1E3D model filter and/or feed-through capacitor, however, any suitable filter and/or feed-through capacitor may be used. According to some aspects of the present disclosure, the zero or more filters (EMI/RF filters), and/or feed-through capacitors, FL are configured to remove unwanted frequency components, enhance wanted frequency components, perform both functions, and/or reduce, block, and/or mitigate EMI/RFI/RF emissions so that the circuit board(s) function properly and not cause potential harm to nearby environmental and/or electrical components. In this way, the filters (EMI/RFI filters), and/or feed-through capacitors, FL facilitate reduction, removal, blockage, and/or mitigation of EMI, RFI, and/or RF emissions. As an example, the zero or more transient voltage suppressor diodes TVS may be a SMDJ130CA model transient voltage suppressor diode, however, any suitable transient voltage suppressor diode may be used. As an example, the one or more transient voltage suppressor diodes may range from 8.0V transient voltage suppressor diodes to 130V transient voltage suppressor diodes, however, any transient voltage suppressor regardless of voltage level may be used. According to some aspects of the present disclosure, the zero or more transient voltage suppressor diodes TVSs are configured to suppress transient voltages such as an electrostatic discharge (ESD) event so that the circuit board(s) function properly. Any suitable off-the-shelf jumper could be used for the zero or more jumpers W. According to some aspects of the present disclosure, the zero or more jumpers W are configured to open, close, and/or bypass part of the circuit(s) so that the circuit board(s) function properly. As an example, the zero or more ferrite cores FC may be a SCN-18-10-28 model ferrite core, however, any suitable ferrite core may be used. According to some aspects of the present disclosure, the zero or more ferrite cores FC are configured to suppress and/or dissipate high frequency noise levels, EMI, RFI, and/or RF emissions so that the circuit board(s) function properly. In this way, the ferrite cores FC facilitate reduction, removal, blockage, suppression, dissipation, and/or mitigation of EMI, RFI, RF emissions, and/or any other type of high frequency noise levels. As an example, IC3-IC9 could be a LM317BD2 model voltage regulator, however, any suitable integrated circuit, such as a voltage regulator, could be used. As an example, IC2 could be a model RS7550-1YE3 or CJ78L05 voltage regulator, however, any suitable integrated circuit, such as any suitable voltage regulator, could be used. As an example, the zero or more voltage regulators may be 5V voltage regulators, however, any voltage regulator regardless of voltage level may be used. According to some aspects of the present disclosure, the zero or more integrated circuits IC2-9 are configured to regulate voltage and/or generates a fixed, preset output voltage that remains constant regardless of changes to input voltage and/or load conditions so that the circuit board(s) function properly. As an example, IC1 could be a model PIC16F15345T-E/SO microcontroller or PIC16F15375, PIC16F15356, PIC16F1826, PIC16F1327 model microcontrollers, however, any suitable integrated circuit, such as any suitable microcontroller, could be used. According to some aspects of the present disclosure, the integrated circuit IC1 is configured to receive inputs, produce outputs, and/or control aspects of the assembly 200 so that the assembly 200 functions properly. The zero or more plugs P can be any suitable off-the-shelf plug used to connect wiring, wire harnesses, circuitry, integrated circuits, and/or any other aspects of circuit board(s). According to some aspects of the present disclosure, the zero or more plugs P are configured to aspects of the assembly 200 so that the assembly 200 functions properly. As an example, the zero or more common mode choke coils CM could be an ACM-9070M-102 model common mode choke coil, however, any suitable common mode choke coil could be used. According to some aspects of the present disclosure, the zero or more choke coils CM are configured to block some current and allow some current to pass so that the circuit board(s) function properly. Additionally, while not shown, the ECU/driver circuit board 403 could include zero or more voltage converters. As an example, the voltage converters could be BD9P205EFV-C and/or MAX25232ATCG model voltage converters, however any suitable voltage converter could be used. According to some aspects of the present disclosure, the zero or more voltage converters are configured to convert/change voltages so that the circuit board(s) function properly. Additionally, while not shown, the ECU/driver circuit board 403 could include zero or more batteries. According to some aspects of the present disclosure, the zero or more batteries are configured to store, convert, and/or supply energy so that the circuit board(s) function properly.

The EMI filters (EMI filters) FL protect against potentially harmful electromagnetic interference. Thus, the filters FL also protect against radio-frequency interference (RFI). In this way, the filters FL help to prevent potentially harmful EMI and/or RFI emissions that could interfere with and/or disrupt nearby electronic devices and/or components.

Figure 33A:
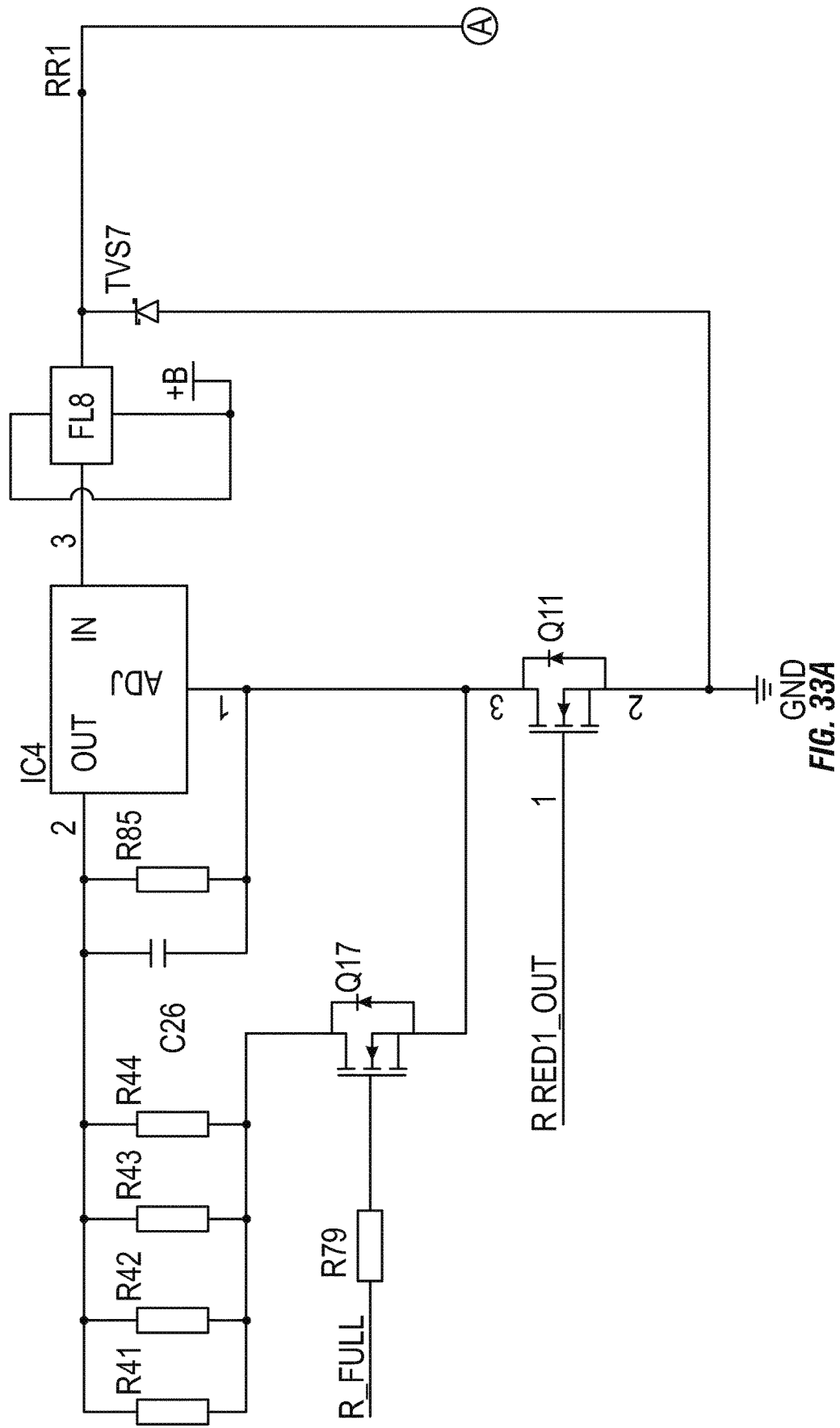
FIG. 33A is a detailed schematic showing an exemplary portion of the circuitry involved in the lighting assembly, including an exemplary portion of the ECU/driver circuit board, according to some aspects of the present disclosure.

FIG. 33A shows a portion of the ECU/driver circuit board 403 according to some aspects of the present disclosure. The partial circuit shown in FIG. 33A includes connections R_FULL and R_RED1_OUT. The connection R_FULL connects to a port of IC1 of FIG. 36. The connection R_RED1_OUT connects to additional circuitry shown in FIG. 47, wherein the additional circuitry of FIG. 47 connects with a port of IC1 of FIG. 36. Additionally, the connection RR1 of FIG. 33A connects to FC2 of FIG. 33D and helps to facilitate illumination and/or prevent illumination of the right first red block 412.

Figure 33B:
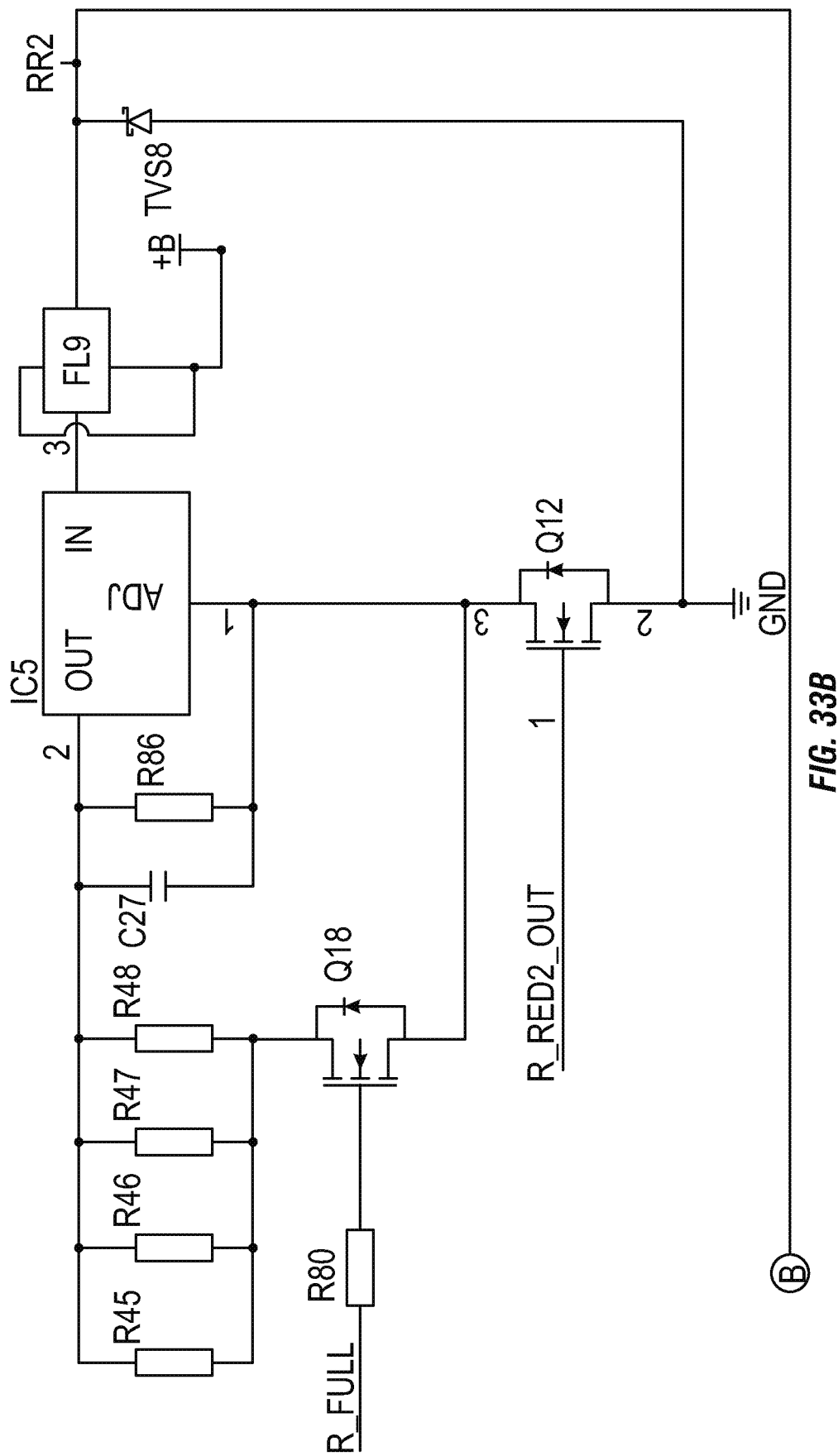
FIG. 33B is a detailed schematic showing an exemplary portion of the circuitry involved in the lighting assembly, including an exemplary portion of the ECU/driver circuit board, according to some aspects of the present disclosure.

FIG. 33B shows a portion of the ECU/driver circuit board 403 according to some aspects of the present disclosure. The partial circuit shown in FIG. 33B includes connections R_FULL and R_RED2_OUT. The connection R_FULL connects to a port of IC1 of FIG. 36. The connection R_RED2_OUT connects to additional circuitry shown in FIG. 48, wherein the additional circuitry of FIG. 48 connects with a port of IC1 of FIG. 36. Additionally, the connection RR2 of FIG. 33B connects to FC2 of FIG. 33D and helps to facilitate illumination and/or prevent illumination of the right second red block 414.

Figure 33C:
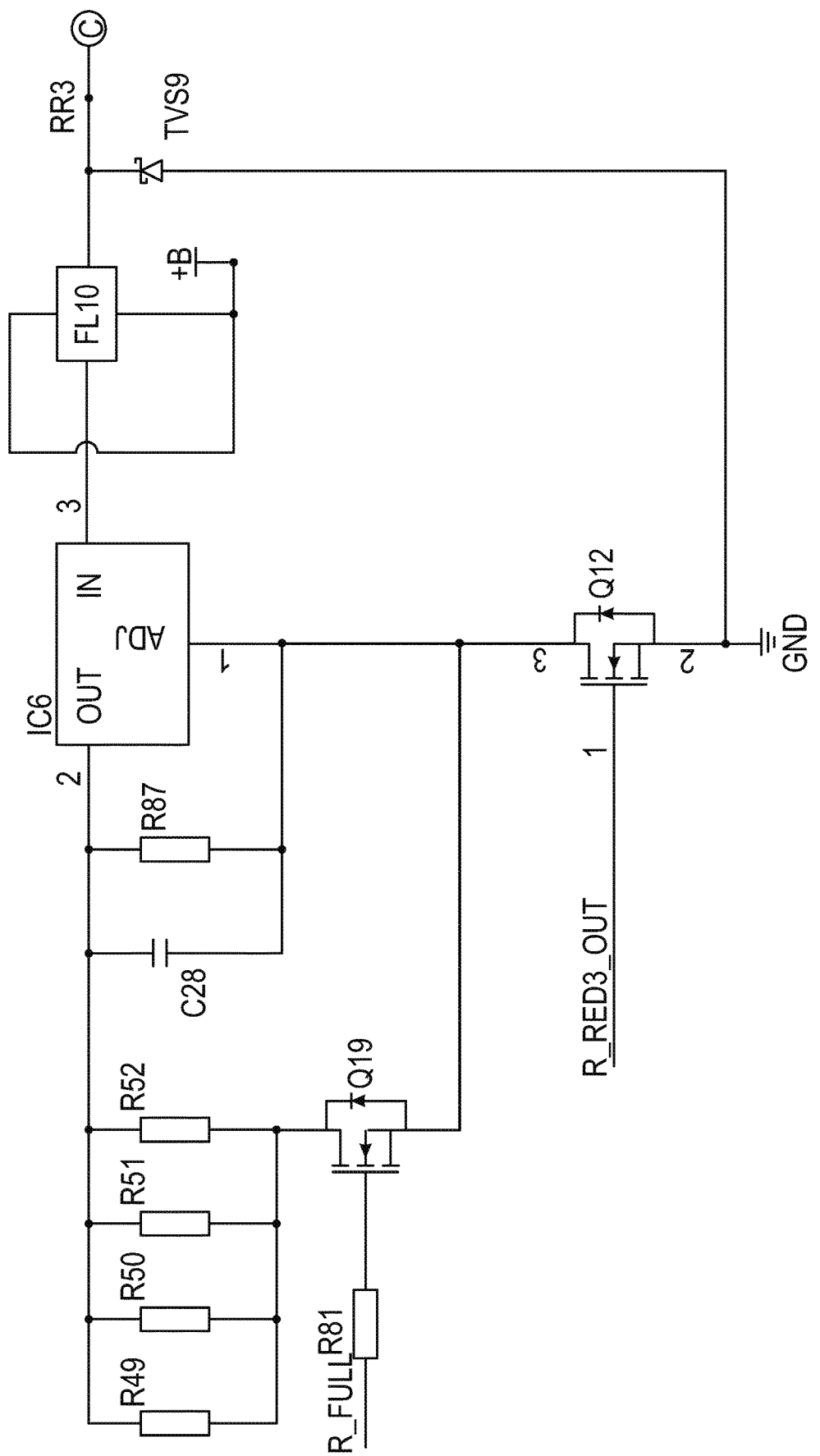
FIG. 33C is a detailed schematic showing an exemplary portion of the circuitry involved in the lighting assembly, including an exemplary portion of the ECU/driver circuit board, according to some aspects of the present disclosure.

FIG. 33C shows a portion of the ECU/driver circuit board 403 according to some aspects of the present disclosure. The partial circuit shown in FIG. 33C includes connections R_FULL and R_RED3 OUT. The connection R_FULL connects to a port of IC1 of FIG. 36. The connection R_RED3_OUT connects to additional circuitry shown in FIG. 49, wherein the additional circuitry of FIG. 49 connects with a port of IC1 of FIG. 36. Additionally, the connection RR3 of FIG. 33C connects to FC2 of FIG. 33D and helps to facilitate illumination and/or prevent illumination of the right second red block 416.

Figure 33D:
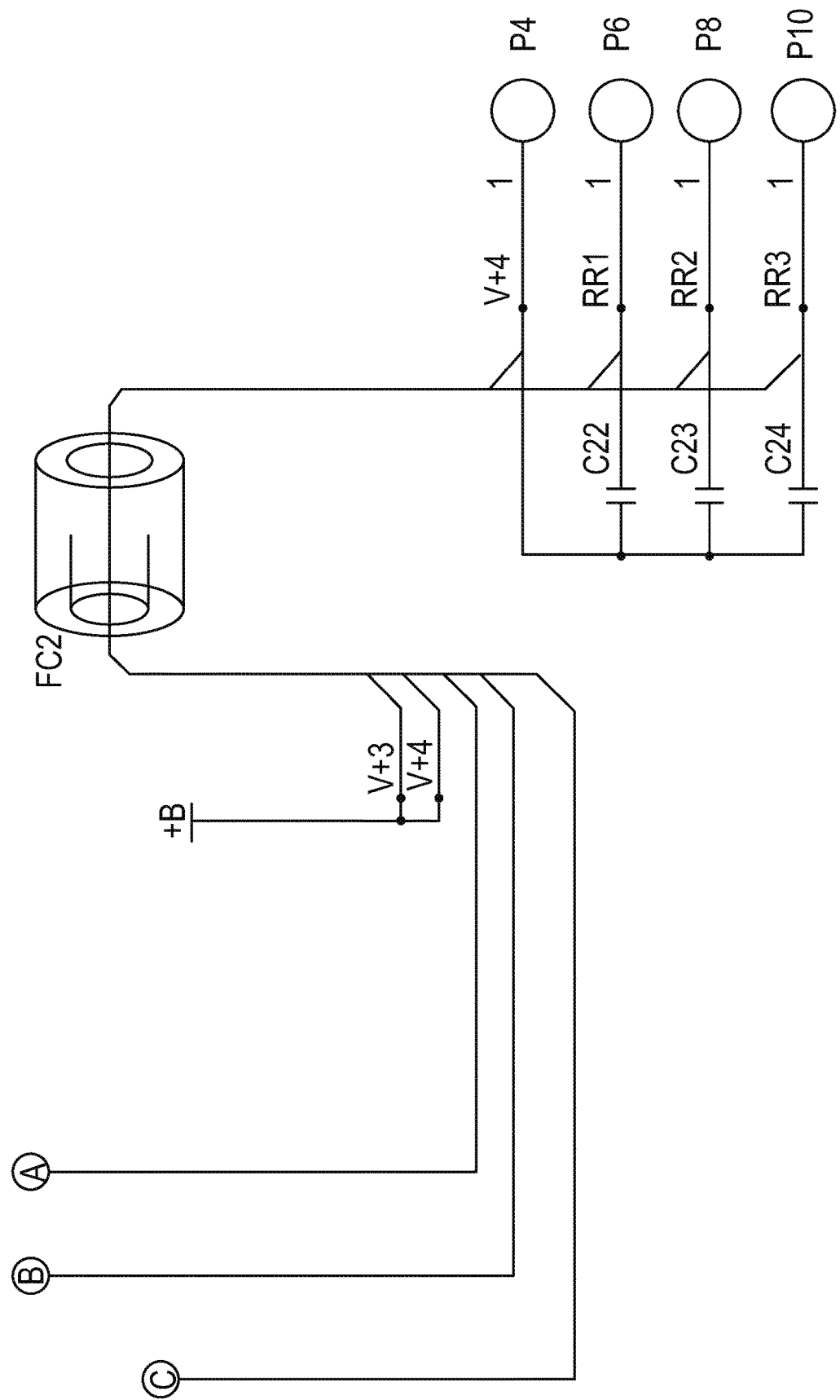
FIG. 33D is a detailed schematic showing an exemplary portion of the circuitry involved in the lighting assembly, including an exemplary portion of the ECU/driver circuit board, according to some aspects of the present disclosure.

FIG. 33D shows a portion of the ECU/driver circuit board 403 according to some aspects of the present disclosure. The partial circuit shown in FIG. 33D includes circuitry that shows connections between the ECU/driver circuit board 403 and the right-side circuit board 402. These connections between the ECU/driver circuit board 403 and the right-side circuit board 402 can be facilitated via wiring, plugs, and/or any other suitable means. According to some aspects of the present disclosure, these connections can be facilitated by ECU-light bar wiring 212. Via these connections, the ECU/driver circuit board 403 can control and/or manipulate the right-side circuit board 402, including illumination and/or prevention of illumination of LEDs on the right-side circuit board 402.

Figure 34A:
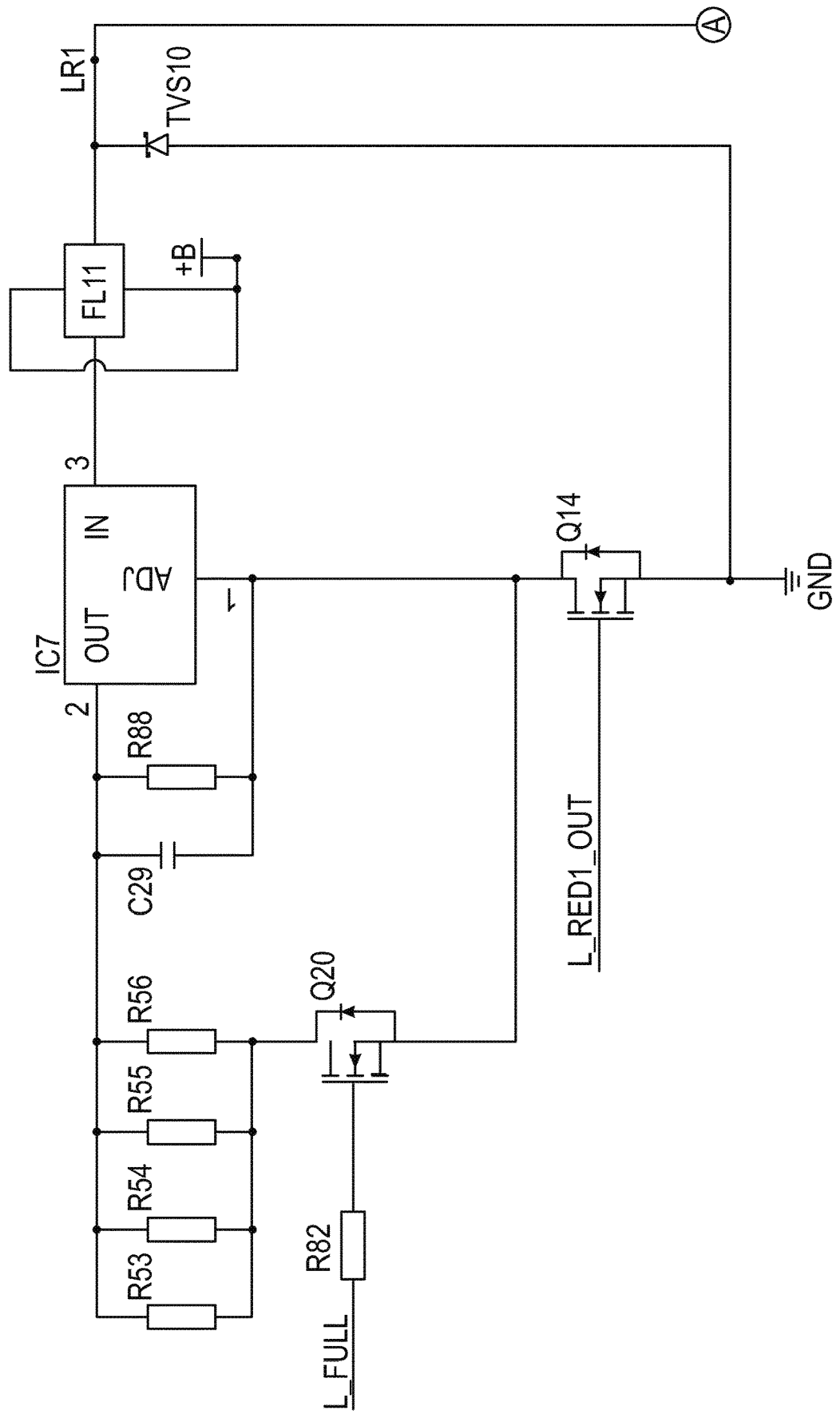
FIG. 34A is a detailed schematic showing an exemplary portion of the circuitry involved in the lighting assembly, including an exemplary portion of the ECU/driver circuit board, according to some aspects of the present disclosure.

FIG. 34A shows a portion of the ECU/driver circuit board 403 according to some aspects of the present disclosure. The partial circuit shown in FIG. 34A includes connections L_FULL and L_RED1_OUT. The connection L_FULL connects to a port of IC1 of FIG. 36. The connection L_RED1_OUT connects to additional circuitry shown in FIG. 44, wherein the additional circuitry of FIG. 44 connects with a port of IC1 of FIG. 36. Additionally, the connection LR1 of FIG. 34A connects to FC3 of FIG. 34E and helps to facilitate illumination and/or prevent illumination of the left first red block 406.

Figure 34B:
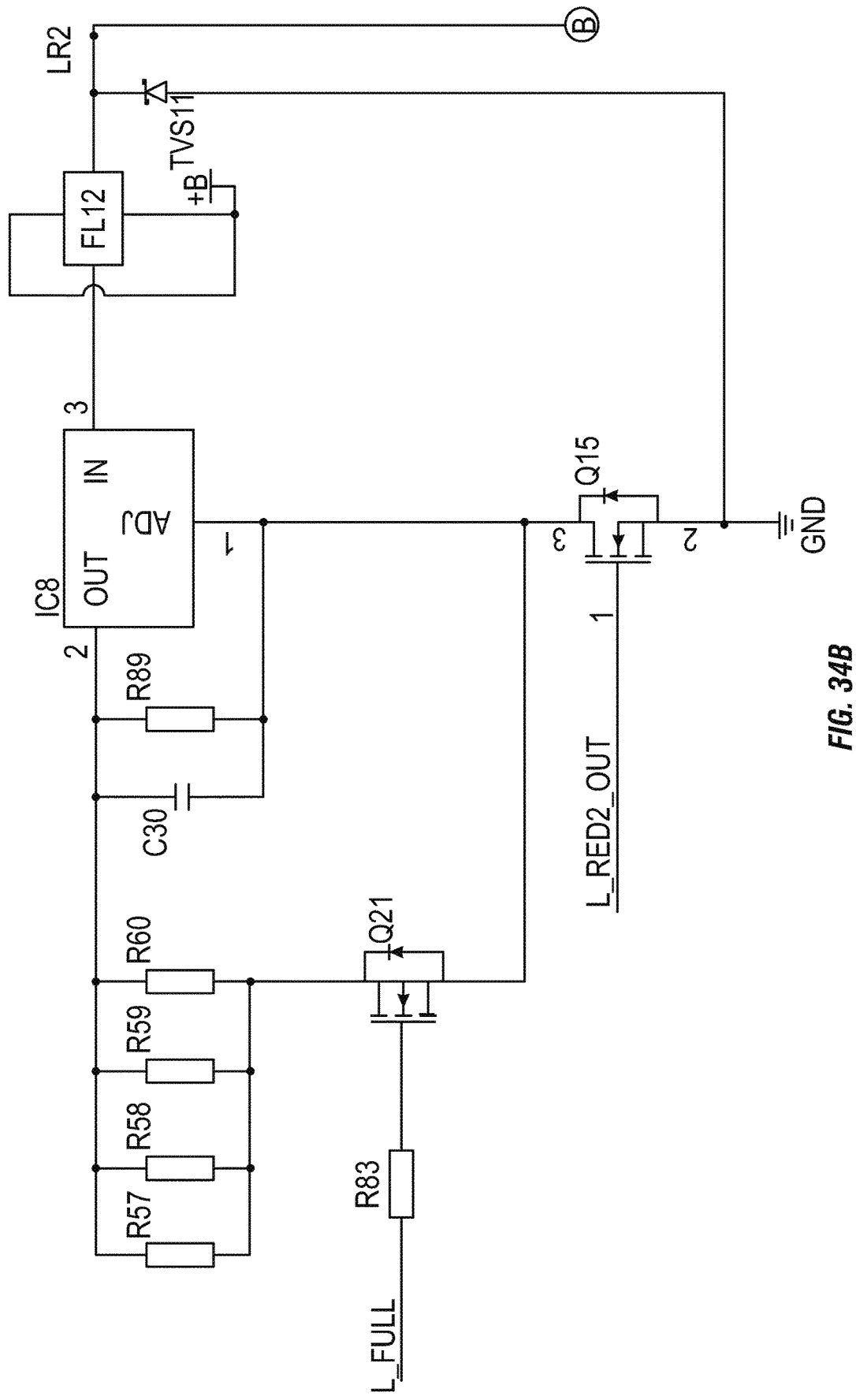
FIG. 34B is a detailed schematic showing an exemplary portion of the circuitry involved in the lighting assembly, including an exemplary portion of the ECU/driver circuit board, according to some aspects of the present disclosure.

FIG. 34B shows a portion of the ECU/driver circuit board 403 according to some aspects of the present disclosure. The partial circuit shown in FIG. 34B includes connections L_FULL and L_RED2_OUT. The connection L_FULL connects to a port of IC1 of FIG. 36. The connection L_RED2_OUT connects to additional circuitry shown in FIG. 45, wherein the additional circuitry of FIG. 45 connects with a port of IC1 of FIG. 36. Additionally, the connection LR2 of FIG. 34B connects to FC3 of FIG. 34E and helps to facilitate illumination and/or prevent illumination of the left second red block 408.

Figure 34C:
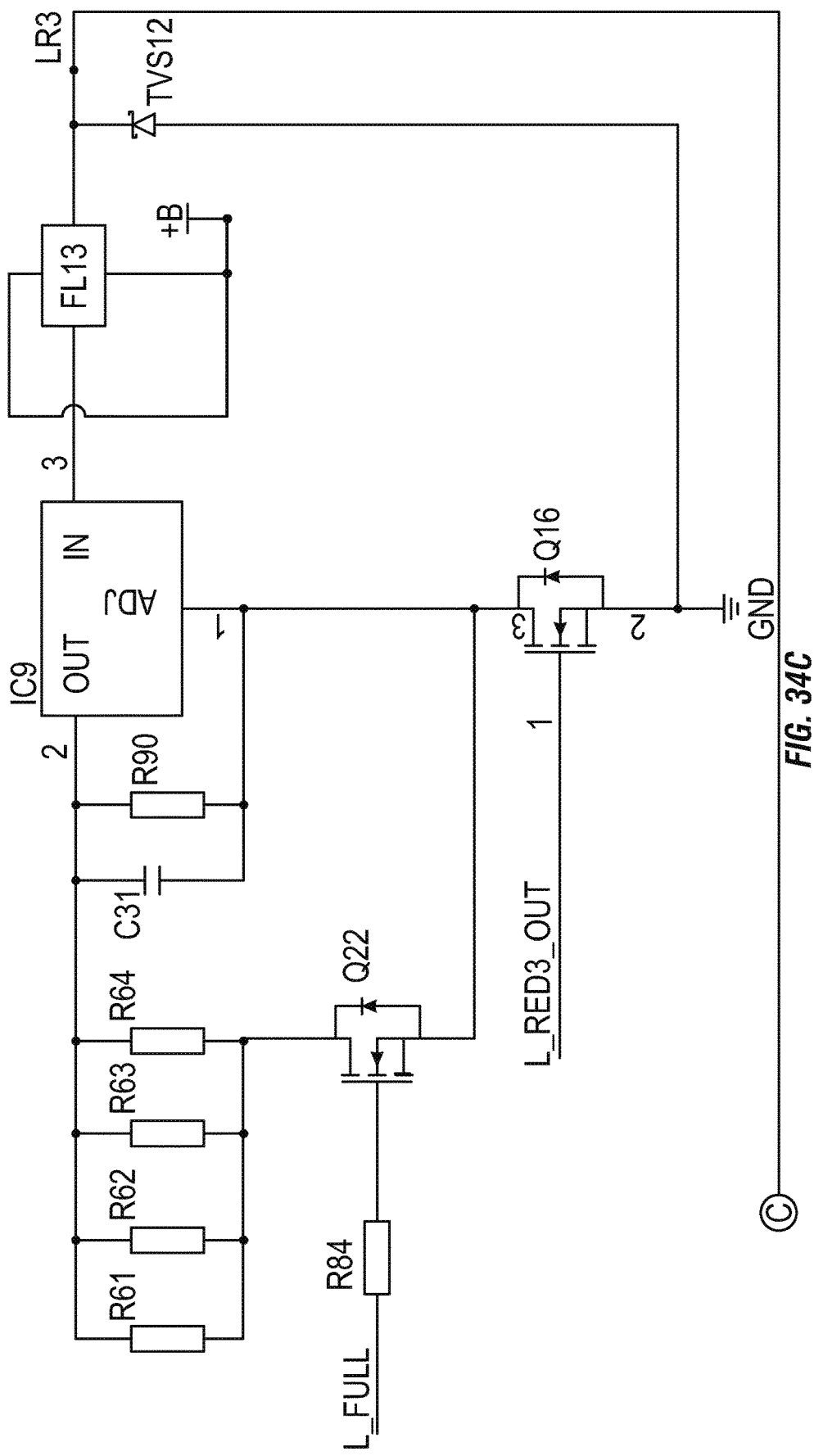
FIG. 34C is a detailed schematic showing an exemplary portion of the circuitry involved in the lighting assembly, including an exemplary portion of the ECU/driver circuit board, according to some aspects of the present disclosure.

FIG. 34C shows a portion of the ECU/driver circuit board 403 according to some aspects of the present disclosure. The partial circuit shown in FIG. 34C includes connections L_FULL and L_RED3_OUT. The connection L_FULL connects to a port of IC1 of FIG. 36. The connection L_RED3_OUT connects to additional circuitry shown in FIG. 46, wherein the additional circuitry of FIG. 46 connects with a port of IC1 of FIG. 36. Additionally, the connection LR3 of FIG. 34C connects to FC3 of FIG. 34E and helps to facilitate illumination and/or prevent illumination of the left third red block 410.

Figure 34D:
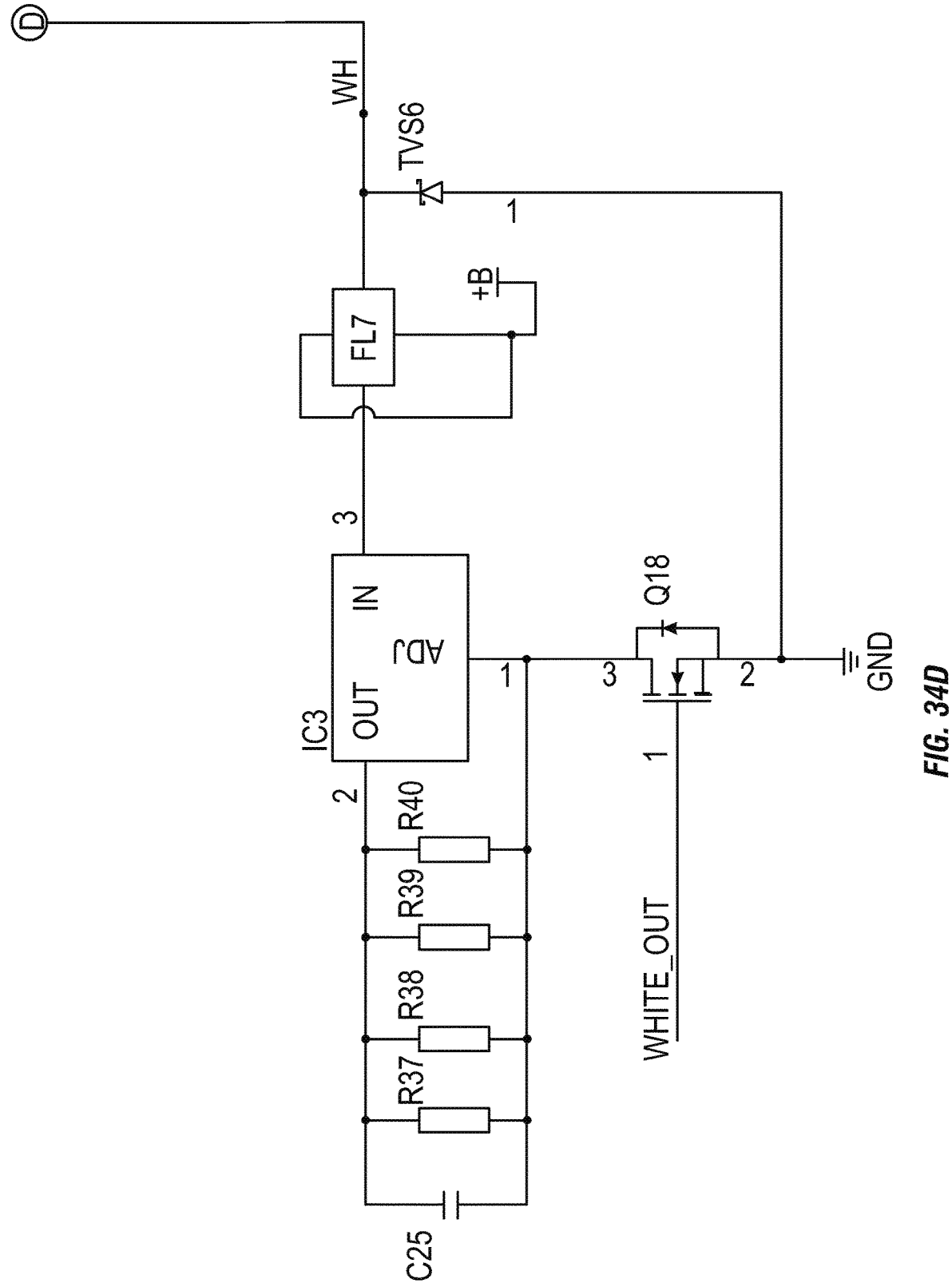
FIG. 34D is a detailed schematic showing an exemplary portion of the circuitry involved in the lighting assembly, including an exemplary portion of the ECU/driver circuit board, according to some aspects of the present disclosure.

FIG. 34D shows a portion of the ECU/driver circuit board 403 according to some aspects of the present disclosure. The partial circuit shown in FIG. 34D includes connections WHITE_OUT. The connection WHITE_OUT connects to additional circuitry shown in FIG. 43, wherein the additional circuitry of FIG. 43 connects to a port of IC1 of FIG. 36. Additionally, the connection WH of FIG. 34D connects to FC3 of FIG. 34E and helps to facilitate illumination and/or prevent illumination of the white block 404.

Figure 34E:
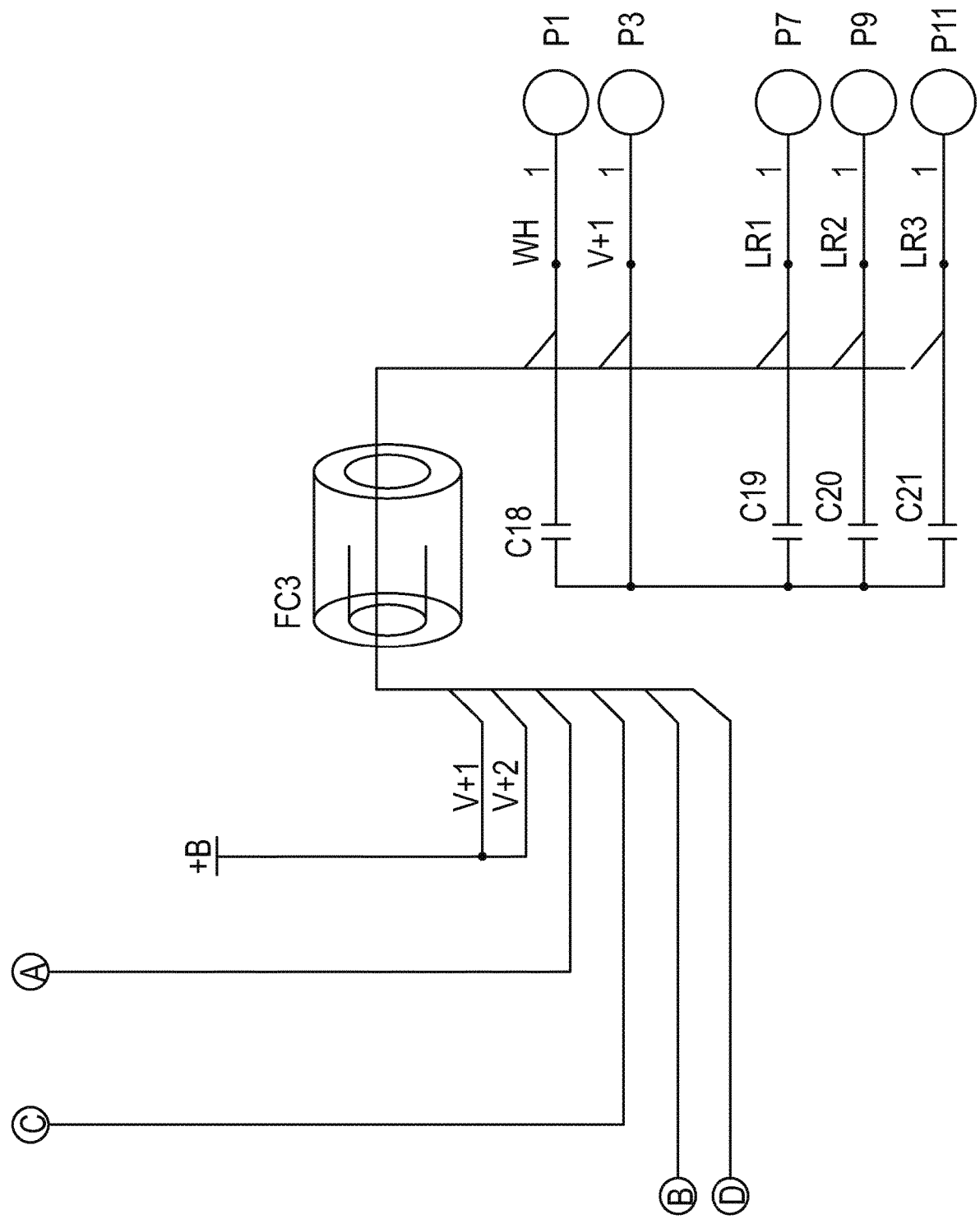
FIG. 34E is a detailed schematic showing an exemplary portion of the circuitry involved in the lighting assembly, including an exemplary portion of the ECU/driver circuit board, according to some aspects of the present disclosure.

FIG. 34E shows a portion of the ECU/driver circuit board 403 according to some aspects of the present disclosure. The partial circuit shown in FIG. 34E includes circuitry that shows connections between the ECU/driver circuit board 403 and the left-side circuit board 400. These connections between the ECU/driver circuit board 403 and the left-side circuit board 400 can be facilitated via wiring, plugs, and/or any other suitable means. According to some aspects of the present disclosure, these connections can be facilitated by ECU-light bar wiring 212. Via these connections, the ECU/driver circuit board 403 can control and/or manipulate the left-side circuit board 400, including illumination and/or prevention of illumination of LEDs on the left-side circuit board 400.

Figure 35A:
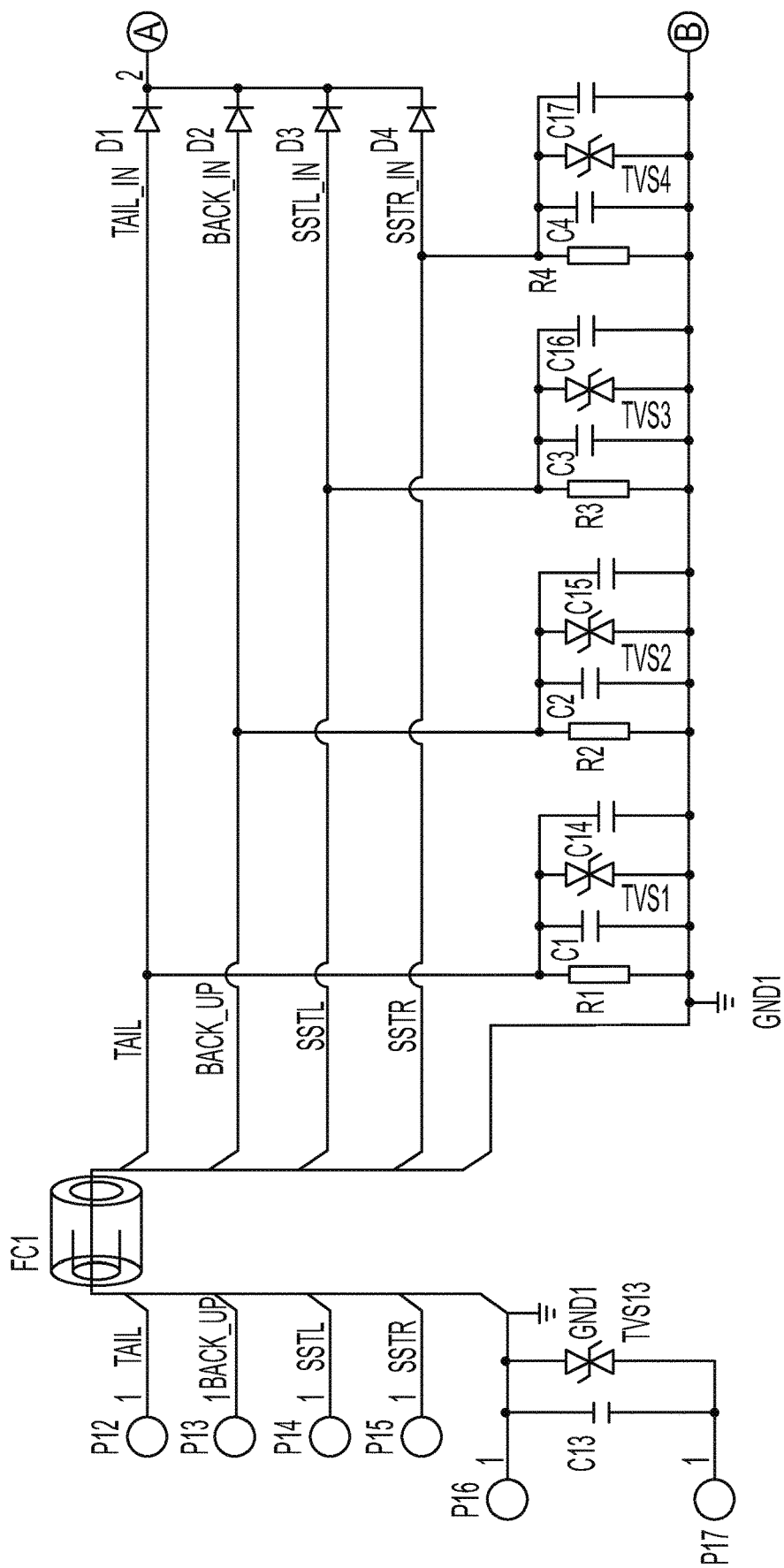
FIG. 35A is a detailed schematic showing an exemplary portion of the circuitry involved in the lighting assembly, including an exemplary portion of the ECU/driver circuit board, according to some aspects of the present disclosure.
Figure 35B:
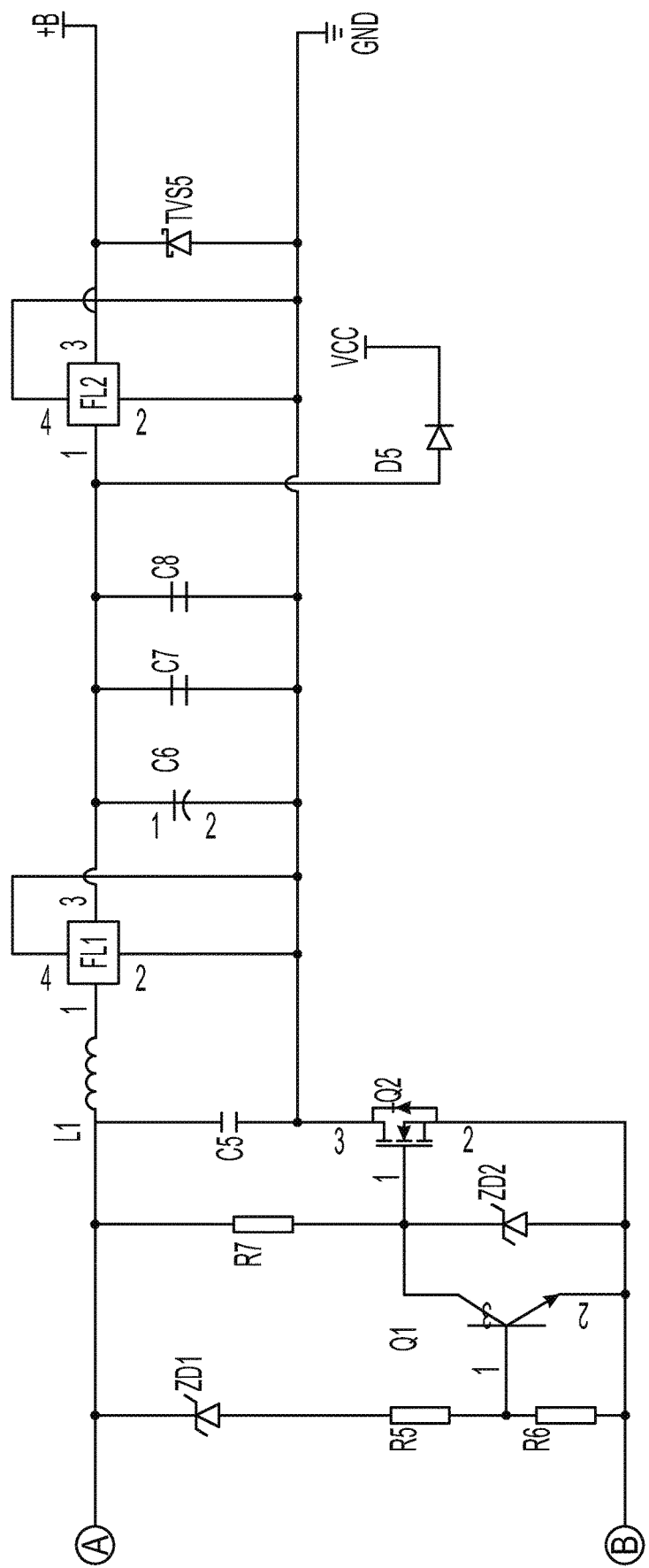
FIG. 35B is a detailed schematic showing an exemplary portion of the circuitry involved in the lighting assembly, including an exemplary portion of the ECU/driver circuit board, according to some aspects of the present disclosure.

FIGS. 35A-B show portions of the ECU/driver circuit board according to some aspects of the present disclosure. The partial circuit shown in FIG. 35A includes circuitry that shows connections between the ECU/driver circuit board 403 and the electrical system of the vehicle. These connections between the ECU/driver circuit board 403 and the electrical system of the vehicle can be accomplished via wiring, plugs, and/or any other suitable means. According to some aspects of the present disclosure, these connections can be facilitated by ECU-vehicle wiring 214. Input, signals, command, and/or other information can be provided by the electrical system of the vehicle and received by the ECU/driver circuit board 403 via these connections. For example, FIG. 35A shows four different inputs delivered from the electrical system of the vehicle to the ECU/driver circuit board 403, which include TAIL, BACK_UP, SSTL, and SSTR. TAIL refers to if the vehicle is engaging its brakes. BACK_UP refers to if the vehicle is reversing. SSTL refers to if the vehicle is engaging its left turn signal. SSTR refers to if the vehicle is engaging its right turn signal. Additionally, the ECU/driver circuit board 403 could include more inputs from the electrical system of the vehicle such as when the taillights of the vehicle are ON, when the vehicle is accelerating, and/or an input referring to ground (GND). Therefore, the ECU/driver circuit board 403 can interpret and/or process that information and control and/or manipulate the left-side and right-side circuit boards 400, 402, and speakers, accordingly. For example, if the vehicle is engaging its brakes, the ECU/driver circuit board 403 will control the left-side and right-side circuit boards 400, 402 to illuminate only the blocks of red LEDs including 406, 408, 410, 412, 414, and 416. If the vehicle is reversing, the ECU/driver circuit board 403 will control the left-side and right-side circuit boards 400, 402 to illuminate only the block of white LEDs 404 and will control and/or manipulate the speakers to produce an auditory noise and/or signal typically associated with a vehicle reversing. If the vehicle is engaging its right turn signal, the ECU/driver circuit board 403 will control the left-side and right side circuit boards 400, 402 to illuminate, in a flashing pattern to match the cadence of the vehicle's turn signal, only the blocks of red LEDs of the right side circuit board 402, which includes 412, 414, and 416. If the vehicle is engaging its left turn signal, the ECU/driver circuit board 403 will control the left-side and right side circuit boards 400, 402 to illuminate, in a flashing pattern to match the cadence of the vehicle's turn signal, only the blocks of red LEDs of the left-side circuit board 400, which includes 406, 408, and 410. FIG. 35B shows additional circuitry comprising a portion of the ECU/driver circuit board 403.

Figure 36:
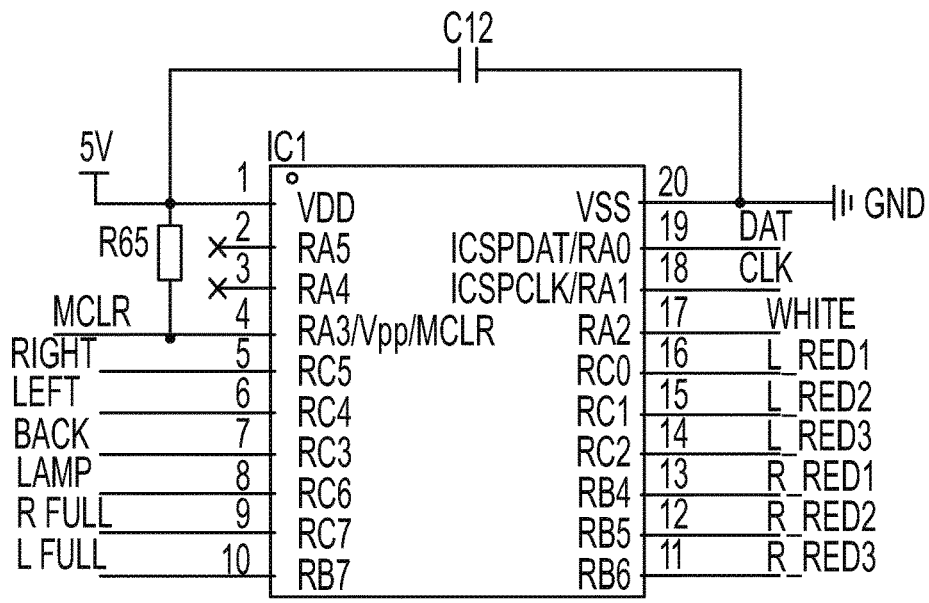
FIG. 36 is a detailed schematic showing an exemplary portion of the circuitry involved in the lighting assembly, including an exemplary portion of the ECU/driver circuit board that includes integrated circuit IC1, according to some aspects of the present disclosure.
Figure 39:
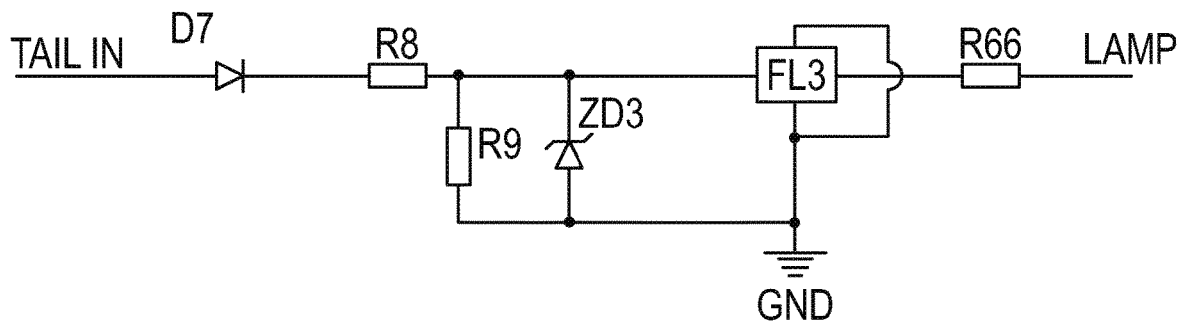
FIG. 39 is a detailed schematic showing an exemplary portion of the circuitry involved in the lighting assembly, including an exemplary portion of the ECU/driver circuit board, according to some aspects of the present disclosure.

Additionally, the connection TAIL_IN of FIG. 35A is connected to additional circuitry as described in FIG. 39, wherein that additional circuitry is connected to a port of IC1 of FIG. 36 via the connection LAMP.

Figure 40:
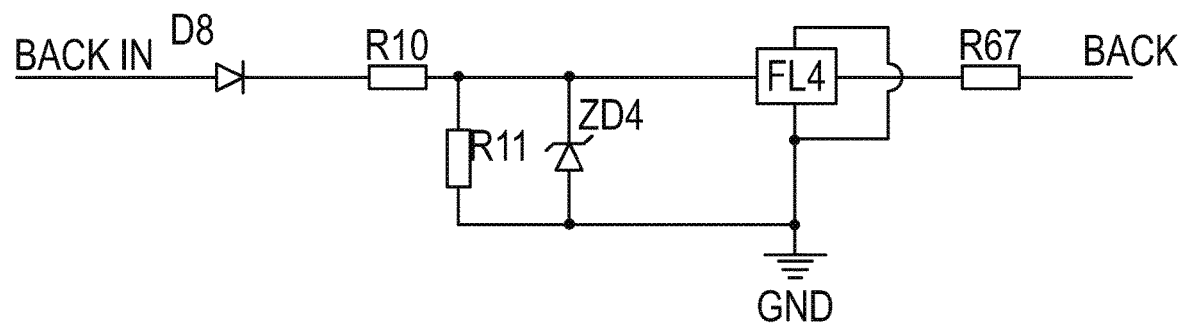
FIG. 40 is a detailed schematic showing an exemplary portion of the circuitry involved in the lighting assembly, including an exemplary portion of the ECU/driver circuit board, according to some aspects of the present disclosure.

Additionally, the connection BACK_IN of FIG. 35A is connected to additional circuitry as described in FIG. 40, wherein that additional circuitry is connected to a port of IC1 of FIG. 36 via the connection BACK.

Figure 41:
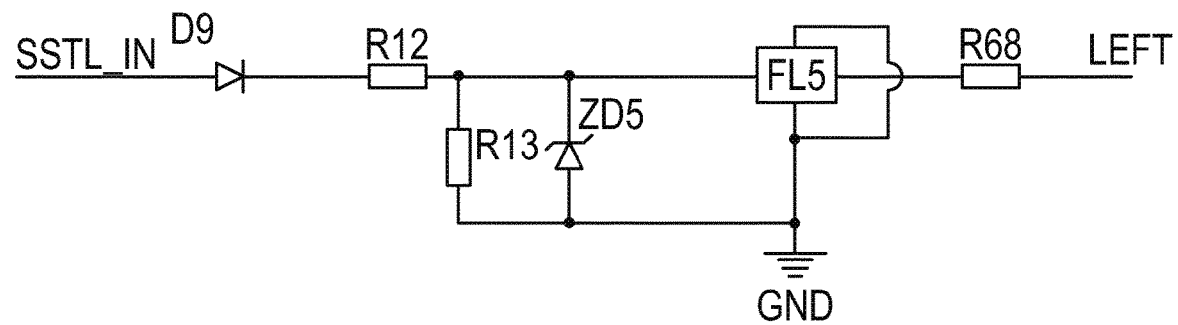
FIG. 41 is a detailed schematic showing an exemplary portion of the circuitry involved in the lighting assembly, including an exemplary portion of the ECU/driver circuit board, according to some aspects of the present disclosure.

Additionally, the connection SSTL_IN of FIG. 35A is connected to additional circuitry as described in FIG. 41, wherein that additional circuitry is connected to a port of IC1 of FIG. 36 via the connection LEFT.

Figure 42:
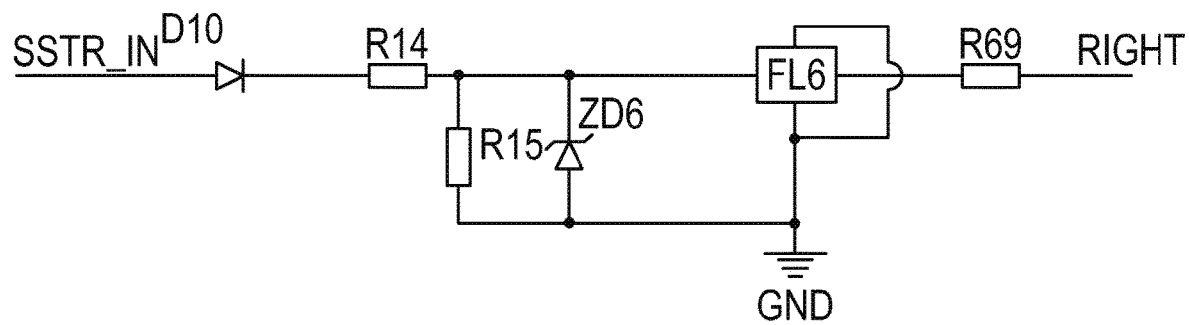
FIG. 42 is a detailed schematic showing an exemplary portion of the circuitry involved in the lighting assembly, including an exemplary portion of the ECU/driver circuit board, according to some aspects of the present disclosure.

Additionally, the connection SSTR_IN of FIG. 35A is connected to additional circuitry as described in FIG. 42, wherein that additional circuitry is connected to a port of IC1 of FIG. 36 via the connection RIGHT.

FIG. 36 shows an exemplary embodiment IC1, which is a microcontroller, and related circuitry according to some aspects of the present disclosure. As explained above in reference to FIGS. 33-35, IC1 receives many inputs, produces many outputs, and controls and/or manipulates aspects of the assembly 200. For example, IC1 can receive processed and/or raw input from the electrical system of the vehicle regarding functionality of the vehicle, such as if the vehicle is engaging its brakes, is reversing, is engaging its right turn signal, and/or is engaging its left turn signal. As mentioned above, IC1 can then control and/or manipulate the circuit board(s) housed within the light bar 202, including the left-side and right-side circuit boards 400, 402, as well as the speakers, based on the processed and/or raw inputs received from the electrical system of the vehicle and/or from a user.

Figure 37:
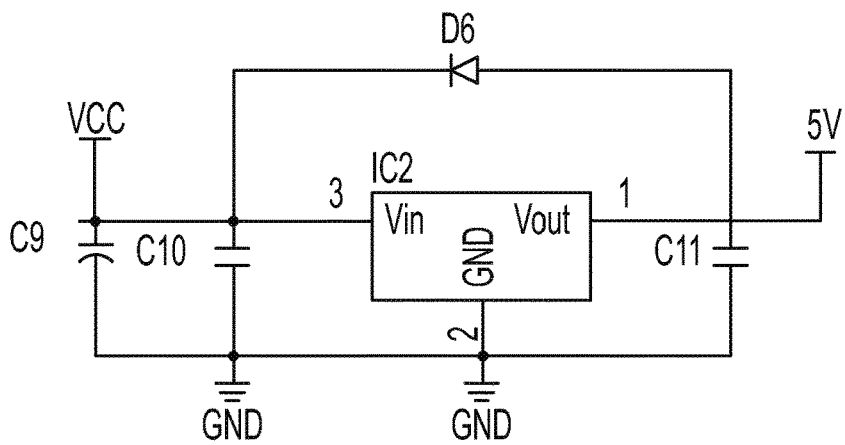
FIG. 37 is a detailed schematic showing an exemplary portion of the circuitry involved in the lighting assembly, including an exemplary portion of the ECU/driver circuit board, according to some aspects of the present disclosure.

FIG. 37 shows an exemplary portion of the ECU/driver circuit board 403 according to some aspects of the present disclosure. The exemplary portion of the ECU/driver circuit board 403 shown in FIG. 37 can include integrated circuit IC2 to regulate voltage so that the circuit board 403 functions properly.

Figure 38:
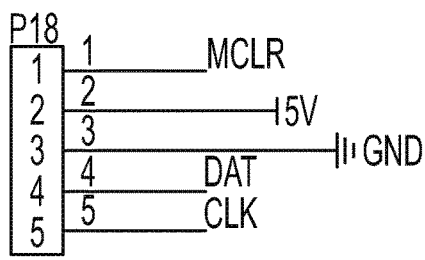
FIG. 38 is a detailed schematic showing an exemplary portion of the circuitry involved in the lighting assembly, including an exemplary portion of the ECU/driver circuit board, according to some aspects of the present disclosure.

FIG. 38 shows an exemplary portion of the ECU/driver circuit board 403 according to some aspects of the present disclosure. The portion shown in FIG. 38 is configured to interact with IC1 of FIG. 36. The circuit shown in FIG. 38 can be used for flash memory of IC1.

FIGS. 39-49 show various portions of the exemplary ECU/driver circuit board 403 according to some aspects of the disclosure. The exemplary portions of FIGS. 39-49 have been described above in reference to working in conjunction with other portions of the exemplary ECU/driver circuit board 403.

Figure 50:
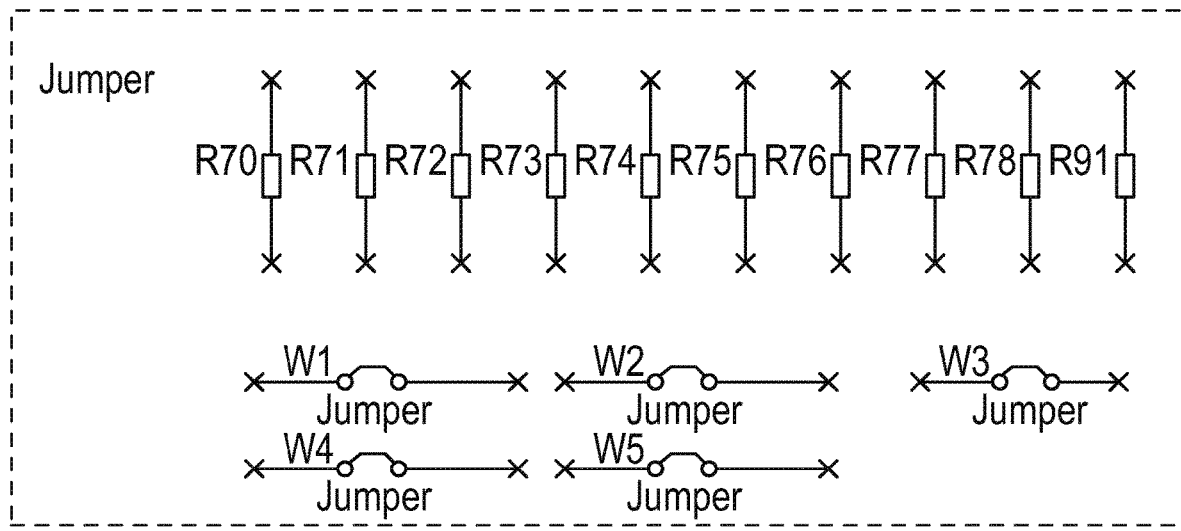
FIG. 50 is a detailed schematic showing an exemplary portion of the circuitry involved in the lighting assembly, including an exemplary portion of the ECU/driver circuit board, according to some aspects of the present disclosure.

FIG. 50 shows an exemplary portion of the ECU/driver circuit board 403 according to some aspects of the present disclosure. The exemplary portion of the ECU/driver circuit board 403 shown in FIG. 50 includes a plurality of jumpers W, wherein each jumper can open, close, and/or bypass part of the circuit so that the circuit board 403 functions properly.

Figure 51:
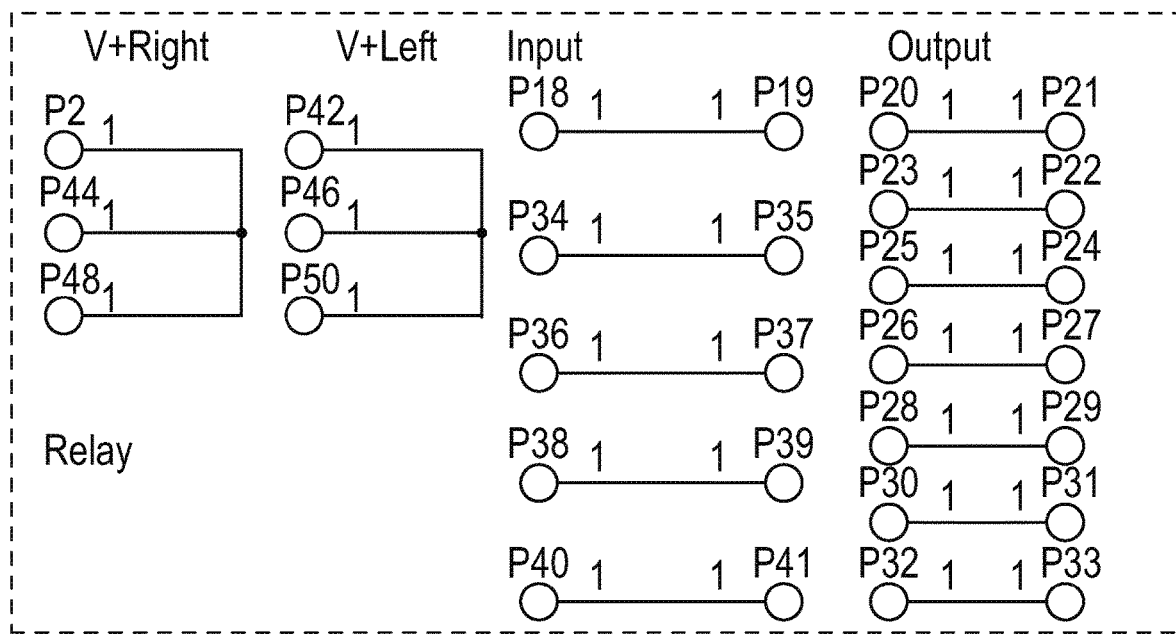
FIG. 51 is a detailed schematic showing an exemplary portion of the circuitry involved in the lighting assembly, including an exemplary portion of the ECU/driver circuit board, according to some aspects of the present disclosure.

FIG. 51 shows an exemplary portion of the ECU/driver circuit board 403 according to some aspects of the present disclosure. The exemplary portion of the ECU/driver circuit board 403 shown in FIG. 51 includes a plurality of plugs P. The plugs P can connect different portions of the circuit so that the ECU/driver circuit board 403, left-side circuit board 400, and right-side circuit board 402 function properly.

Figure 52A:
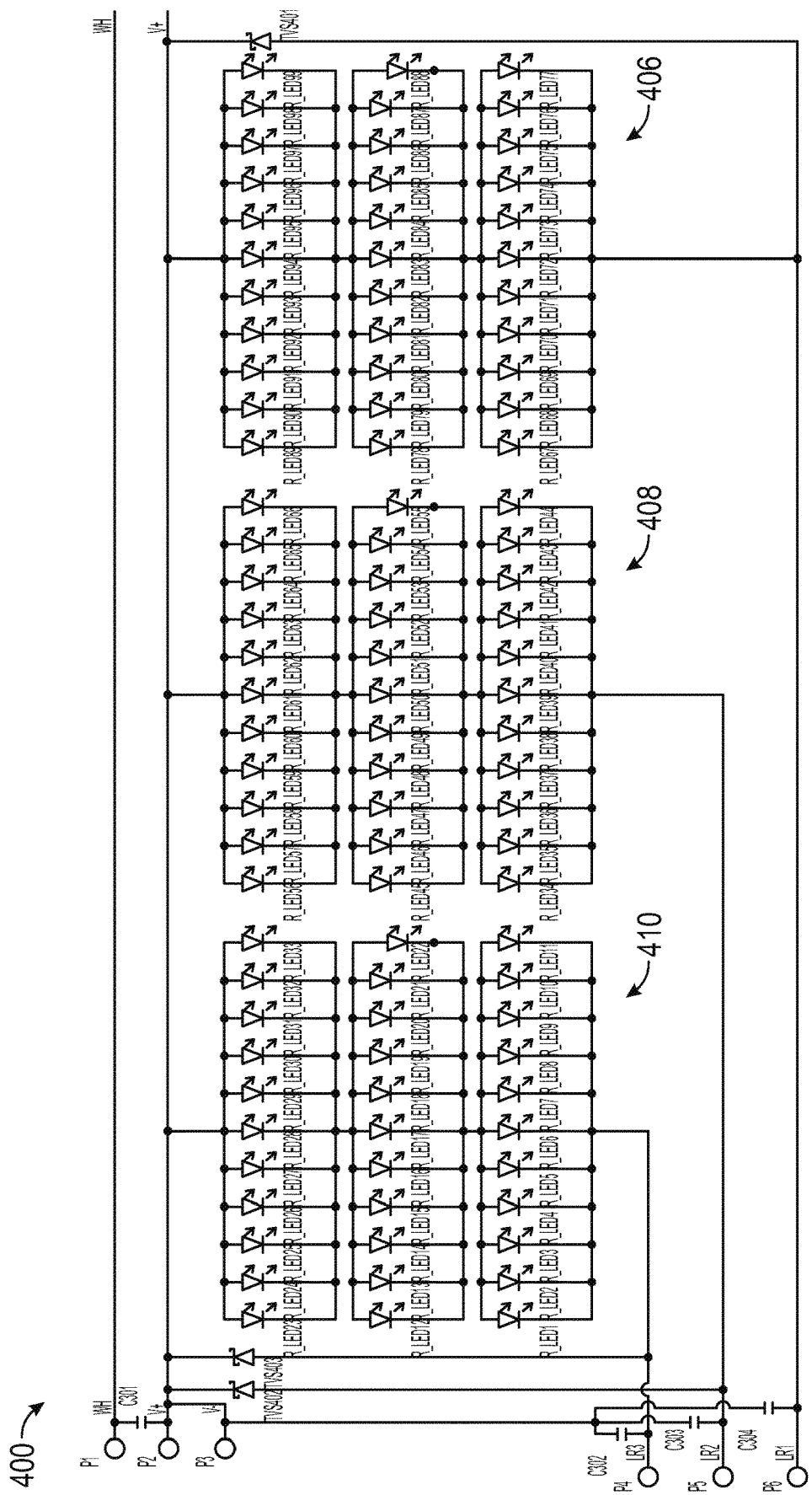
FIG. 52A is a detailed schematic showing an exemplary portion of the circuitry involved in the lighting assembly, including a portion of the circuit board to be housed within the light bar, according to some aspects of the present disclosure. The portion of the schematic shown in FIG. 52A could comprise at least a portion of the left-side circuit board to be housed within the left side of the light bar.
Figure 52B:
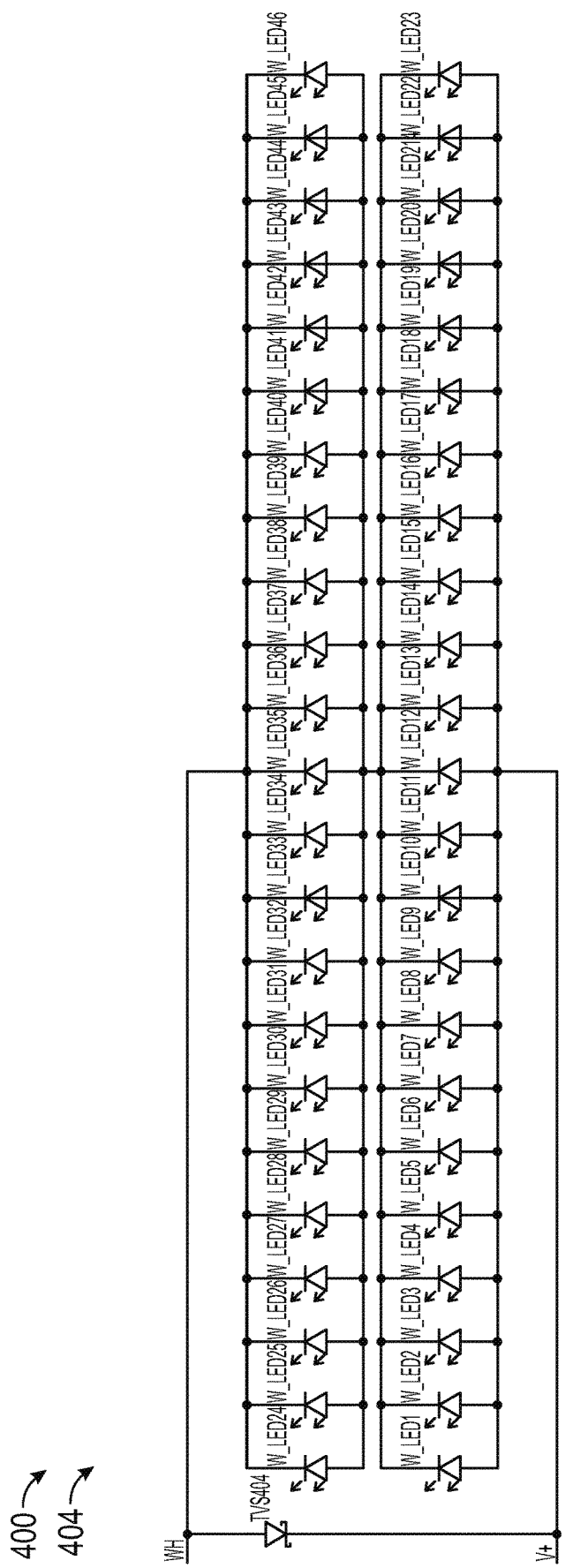
FIG. 52B is a detailed schematic showing an exemplary portion of the circuitry involved in the lighting assembly, including a portion of the circuit board to be housed within the light bar, according to some aspects of the present disclosure. The portion of the schematic shown in FIG. 52B could comprise at least a portion of the left-side circuit board to be housed within the left side of the light bar.

FIGS. 52A-B show an exemplary left-side circuit board 400 to be housed within the left-side housing 238 of the light bar 202 according to some aspects of the present disclosure. As described above, the left-side circuit board 400 can include connections wherein the left-side circuit board 400 can connect to the ECU/driver circuit board 403. The connections between the left-side circuit board 400 and the ECU/driver circuit board 403 can be accomplished via the ECU-light bar wires 212 and/or plugs. The ECU-light bar wires 212 can connect to the left-side circuit board 400 and exit the left-side housing 238 via the left wire exit end cap 216 and enter the ECU/driver box 208 via the opening 255, or another opening of ECU/driver box, to connect with the ECU/driver circuit board 403. The ECU-light bar wires 212 can include wires extending from the left-side circuit board 400 and the right-side circuit board 402 wherein the wiring can come together and combine within a single wire harness before entering the ECU/driver box 208. As stated above, the left-side circuit board 400 can include a left first red block 406 of red LEDs, a left second red block 408 of red LEDs, a left third red block 410 of red LEDs, and a white block 404 of white LEDs. Each block can contain any number of LEDs in any arrangement. Additionally, other colors of LEDs in addition to red and white LEDs may be used such as blue and/or amber LEDs. The connections between the left-side circuit board 400 and the ECU/driver circuit board 403 is facilitated via FC3 shown in FIG. 34E. Based on input, signal, commands, and/or information received from the electrical system of the vehicle and/or from a user, the ECU/driver circuit board 403 can control and/or manipulate the left-side circuit board 400, including illumination and prevention of illumination of particular LEDs on the left-side circuit board 400 in particular patterns. Patterns include flashing illumination as used with a turn signal or constant illumination as used with braking or reversing. The left-side circuit board 400 can be controlled and/or manipulated such that an entire block of LEDs can be illuminated or not illuminated. Additionally, a block of LEDs can be partially illuminated, such as only some of the LEDs of a particular block are illuminated and some other of the LEDs of that block are not illuminated.

Figure 53:
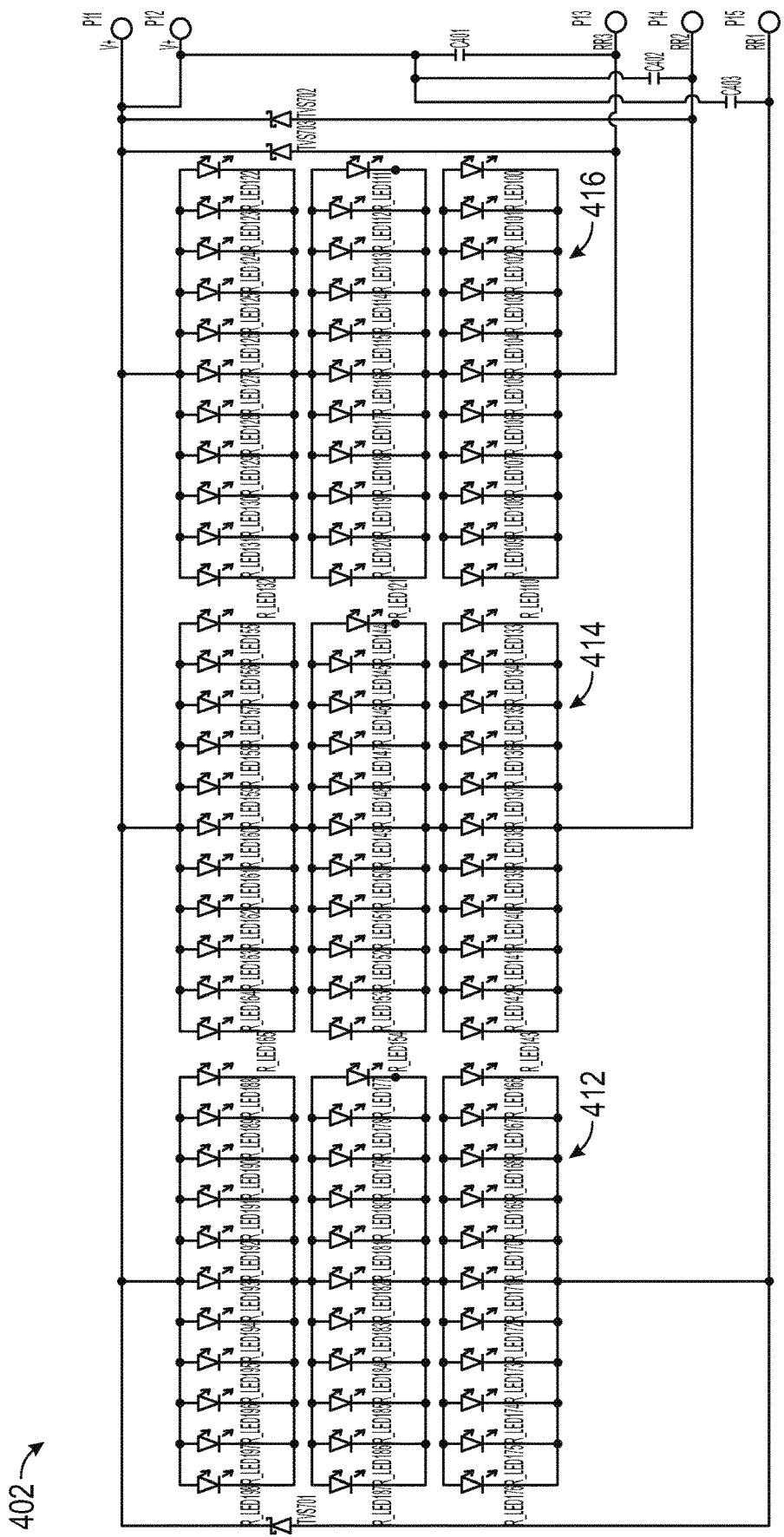
FIG. 53 is a detailed schematic showing an exemplary portion of the circuitry involved in the lighting assembly, including a portion of the circuit board to be housed within the light bar, according to some aspects of the present disclosure. The portion of the schematic shown in FIG. 53 could comprise at least a portion of the right-side circuit board to be housed within the right side of the light bar.

FIG. 53 shows an exemplary right side circuit board 402 to be housed within the right-side housing 248 of the light bar 202 according to some aspects of the present disclosure. As described above, the right-side circuit board 248 can include connections wherein the right-side circuit board 402 can connect to the ECU/driver circuit board 403. The connections between the right-side circuit board 402 and the ECU/driver circuit board 403 can be accomplished via the ECU-light bar wires 212 and/or plugs. The ECU-light bar wires 212 can connect to the right-side circuit board 402 and exit the right-side housing 248 via the right wire exit end cap 218 and enter the ECU/driver box 208 via the opening 255, or another opening of the ECU/driver box 208, to connect with the ECU/driver circuit board 403. As stated above, the ECU-light bar wires 212 can include wires extending from the left-side circuit board 400 and the right-side circuit board 402 wherein the wiring can come together and combine within a single wire harness before entering the ECU/driver box 208. Alternatively, the wires extending from the left-side circuit board 400 and right-side circuit board 402 can enter the ECU/driver box 208 separately. As stated above, the right-side circuit board 402 can include a right first red block 412 of red LEDs, a right second red block 414 of red LEDs, and a right third red block 416 of red LEDs. Each block can contain any number of LEDs in any arrangement. Additionally, other colors of LEDs in addition to red LEDs may be used such as white, blue, and/or amber LEDs. The connections between the right side circuit board 402 and the ECU/driver circuit board 403 is facilitated via FC2 shown in FIG. 33D. Based on input, signal, commands, and/or information received from the electrical system of the vehicle and/or from a user, the ECU/driver circuit board 403 can control and/or manipulate the right side circuit board 402, including illumination and prevention of illumination of particular LEDs on the right side circuit board 402 in particular patterns. Patterns include flashing illumination as used with a turn signal or constant illumination as used with braking or reversing. The right-side circuit board 402 can be controlled and/or manipulated such that an entire block of LEDs can be illuminated or not illuminated. Additionally, a block of LEDs can be partially illuminated, such as some of the LEDs of a particular block are illuminated and some other of the LEDs of that block are not illuminated.

According to some embodiments of the present disclosure, the left-side circuit board 400 and right-side circuit board 402 each include four blocks of amber LEDs. Each block of the left-side circuit board 400 is connected and/or manipulated by the ECU/driver circuit board 403 to illuminate according to four different signals when the left turn signal of the vehicle is engaged. Each block of the right-side circuit board 402 is connected and/or manipulated by the ECU/driver circuit board 403 to illuminate according to four different signals when the right turn signal of the vehicle is engaged.

According to some aspects of the present disclosure, particular blocks of LEDs can include more than one color in the same block. For instance, red, white, blue, and/or amber LEDs could be included in the same block of LEDs on the left-side circuit board 400 and/or the right-side circuit board 402. In an embodiment of this nature, the ECU/driver circuit board 403 could control and/or manipulate entire block of LEDs at the same time and/or could control and/or manipulate only some LEDs of the block of LEDs.

According to some aspects of the present disclosure, each block of LEDs on the left-side circuit board 400 and/or right-side circuit board 402 includes 24, 48, and/or 72 LEDs. However, each block of LEDs could include any suitable number of LEDs. Additionally, LEDs could be included in the left-side circuit board 400 and/or right-side circuit board 402 individually or in rows without being include as part of a block of LEDs.

Figure 54A:
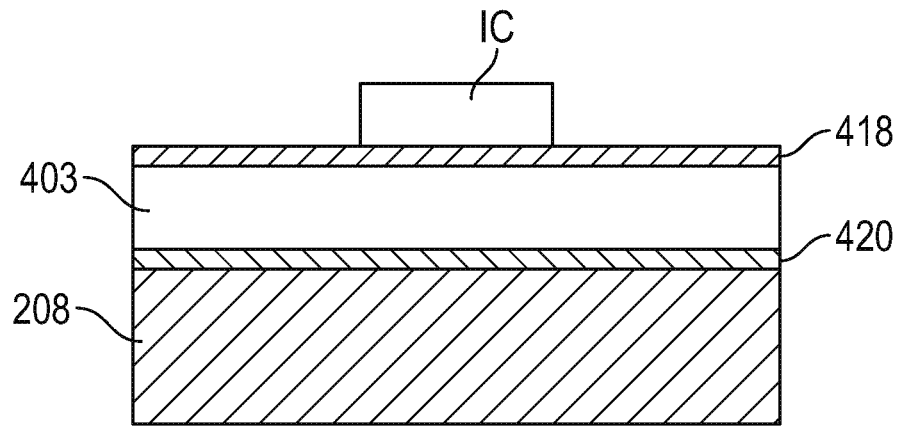
FIG. 54A is a side cut away view of an exemplary configuration of portions of the ECU circuit board and ECU box in order to perform heat dissipation according to some aspects of the present disclosure.

FIG. 54A shows an exemplary configuration of the ECU/driver circuit board 403 housed within the ECU/driver box 208 according to one embodiment. The exemplary ECU/driver circuit board 403 of FIG. 54A is aluminum, which helps facilitate heat dissipation and helps to mitigate potentially harmful EMI, RFI, and/or RF emissions. However, the ECU/driver circuit board 403 can be made of any other metal or nonmetal substance. The ECU/driver circuit board 403 may include an insulation layer 418 located between the various integrated circuits ICs and other electronic components and the ECU/driver circuit board 403. While only one IC is shown in FIG. 54A, any number of the ICs included in the assembly could be attached and/or applied to the ECU/driver circuit board 403. The insulation layer 418 helps to facilitate heat dissipation. Additionally, a heat conductive adhesive 420 can be located between the ECU/driver circuit board 403 and the ECU/drive box 208. The heat conductive adhesive performs several functions including adhering the ECU/drive circuit board 403 to the ECU/drive box 208 and also facilitating heat dissipation. The ECU/driver box 208 can also be made of aluminum to facilitate heat dissipation and act as a shield to mitigate EMI, RFI, and/or RF emissions. The configuration of FIG. 54A helps to facilitate heat dissipation of the ECU/driver circuit board 403 and/or decreases heat resistance between ICs and the ECU/driver box 208.

Figure 54B:
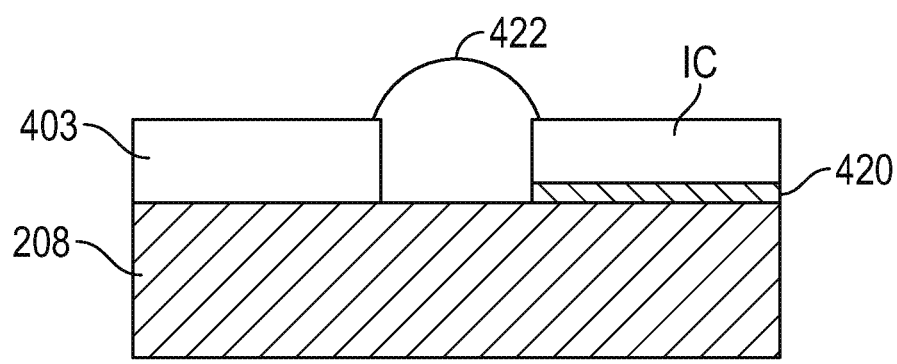
FIG. 54B is a side cut away view of another exemplary configuration of portion the ECU circuit board and ECU box in order to perform heat dissipation according to some aspects of the present disclosure.

FIG. 54B shows an exemplary configuration of the ECU/driver circuit board 403 housed within the ECU/driver box 208 according to another embodiment. The exemplary ECU/driver circuit board 403 of FIG. 54B is aluminum, which helps facilitate heat dissipation and helps to mitigate potentially harmful EMI, RFI, and/or RF emissions. However, the ECU/driver circuit board 403 can be made of any other metal or nonmetal substance. The configuration of FIG. 54B includes direct application of particular ICs to the ECU/driver box 208 with a heat conductive adhesive located between the ICs and the ECU/driver box 208 to facilitate heat dissipation. Various ICs can be attached and/or applied to the ECU/driver circuit board 403 as in FIG. 54A or directly to the ECU/driver box 208 as in FIG. 54B. While only one IC is shown in FIG. 54B, any number of the ICs included in the assembly could be attached and/or applied to the ECU/driver box 208. The ECU/driver circuit board 403, which can include other electronic components, can be attached and/or applied to the ECU/driver box 208. The ECU/driver circuit board 403 can be attached to the various ICs via wire 422 wherein the wire is hand-soldered to facilitate heat dissipation. The configuration of FIG. 54B helps to facilitate heat dissipation of the ECU/driver circuit board 403 and/or decreases heat resistance between ICs and the ECU/driver box 208. Additionally, the ECU/driver box 208 can also be made of aluminum to facilitate heat dissipation and act as a shield to mitigate EMI, RFI, and/or RF emissions.

While FIGS. 54A-B describe exemplary configurations of the ECU/driver circuit board 403 and the ECU/driver box 208, either configuration could also be used for the left-side circuit board 400 and/or the right-side circuit board 402 wherein the ECU/driver box 208 in FIGS. 54A-B is replaced with the light bar housing 12, left-side housing 238, and/or right-side housing 248 wherein the light bar housing 12, left-side housing 238, and/or right-side housing 248 are made of aluminum.

Figure 55:
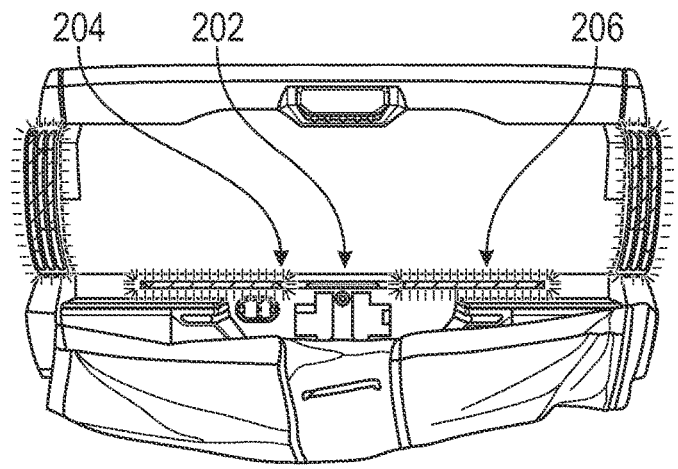
FIG. 55 is a perspective view of an exemplary lighting assembly attached to a vehicle wherein the vehicle is braking, according to some aspects of the present disclosure.

FIG. 55 shows an exemplary light bar 202 and vehicle arrangement wherein the vehicle is braking. FIG. 55 shows a vehicle wherein the light bar 202 and assembly 200 as a whole is installed on the vehicle. Because the vehicle is engaging its brakes, the electrical system of the vehicle sends an input to the assembly 200 wherein the assembly 200 controls and/or manipulates the light bar 202 to reflect the fact that the vehicle is braking. Therefore, a section of red LEDs of the left-side circuit board 400 housed within the left side 204 of the light bar 202 are illuminated in a constant manner and a section of red LEDs of the right-side circuit board 402 housed within the right side 206 of the light bar 202 are also illuminated in a constant manner. This illumination may include illumination of the left first red block 406, left second red block 408, left third red block 410, right first red block 412, right second red block 414, and/or right third red block 416.

Figure 56:
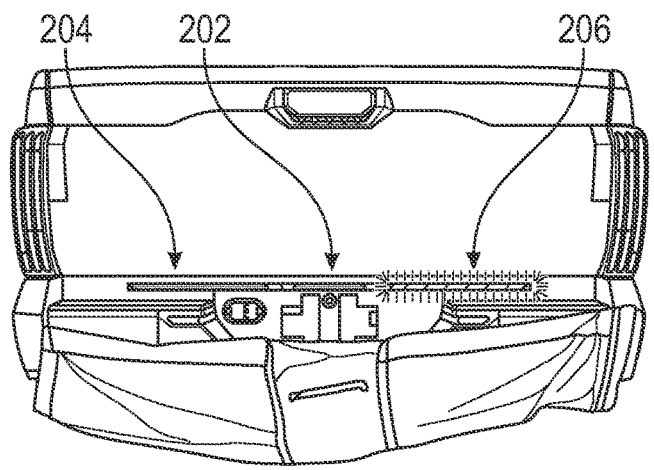
FIG. 56 is a perspective view of an exemplary lighting assembly attached to a vehicle wherein the vehicle has engaged its right turn signal, according to some aspects of the present disclosure.

FIG. 56 shows an exemplary light bar 202 and vehicle arrangement wherein the vehicle is engaging its right turn signal. FIG. 56 shows a vehicle wherein the light bar 202 and assembly 200 as a whole is installed on the vehicle. Because the vehicle is engaging its right turn signal, the electrical system of the vehicle sends an input to the assembly 200 wherein the assembly 200 controls and/or manipulates the light bar 202 to reflect the fact that the vehicle is braking. Therefore, a section of the red LEDs of the right-side circuit board 402 housed within the right side 206 of the light bar 202 are illuminated in a flashing pattern wherein the flashing pattern matches the cadence of the turn signal of the vehicle. This illumination may include illumination of the right first red block 412, right second red block 414, and right third red block 416 in a flashing manner. Similarly, if the vehicle engages its left turn signal, a section of the red LEDs of the left-side circuit board 400 housed within the right side 204 of the light bar 202 are illuminated in a flashing pattern wherein the flashing pattern matches the cadence of the turn signal of the vehicle. This illumination may include illumination of the left first red block 406, left second red block 408, and left third red block 410 in a flashing manner.

Figure 57:
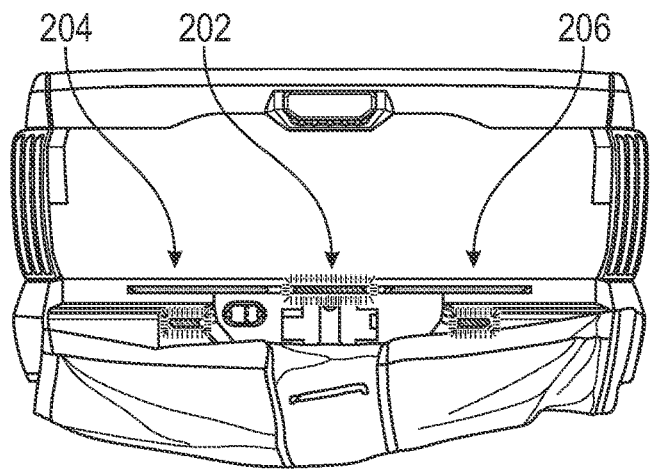
FIG. 57 is a perspective view of an exemplary lighting assembly attached to a vehicle wherein the vehicle is reversing, according to some aspects of the present disclosure.

FIG. 57 shows an exemplary light bar 202 and vehicle arrangement wherein the vehicle is reversing. FIG. 57 shows a vehicle wherein the light bar 202 and assembly 200 as a whole are installed on the vehicle. Because the vehicle is reversing, the electrical system of the vehicle sends an input to the assembly 200 wherein the assembly 200 controls and/or manipulates the light bar 202 to reflect the fact that the vehicle is reversing. Therefore, a section of the white LEDs of the left-side circuit board 400 housed within the left side 204 of the light bar 202 are illuminated in a constant manner This illumination may include illumination of the white block 404 of the left-side circuit board 400 in a constant manner. It is further contemplated for the assembly 200 to include speakers. The speakers can be controlled and/or manipulated by the ECU/driver circuit board 403 based on the inputs, signal, command, and/or other information received from the electrical system of the vehicle and/or received from a user. For example, when the vehicle is reversing, the ECU/driver circuit board 403 can manipulate the speakers to produce an auditory noise to alert individuals in the vicinity that the vehicle is reversing. The auditory noise alert may be a typical auditory signal produced by vehicles when they are reversing.

Figure 58A:
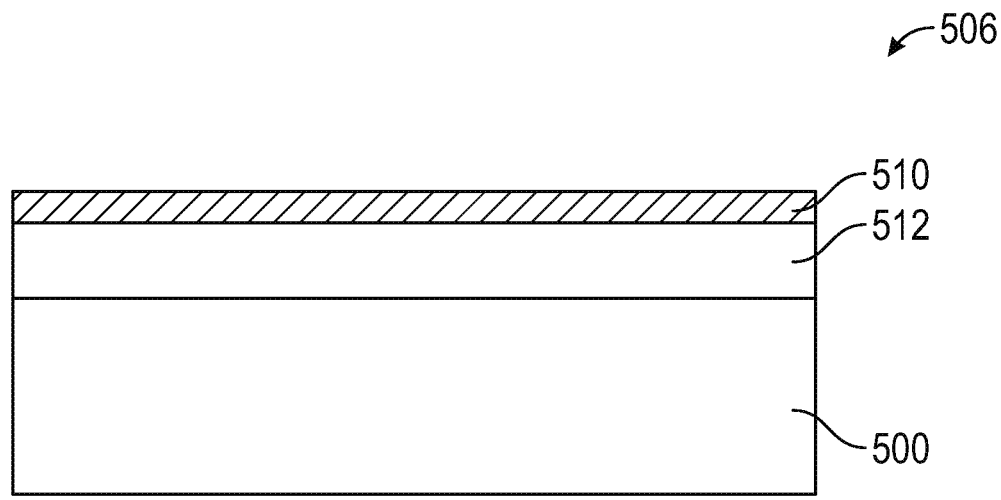
FIG. 58A is a side cut away view of an exemplary circuit board layer configuration of the circuit board to be housed within the light bar and/or the circuit board to be housed within the ECU driver box according to some aspects of the present invention.

FIG. 58A shows an exemplary single-sided, single layer configuration of a generic light bar circuit board 506. The exemplary circuit board 506 can be a printed circuit board. The left-side circuit board 400 housed within the left-side housing 238 and/or the right-side circuit board 402 housed within the right-side housing 248 could include the configuration of FIG. 58A. A generic light bar circuit board 506 could be configured as shown in FIG. 58A. Thus, the light bar circuit board 506 could comprise a copper layer 510 on top of an insulation layer 512, which are both on top of a base 500. The insulation layer 512 could be dielectric. The configuration of FIG. 58A facilitates heat dissipation. The base 500 can be made of aluminum to facilitate heath dissipation and to act as a shield to mitigate EMI, RFI, and/or RF emissions. However, the base 500 can also be made of any other suitable metal and/or nonmetal substance.

Figure 58B:
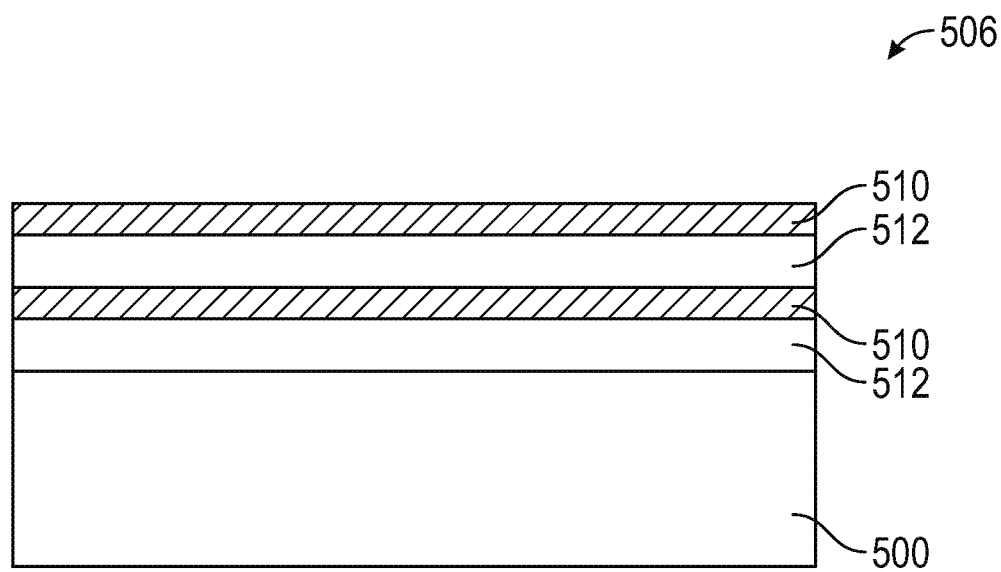
FIG. 58B is a side cut away view of another exemplary circuit board layer configuration of the circuit board to be housed within the light bar and/or the circuit board to be housed with the ECU/driver box according to some aspects of the present invention.

FIG. 58B shows an exemplary single-sided, double layer configuration of a generic light bar circuit board 506. The exemplary circuit board 506 can be a printed circuit board. The left-side circuit board 400 housed within the left-side housing 238 and/or the right-side circuit board 402 housed within the right-side housing 248 could include the configuration of FIG. 58B. A generic light bar circuit board 506 could be configured as shown in FIG. 58B. Thus, the light bar circuit board 506 could comprise two copper layers 510 on top of two insulation layers 512, which are both on top of a base 500. The copper layers 510 and insulation layers 512 can be positioned so that they alternate from top to bottom in that a first copper layer 510 is on top followed by an insulation layer 512, followed by another copper layer 510, followed by another insulation layer 512, and then the base 500 on the bottom. The insulation layers 512 could be dielectric. The configuration of FIG. 58B facilitates heat dissipation. The base 500 can be made of aluminum to facilitate heath dissipation and to act as a shield to mitigate EMI, RFI, and/or RF emissions. However, the base 500 can also be made of any other suitable metal and/or nonmetal substance.

According to some aspects of the present disclosure, in the single layer and/or double layer configurations of FIGS. 58A-B, each copper layer 510 has a thickness of about 35 μm and a weight of 1 ounce and each insulation layer 512 has a thickness of about 100-120 μm. According to some aspects of the present disclosure, the double layer configuration of FIG. 58B, which includes two copper layers 510, two insulation layers 512, and the base 500, has a total thickness of about 1 mm. Similarly, the thickness of the single layer configuration of the circuit board 506 in FIG. 58A can also be about 1 mm. According to some aspects of the present disclosure, the circuit board configurations of FIGS. 58A and/or 58B can have a thermal conductivity greater than or equal to 1 W/mK (1 watt/meter-Kelvin), have a Glass Transition Temperature (Tg) greater than or equal to 125 degrees Celsius, and pass the 94V-0 flammability test. The thermal conductivity can be provided by insulation layers 512. Additionally, the configuration of FIGS. 58A and/or 58B can include a generally rectangular wire soldering pad wherein three, four, six, and/or any number of pads can be included at each end of the generally rectangular wire soldering pad. The generally rectangular wire soldering pad can be generally the same size and shape as the left-side circuit board 400, right side circuit board 402, and/or ECU/driver circuit board 403. The same characteristics as described above in this paragraph in reference to the double layer configuration of FIG. 58B can also be included as characteristics of the single layer configuration of FIG. 58A.

The printed circuit board structures of FIGS. 58A and/or 58B can be used for left-side circuit board 400, right-side circuit board 402, and/or the ECU/driver circuit board 403.

Figure 59A:
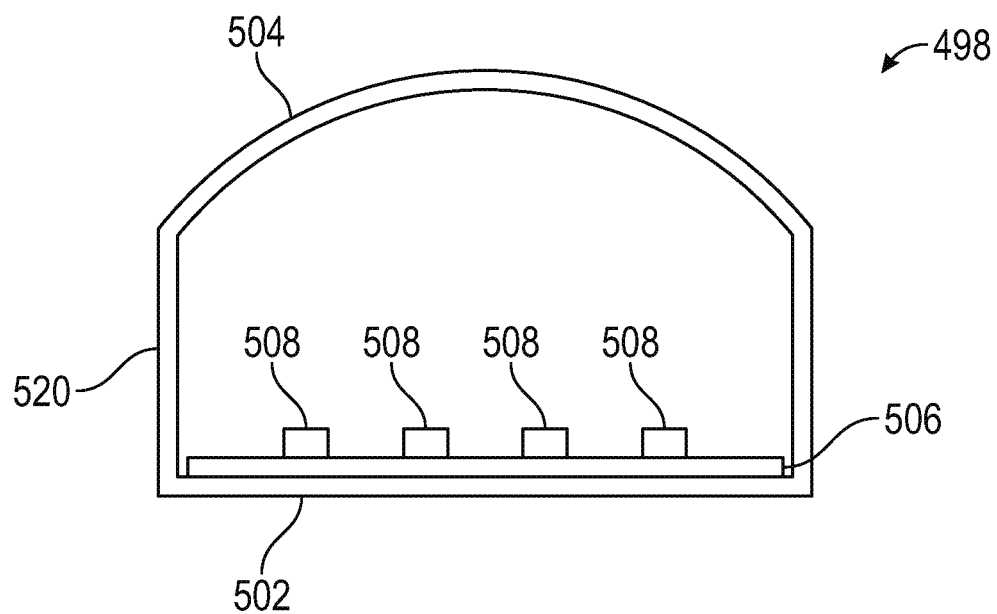
FIG. 59A is a side cut away view of an exemplary light bar circuit board and light bar housing configuration according to some aspects of the present invention.

FIG. 59A is an exemplary embodiment of the configuration of generic light bar circuit board 506 according to FIG. 58A and within a generic light bar housing 520 of a generic light bar 498. It is noted that the left-side light bar housing 238 and/or the right-side light bar housing 248 could be generic light bar housing 500. The generic light bar housing 520 shown in FIG. 59A is not shown with all of the features of the left-side housing 238, right side housing 248, housing 12, however, the generic housing 500 may be any of housings 12, 238, and/or 248 and/or may include features of any of housings 12, 238, and/or 248. As shown, generic light bar circuit board 506 may be housed within generic light bar housing 520. Light bar housing 520 may include a translucent and/or transparent cover portion 504 and rear face 502. Also, the generic light bar circuit board 506 is shown to include LEDs 508.

Figure 59B:
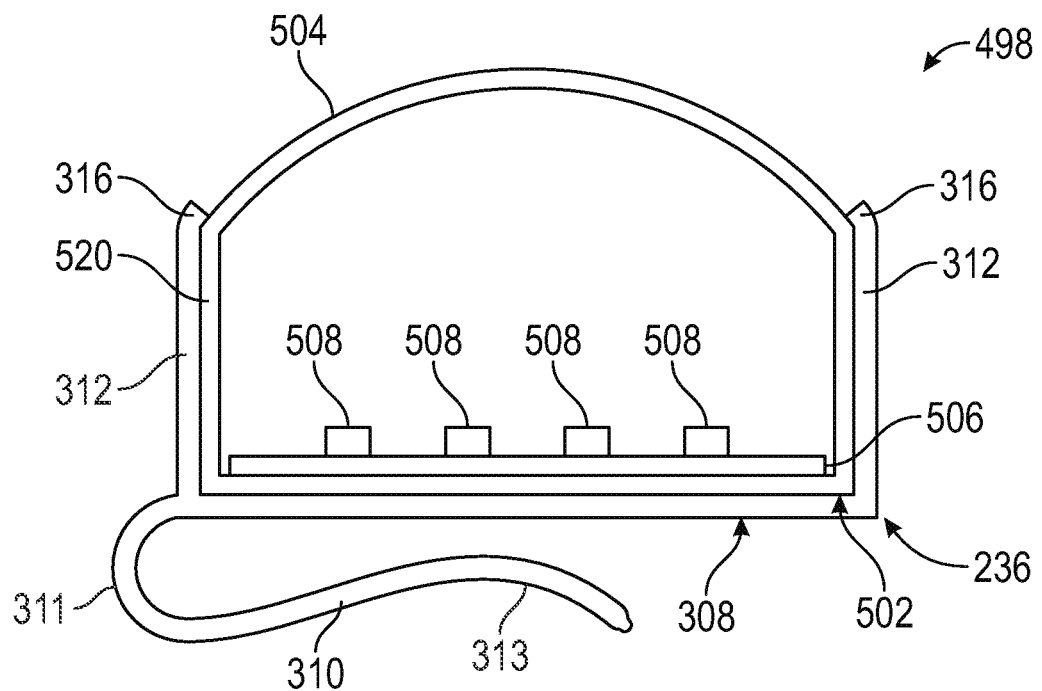
FIG. 59B is a side cut away view of another exemplary light bar circuit board and light bar housing configuration attached to a bracket according to some aspects of the present invention.

FIG. 59B is an exemplary embodiment of the configuration of generic light bar circuit board 506 according to FIG. 58A and within a generic light bar housing 500 of a generic light 498 wherein the light bar 498 is attached to a light bar bracket 236. It is noted that the left-side light bar housing 238 and/or the right-side light bar housing 248 could be generic light bar housing 500. The generic light bar housing 500 shown in FIG. 59B is not shown with all of the features of the left-side housing 238, right side housing 248, housing 12, however, the generic housing 500 may be any of housings 12, 238, and/or 248 and/or may include features of any of housings 12, 238, and/or 248. As shown, generic light bar circuit board 506 may be housed within generic light bar housing 520. Light bar housing 520 may include a translucent and/or transparent cover portion 504 and rear face 502. Also, the generic light bar circuit board 506 is shown to include LEDs 508. The light bar housing 500 is attached to the bracket 236 via the bracket arms 312 and notch/locking means 316 of the arms 312 as described above. The bracket 236 may also include a clip 310 and back 308.

Figure 60:
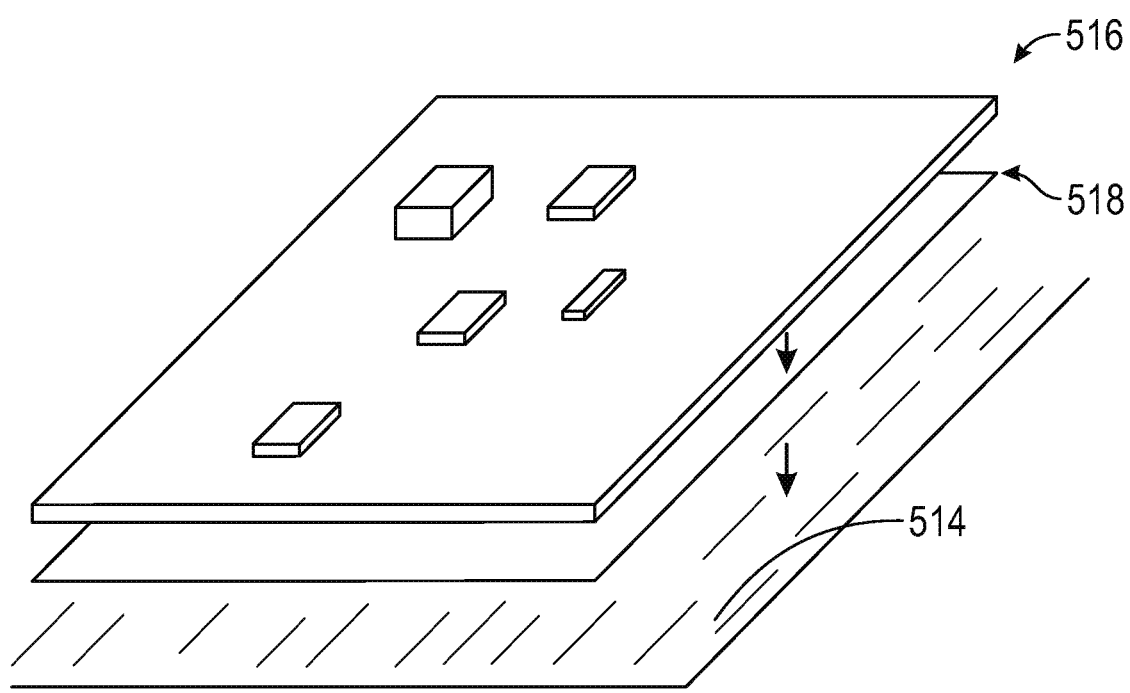
FIG. 60 is an expanded view of an ECU/driver circuit board layer configuration according to some aspects of the present disclosure.

FIG. 60 shows an exemplary configuration of generic ECU/driver circuit board 516 housed within generic ECU/driver box 514 according to some aspects of the present disclosure. The generic ECU/driver circuit board 516 may include the ECU/driver circuit board 403 and the generic ECU/driver box 514 may include the ECU/driver box 208. A generic heat conductive insulation sheet 518 may be positioned between the generic ECU/driver circuit board 516 and ECU/driver box 514. This configuration facilitates heat dissipation.

According to some aspects of the present disclosure, the exemplary ECU/driver circuit board 516 can be a printed circuit board meeting the standard of an FR-4 printed circuit board and having the characteristics of thermal conductivity greater than or equal to 1 W/mK (1 watt/meter-Kelvin), having a Glass Transition Temperature (Tg) greater than or equal to 125 degrees Celsius, wherein the board 516 passes the 94V-0 flammability test, further wherein surface-mount technology (SMT) is used to mount electronic components on one side of the board 516, and finally wherein the ECU/driver box 514 is aluminum. The thermal conductivity of greater than or equal to 1 W/mK can be provided by the heat conductive insulation sheet 518. Further, the ECU/driver circuit board 516 could comprise a single layer, double layer, or four-layer configuration. The ECU/driver circuit board 403 could be or include some or all characteristics, features, and/or functionality of ECU/driver board 516.

The ECU/driver circuit board 403 can be a printed circuit board that has or does not have the characteristics of the exemplary configuration of circuit board 516 of FIG. 60.

FIG. 61A shows an exemplary configuration of the ECU-light bar wiring 212 according to some aspects of the current disclosure. In the configuration of FIG. 61A, the ECU-light bar wiring 212 wiring can be corrugated tubing, wherein the corrugated tubing includes half wrap taping and/or fully wrapped taping. However, other configurations of the wiring 212 could be used. The configuration of FIG. 61A includes a left-side connector 600 for connecting to the left-side circuit board 400 of the light bar 202. The ECU-light bar wiring 212 also connects to the ECU/driver circuit board 403 housed within the ECU/driver box 208. Thus, the left-side connector 600 facilitates operable and/or electrical connection between the ECU/driver circuit board 403 housed within the ECU/driver box 208 and the left-side circuit board 400 housed within the left-side housing 238. The configuration of FIG. 61A also includes a right-side connector 602 for connecting to the right-side circuit board 402 of the light bar 202. Thus, the right-side connector 602 facilitates operable and/or electrical connection between the ECU/driver circuit board 403 housed within the ECU/driver box 208 and the right-side circuit board 402 housed within the right-side housing 248. Additionally, wiring extending from the left-side housing 238 can include a connector which can connect to the left-side connector 600. Also, wiring extending from the right-side housing 248 can include a connector which can connect to the right-side connector 602.

Via the operable and/or electrical connections between the ECU/driver circuit board 403 and the left and right-side circuit boards 400, 402, the ECU/driver circuit board 403 can control and/or manipulate the left and right-side circuit boards 400, 402 and their components including the LEDs mounted on each of the left and right-side circuit boards 400, 402.

Figure 61B:
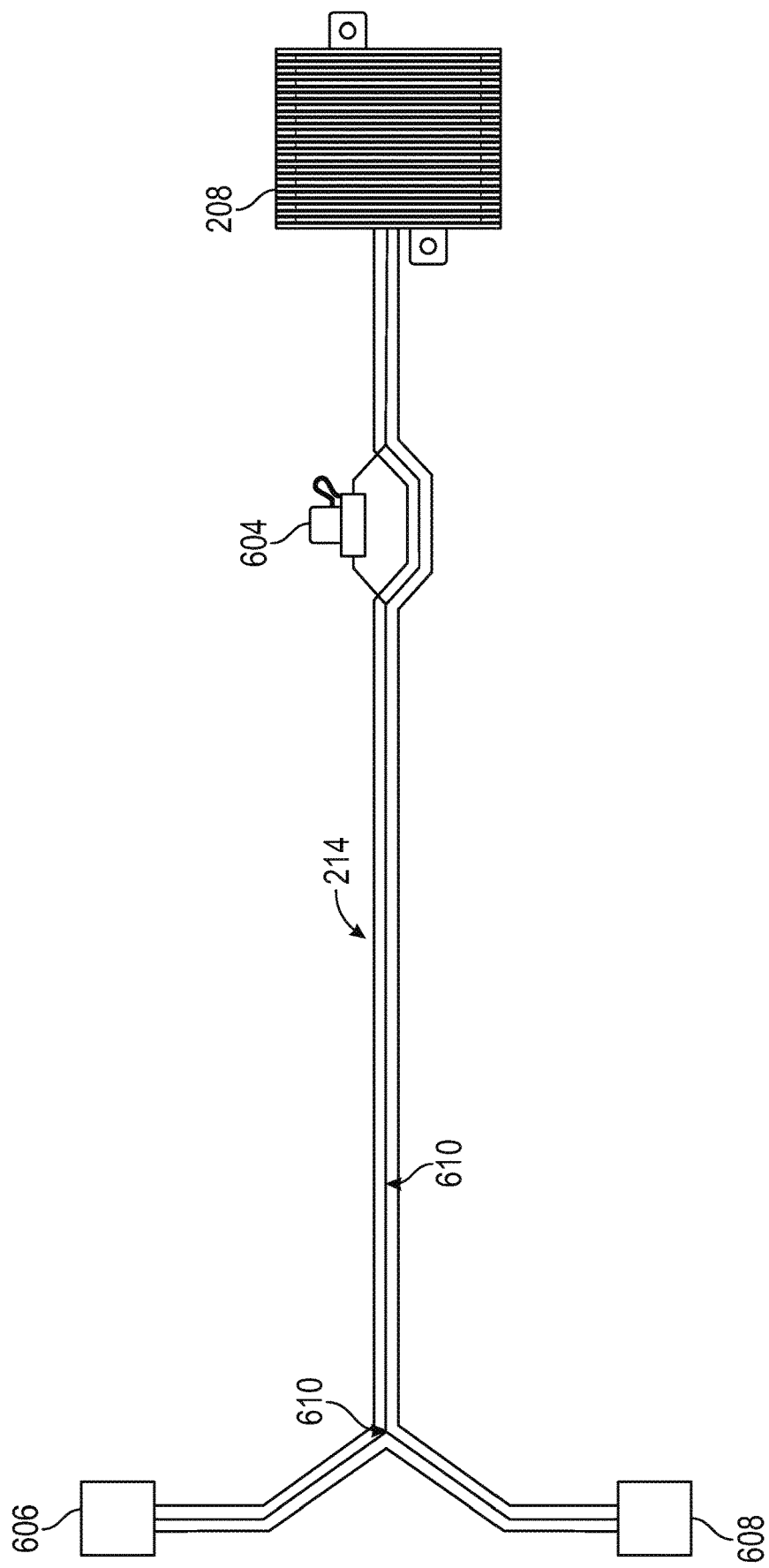
FIG. 61B is an elevation view from above showing an exemplary configuration of the ECU-vehicle wiring.

FIG. 61B shows an exemplary configuration of the ECU-vehicle wiring 214 according to some aspects of the current disclosure. In the configuration of FIG. 61B, the ECU-vehicle wiring 214 can be corrugated tubing, wherein the corrugated tubing includes half wrap taping and/or fully wrapped taping. However, other configurations of the wiring 214 could be used. The configuration of FIG. 61B includes a first vehicle connector 606 for connecting to the electrical system of the vehicle. The configuration of FIG. 61B also includes a second vehicle connector 608 for connecting to the electrical system of the vehicle. The ECU-vehicle wiring 214 is also connected to the ECU/driver circuit board 403 housed within the ECU/driver box 208. Thus, the first and second vehicle connectors 606, 608 facilitate operable and/or electrical connection between the ECU/driver circuit board 403 housed within the ECU/driver box 208 and the electrical system of the vehicle. As shown in FIG. 61B, one or more splice connectors 610 can be used with the ECU-vehicle wiring 214. Splice connectors 610 can be used to splice two or more wires wherein the plastic insulating jackets of two or more wires can be cut through and crimped together. The splice connectors 610 facilitate this splicing, crimping, and/or connecting.

Via the operable and/or electrical connections between the ECU/driver circuit board 403 and the electrical system of the vehicle, the ECU/driver circuit board 403 can receive input, signals, commands, and/or other information from the electrical system of the vehicle and control and/or manipulate the left and right side circuit boards 400, 402 based on that input, signals, commands, and/or other information.

Figure 62A:
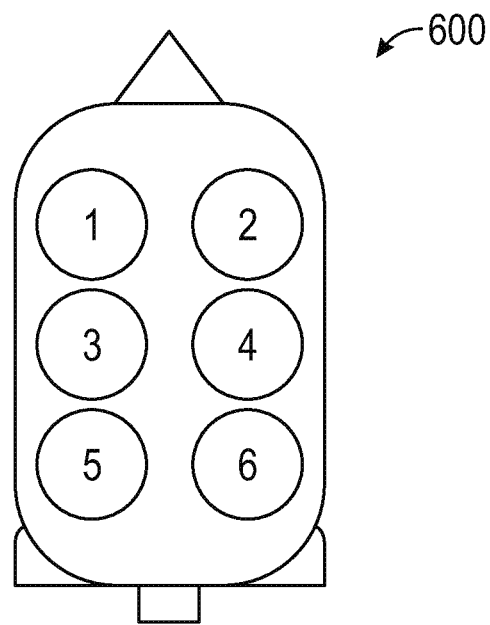
FIG. 62A is an elevation view showing an exemplary left-side connector connecting wiring extending from the ECU/driver box to the left side of the light bar.

FIG. 62A shows an exemplary embodiment of the left-side connector 600 according to some aspects of the present disclosure. The left-side connector 600 of the embodiment of FIG. 62A is an inline female connector with six pins. However, any type of connector could be used, including a male or female connector, and any number of pins could be used.

Figure 62B:
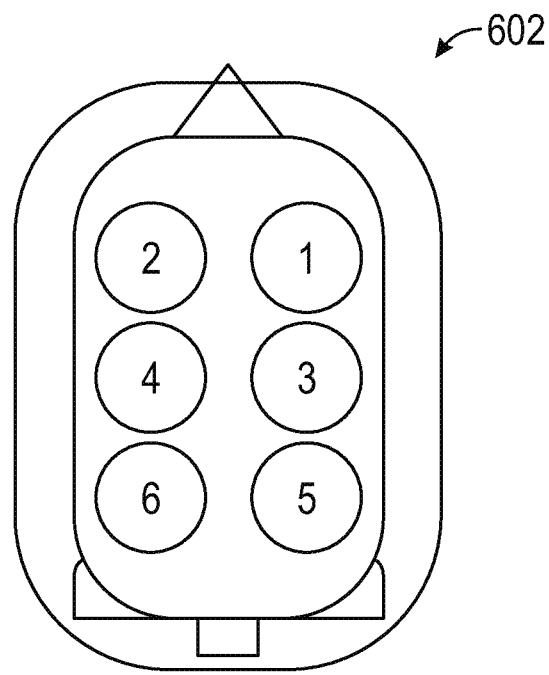
FIG. 62B is an elevation view showing an exemplary right side connector connecting wiring extending from the ECU/driver box to the right side of the light bar.

FIG. 62B shows an exemplary embodiment of the right-side connector 602 according to some aspects of the present disclosure. The right-side connector 602 of the embodiment of FIG. 62B is an inline male connector with six pins. However, any type of connector could be used, including a male or female connector, and any number of pins could be used.

Figure 62C:
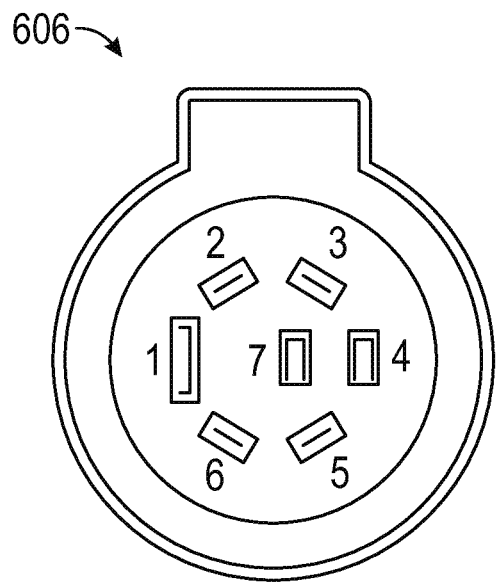
FIG. 62C is an elevation view showing an exemplary first vehicle connector for connecting wiring extending from the ECU/driver box to the vehicle.

FIG. 62C shows an exemplary first vehicle connector 606 according to some aspects of the present disclosure. The first vehicle connector 606 may be a 7-pin, female connector that connects to a socket or some other aspect of the electrical system of the vehicle. However, any other suitable type of connector could be used, including a male or female connector, and any number of pins could be used.

Figure 62D:
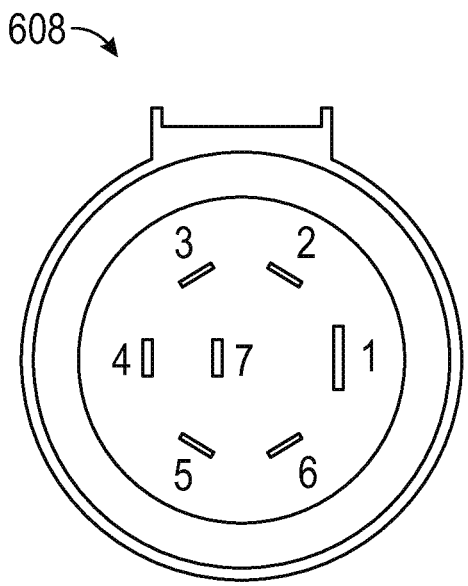
FIG. 62D is an elevation view showing an exemplary second vehicle connector for connecting wiring extending from the ECU/driver box to the vehicle.

FIG. 62D shows an exemplary second vehicle connector 608 according to some aspects of the present disclosure. The second vehicle connector 608 may be a 7-pin, male connector that connects to a trailer harness or some other aspect of the electrical system of the vehicle. However, any other suitable type of connector could be used, including a male or female connector, and any number of pins could be used. Additionally, a wire cover could be used in conjunction with either the first and/or second vehicle connectors 606, 608 to protect the underlying wiring from damage.

Figure 62E:
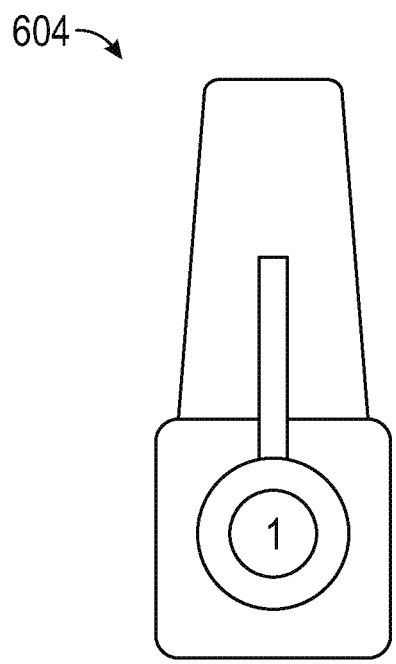
Figure 62F:
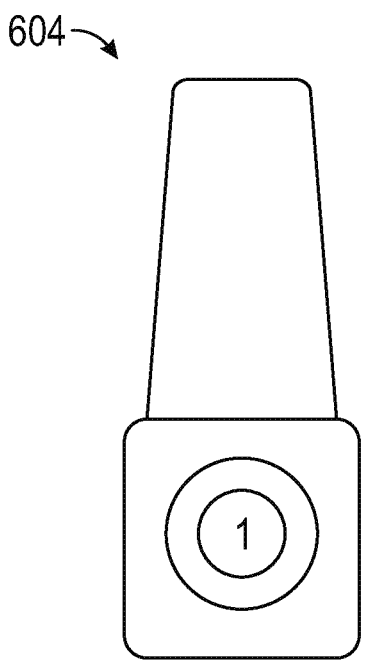

FIGS. 62E-F show two different exemplary wiring tools 604 that can be used with the ECU-vehicle wiring 214 according to some aspects of the present disclosure. These wiring tools 604 could be splice connectors, switches, and/or any other type of wiring tool. These wiring tools 604 facilitate a stable and durable connection between the ECU/driver box 208 and the electrical system of the vehicle.

The lighting assembly described herein passes industry tests designed to evaluate lighting devices and reflecting devices used in automobiles. The lighting assembly described herein passes industry tests including, but not limited to, vibration resistance testing, vibration resonance detection testing, vibration performance testing, vibration durability testing, environmental vibration testing, water resistance testing, sprinkling testing, high pressure car wash testing, drizzle testing, dust resistance testing, lens pressure testing, weather resistance testing, and flame resistance and flammability testing. The lighting assembly described herein is durable, waterproof, weather-proof, dust-proof, resistant to vibration, flame-resistant, and non-flammable.

The lighting assembly described herein passes industry tests designed to evaluate performance of LED units for automobile lamps. The lighting assembly described herein passes industry tests including, but not limited to, initial characteristic testing, temperature-voltage combination testing, high temperature operation testing, low temperature operation testing, temperature-humidity cycle testing, and temperature cycle testing. The lighting assembly described herein is capable of operating properly in environments of high and/or low temperatures with varying voltages and humidity levels.

The lighting assembly described herein passes industry tests designed to evaluate environmental resistance performance of automotive electrical and electronic equipment. The lighting assembly described herein passes industry tests including, but not limited to, water resistance testing, ice water submersion testing, salt spray testing, electrical leakage and function testing, shock testing, and oil and chemical resistance. The lighting assembly described herein is water-resistant, ice-resistant, capable of being submerged in ice water, resistant to salt spray, minimizes electrical leakage, functions properly after a shock (such as dropping the assembly), and is resistant to oil and other chemicals.

The lighting assembly described herein passes industry tests designed to evaluate electrical noise resistance of automotive electric and electronic devices. The lighting assembly described herein passes industry tests including, but not limited to, power supply voltage characteristic testing, overvoltage testing, reverse polarity testing, power supply circuit negative surge testing, load connecting circuit surge testing, power supply circuit positive surge testing, induction noise resistance testing, and floating ground testing. The lighting assembly described herein is capable of functioning properly in instances of fluctuations of the power supply voltage, capable of functioning properly when exposed to overvoltage, capable of functioning properly when reverse polarity occurs, capable of functioning properly when exposed to a power supply circuit negative and/or positive surge, resistant to induction noise, capable of functioning properly when the electrical potential of the ground terminal fluctuates.

The lighting assembly described herein passes industry tests designed to evaluate immunity performance of automotive electrical and electronic devices. The lighting assembly described herein passes industry tests including, but not limited to, antenna radiation testing, radio equipment antenna nearby testing, mobile phone antenna nearby testing. The lighting assembly described herein mitigates antenna radiation, mitigates EMI/RFI emissions such that nearby radio equipment and mobile phones are not negatively affected.

The lighting assembly described herein passes industry tests designed to evaluate electrostatic resistance performance of automotive electric and electronic equipment. The lighting assembly described herein passes industry tests including, but not limited to, electrostatic discharge resistance testing of equipment in operation and electrostatic resistance testing of equipment with power turned OFF. The lighting assembly described herein is resistant to electrostatic discharge when the assembly is in operation and when the assembly is turned OFF such as during installation.

The lighting assembly described herein passes industry tests designed to evaluate radio interference suppression performance of automotive electric and electronic parts. The lighting assembly described herein passes industry tests including, but not limited to, conducted emission testing with current probe method, conducted emission testing with voltage probe method, radiated emission testing with magnetic field antenna method, radiated emission testing with electric field antenna method, and radiated emission testing with ALSE method. The lighting assembly described herein mitigates conducted and radiated emissions, including EMI/RFI emissions.

The lighting assembly described herein passes industry tests designed to evaluate electromagnetic compatibility (EMC). The lighting assembly described herein passes industry tests including, but not limited to, radiated emissions testing, conducted emissions testing, GTEM cell immunity testing, transient (pulse) testing, electrostatic discharge testing, reverse polarity testing, random operation testing.

The lighting assembly described herein passes industry tests designed to evaluate performance during crimping. The lighting assembly described herein passes industry tests including, but not limited to, appearance testing, section observation testing, crimped strength testing, low voltage constant current resistance testing, voltage drop testing, and high-temperature storage testing.

The lighting assembly described herein passes industry tests designed to evaluate performance during splicing. The lighting assembly described herein passes industry tests including, but not limited to, appearance testing, low voltage current resistance testing, strength of spliced portion testing, insulation resistance testing, and leak current testing.

The lighting assembly described herein passes industry tests designed to evaluate environment durability. The lighting assembly described herein passes industry tests including, but not limited to, appearance testing, low voltage testing, pulling strength testing, insulation resistance testing, and leak current testing.

The lighting assembly described herein passes industry tests designed to evaluate high temperature storage. The lighting assembly described herein passes industry tests including, but not limited to, appearance testing, section observation testing, pulling force testing, low voltage constant current resistance testing, and voltage drop testing.

The lighting assembly described herein pass industry tests designed to evaluate luminous intensity and colorimetry. The lighting assembly described herein passes industry tests including, but not limited to, luminous intensity stop lamp/rear turn testing, luminous intensity taillamp testing, luminous intensity backup lamp testing, and colorimetry testing.

Therefore, as understood from the present disclosure, the disclosed assembly is durable, reliable, and long-lasting. The disclosed assembly mitigates potentially harmful and/or disruptive EMI, RFI, and/or RF emissions. The assembly engages in heat dissipation to avoid overheating of the assembly and components thereof. The assembly provides for a light bar that is separable, adjustable, and nimble to maximize visibility, effectiveness, and aesthetic quality as well as to provide for safe and effective attachment to a vehicle. The assembly provides for auditory signals in addition to visual signals. The assembly is easily installed and fits well with a vehicle. The assembly is capable of providing visual signals with desirable and/or customizable characteristics such as color and illumination patterns. The assembly is able to control and/or manipulate visual and/or auditory signals based on how the vehicle is being driven.

From the foregoing, it can be seen that the invention accomplishes at least all of the stated objectives.

It should be appreciated that one or more alternatives, variations, additions, subtractions, or other changes, which may be obvious to those skilled in the art, to be considered a part of the present disclosure.

The following table of reference characters and descriptors are not exhaustive, nor limiting, and include reasonable equivalents. If possible, elements identified by a reference character below and/or those elements which are near ubiquitous within the art can replace or supplement any element identified by another reference character.

GLOSSARY

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described and/or envisioned based upon that disclosed in the present specification and the figures.

The term "about" as used herein refers to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The invention claimed is:

1. A lighting assembly for use with a vehicle, comprising:
    an electronic control unit (ECU), said ECU comprising an ECU circuit board;
    a light bar comprising a plurality of housings, wherein the plurality of housings includes a left-side housing and a right-side housing;
    a left-side circuit board housed within the left-side housing;
    a right-side circuit board housed within the right-side housing;
    wherein one of the left-side or right-side circuit boards comprises a section of white LEDs and a first section of red LEDs and another one of the left-side or right-side circuit boards comprises a second section of red LEDs;
    wherein the light bar is configured such that the section of white LEDs is configured to be positioned between the first and second sections of red LEDs;
    wherein a gap exists between the left-side housing and the right-side housing such that the left-side housing and the right-side housing constitute two separate housings movable independent of each other;
    wherein the light bar is manipulated by the ECU;
    wherein the ECU circuit board comprises at least one filter adapted to mitigate electromagnetic interference.

2. The lighting assembly of claim 1, wherein the ECU is housed within an ECU box and the ECU box, left-side housing, and right-side housing are attached to the vehicle, wherein the left-side housing and the right-side housing are attached to the vehicle near the rear bumper.

3. The lighting assembly of claim 1, wherein the assembly is configured to be able to produce an auditory noise.

4. The lighting assembly of claim 1, wherein the left-side circuit board comprises the section of white LEDs and the first section of red LEDs, and the section of white LEDs and the first section of red LEDs are positioned side-by-side on the left-side circuit board such that they are on the same horizontal plane.

5. The lighting assembly of claim 4, wherein the right-side circuit board comprises the second section of red LEDs.

6. The lighting assembly of claim 5, wherein the right-side housing and left-side housing are positioned side-by-side on the vehicle such that the section of white LEDs and the first and second sections of red LEDs are all on the same horizontal plane.

7. The lighting assembly of claim 6, wherein the assembly is operationally connected to the electrical system of the vehicle and each section of LEDs is manipulated based on how the vehicle is driven.

8. The lighting assembly of claim 7, wherein the first and second sections of red LEDs are illuminated when the vehicle is braking.

9. The lighting assembly of claim 7, wherein the section of white LEDs is illuminated when the vehicle is reversing.

10. The lighting assembly of claim 7, wherein the first section of red LEDs flashes when the vehicle turns ON a left-hand turn signal.

11. The lighting assembly of claim 7, wherein the second section of red LEDs flashes when the vehicle turns ON a right-hand turn signal.

12. The lighting assembly of claim 1, wherein the first and second sections of red LEDs each comprise one or more blocks of LEDs.

13. The lighting assembly of claim 1, wherein the assembly mitigates EMI, RFI, and/or RF emissions.

14. A method of manufacturing a vehicle light bar, comprising:
    positioning an ECU circuit board within an ECU box wherein the ECU circuit board comprises at least one filter adapted to mitigate electromagnetic interference;
    positioning a left-side circuit board within a left-side light bar housing;
    positioning a right-side circuit board within a right-side light bar housing; and
    providing internal end caps that can be inserted at a right end of the left-side light bar housing and a left end of the right-side light bar housing such that the left-side light bar housing and the right-side light bar housing constitute two separate housings movable independent of each other;
    wherein one of the left-side or right-side circuit boards comprises a section of white LEDs and a first section of red LEDs and another one of the left-side or right-side circuit boards comprises a second section of red LEDs.

15. The method of claim 14, further comprising operationally connecting the ECU circuit board to the left-side circuit board and the right-side circuit board.

16. The method of claim 15, further comprising operationally connecting the ECU circuit board to the electrical system of the vehicle such that the ECU circuit board may receive signals, commands, and/or information from the electrical system of the vehicle and control the left-side and right-side circuit boards based on those signals, commands, and/or information.

17. The method of claim 14, wherein each of the right-side circuit board and left-side circuit board have a copper layer, insulation layer, and aluminum base to dissipate heat, and further wherein the right-side circuit board and the left-side circuit board have a thermal conductivity greater than or equal to 1 watt/meter-Kelvin, a glass transition temperature greater than or equal to 125 degrees Celsius, and pass a 94V-0 flammability test.

18. The method of claim 14, further comprising positioning the ECU circuit board within the ECU box such that a heat conductive insulation sheet is positioned between the ECU circuit board and the ECU box.

19. A lighting assembly for use with a vehicle, comprising:
- an electronic control unit (ECU), said ECU comprising an ECU circuit board;
- a light bar mounted on the vehicle comprising a plurality of housings, wherein the plurality of housings includes a left-side housing and a right-side housing;
- a left-side circuit board housed within the left-side housing;
- a right-side circuit board housed within the right-side housing;
- wherein the left-side housing and right-side housing of the light bar are separated by a gap such that the left-side housing and the right-side housing constitute two separate housings movable independent of each other;
- wherein the light bar is manipulated by the ECU;
- wherein the ECU circuit board comprises at least one filter adapted to mitigate electromagnetic interference.

20. The lighting assembly of claim 19, wherein the left-side circuit board and the right-side circuit board embody a double-layer configuration comprising a first copper layer, a first insulation layer, a second copper layer, a second insulation layer, and a base that facilitates heat dissipation and mitigates electromagnetic interference.

* * * * *